(12) United States Patent
Wang

(10) Patent No.: US 11,374,862 B2
(45) Date of Patent: Jun. 28, 2022

(54) PACKET SENDING AND PROCESSING METHOD AND APPARATUS, PE NODE, AND NODE

(71) Applicant: ZTE CORPORATION, Guangdong (CN)

(72) Inventor: Yubao Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 21 days.

(21) Appl. No.: 16/642,504

(22) PCT Filed: Nov. 30, 2018

(86) PCT No.: PCT/CN2018/118570
§ 371 (c)(1),
(2) Date: Feb. 27, 2020

(87) PCT Pub. No.: WO2019/105461
PCT Pub. Date: Jun. 6, 2019

(65) Prior Publication Data
US 2020/0287826 A1   Sep. 10, 2020

(30) Foreign Application Priority Data
Nov. 30, 2017 (CN) .......................... 201711257639.8

(51) Int. Cl.
*H04L 12/46* (2006.01)
*H04L 45/74* (2022.01)
(Continued)

(52) U.S. Cl.
CPC ........ *H04L 45/741* (2013.01); *H04L 12/4633* (2013.01); *H04L 12/4679* (2013.01); *H04L 45/64* (2013.01); *H04L 45/66* (2013.01)

(58) Field of Classification Search
CPC .............. H04L 45/741; H04L 12/4633; H04L 12/4679; H04L 45/64; H04L 45/66;
(Continued)

(56) References Cited

U.S. PATENT DOCUMENTS

2014/0294004 A1* 10/2014 Balus .................. H04L 12/4641
370/390
2017/0187647 A1* 6/2017 Singh .................. H04L 12/4625
(Continued)

FOREIGN PATENT DOCUMENTS

CN       104253759 A    12/2014
CN       104365066 A    2/2015
(Continued)

OTHER PUBLICATIONS

Sajassi. Ali et al. "E-TREE Support in EVPN & PBB-EVPN. Draft-sajassi-12vpn-evpn-etree-02" L2VPN Workgroup Internet-Draft, Oct. 21, 2013 (Oct. 21, 2013). pp. 1-10.
(Continued)

*Primary Examiner* — Younes Naji
*Assistant Examiner* — Da T Ton
(74) *Attorney, Agent, or Firm* — KDB Firm PLLC

(57) ABSTRACT

Provided are a packet sending methods and apparatus, a packet processing method and apparatus, a PE node and a node. The packet sending method includes: receiving a first packet from an AC, processing the first packet to obtain a second packet, the second packet including a first IP, where the first IP includes a second IP or an IP obtained by encrypting part bits of the second IP with an intrinsic entropy value of the first packet and the second IP is one of an ESI IP of an ESI corresponding to the AC, an IP obtained by modifying a designated bit of the ESI IP of the ESI corresponding to the AC according to a Root/Leaf attribute of the AC, an IP obtained by replacing part bits of the ESI
(Continued)

IP of the ESI corresponding to the AC with a VLAN ID value corresponding to the AC, a third IP, or an IP obtained by modifying a designated bit of the third IP according to the Root/Leaf attribute of the AC; and sending the second packet.

10 Claims, 6 Drawing Sheets

(51) Int. Cl.
*H04L 45/741* (2022.01)
*H04L 45/64* (2022.01)
*H04L 45/00* (2022.01)

(58) Field of Classification Search
CPC ............... H04L 61/2528; H04L 61/103; H04L 61/6022; H04L 12/4641; H04L 45/18; H04L 12/46; H04L 29/12
USPC .................. 709/230–232, 238, 244 and, 250
See application file for complete search history.

(56) References Cited

U.S. PATENT DOCUMENTS

2018/0109436 A1* 4/2018 Sajassi .................... H04L 45/74
2019/0222431 A1* 7/2019 Gao .................... H04L 12/4641

FOREIGN PATENT DOCUMENTS

| CN | 107040469 A | 8/2017 |
| EP | 2991284 A1 | 3/2016 |
| EP | 2996290 A1 | 3/2016 |
| EP | 3188415 A1 | 7/2017 |
| WO | 2015165311 A1 | 5/2015 |

OTHER PUBLICATIONS

International Search Report for the International Patent Application No. PCT/CN2018/118570, dated Jan. 30, 2019, 4 pages.
European Search Report and Written Opinion for the European Patent Application No. EP18884497, dated Jul. 22, 2021, 8 pages.

* cited by examiner

PACKET SENDING AND PROCESSING METHOD AND APPARATUS, PE NODE, AND NODE

CROSS-REFERENCE TO RELATED APPLICATIONS

This is a U.S. National Stage Application, filed under 35 U.S.C. 371, of International Patent Application No. PCT/CN2018/118570, filed on Nov. 30, 2018, which claims priority to Chinese patent application No. 201711257639.8 filed on Nov. 30, 2017, contents of both of which are incorporated herein by reference in their entireties.

TECHNICAL FIELD

The present disclosure relates to the field of communications and, for example, to a packet sending method and apparatus, a packet processing method and apparatus, a PE node and a node.

BACKGROUND

A virtual eXtensible local area network (VXLAN) encapsulation is a main technique for large layer 2 interconnection of a data center. The Internet Engineering Task Force (IETF) defines a VXLAN encapsulation format, a forwarding process and a control process of general VXLAN traffic in RFC7348. This general VXLAN traffic establishes media access control (MAC) table entries on the basis of MAC learning of a data plane but cannot support an Ethernet segment identifier (ESI) function.

The IETF extends RFC7432 to a VXLAN encapsulation in dratf-ietf-bess-evpn-overlay-08 ([EVPN Overlay]), so that RFC7432 becomes VXLAN Ethernet virtual private network (EVPN) traffic. Meanwhile, in draft-ietf-bess-evpn-etree, the IETF extends multiprotocol label switching (MPLS) EVPN traffic defined in RFC7432 from an Ethernet-local area network (E-LAN) into an Ethernet-TREE (E-TREE). However, the same extension cannot be performed on the VXLAN EVPN since a VXLAN packet lacks a VXLAN network identifier (VNI) label stack structure.

Additionally, for the VXLAN EVPN traffic based on [EVPN Overlay], the same VXLAN encapsulation is used to forward packets received from different ESIs of the same provider edge (PE) node to a remote node, so the remote node cannot distinguish between the packets received from different ESIs of the same PE node after receiving the packets, and it is also impossible to calculate the total traffic when the traffic is from the same ESI and reaches the same remote PE node via different adjacent PE nodes.

SUMMARY

The present disclosure provides a packet sending method and apparatus, a packet processing method and apparatus, a PE node and a node to solve the problem in which VXLAN traffic cannot support an ESI in related art.

The present disclosure provides a packet sending method. The method includes: receiving a first packet from an access circuit (AC), processing the first packet to obtain at least one second packet, and sending each second packet. Each second packet includes a first internet protocol (IP). The first IP includes a second IP or an IP obtained by encrypting part bits of the second IP with an intrinsic entropy value of the first packet. The second IP is one of an Ethernet segment identifier (ESI) IP of an ESI corresponding to the AC, an IP obtained by modifying a designated bit of the ESI IP of the ESI corresponding to the AC according to a Root/Leaf attribute of the AC, an IP obtained by replacing part bits of the ESI IP of the ESI corresponding to the AC with a virtual local area network identifier (VLAN ID) value corresponding to the AC, a third IP, or an IP obtained by modifying a designated bit of the third IP according to the Root/Leaf attribute of the AC. The ESI corresponding to the AC is an ESI bound to a main interface to which the AC belongs. The ESI IP of the ESI is an IP address corresponding to the ESI, the VLAN ID value corresponding to the AC is configured in the AC and used for matching the first packet. The third IP is determined through a provider edge (PE) node where the AC is located and a local index of the ESI corresponding to the AC on the PE node or determined through a virtual private network (VPN) domain to which the PE node where the AC is located belongs and the local index of the ESI corresponding to the AC on the PE node.

The present disclosure provides a packet processing method. The method includes: receiving a first packet sent by a provider edge (PE) node, where the PE node processes a second packet received from an AC to obtain the third packet and the first packet includes a first IP, where the first IP includes a second IP or an IP obtained by encrypting part bits of the second IP with an intrinsic entropy value of the second packet, and the second IP is one of an ESI IP of an ESI corresponding to the AC, an IP obtained by modifying a designated bit of the ESI IP of the ESI corresponding to the AC according to a Root/Leaf attribute of the AC, an IP obtained by replacing part bits of the ESI IP of the ESI corresponding to the AC with a VLAN ID value corresponding to the AC, a third IP, or an IP obtained by modifying a designated bit of the third IP according to the Root/Leaf attribute of the AC, where the ESI corresponding to the AC is an ESI bound to a main interface to which the AC belongs, the ESI IP of the ESI is an IP address corresponding to the ESI, the VLAN ID value corresponding to the AC is configured in the AC and used for matching the second packet, and the third IP is determined through a PE node where the AC is located and a local index of the ESI corresponding to the AC on the PE node or determined through a VPN domain to which the PE node where the first AC is located belongs and the local index of the ESI corresponding to the first AC on the PE node; and processing the first packet according to an ESI value corresponding to the first IP included in the third packet or performing ESI filtering on the first packet according to the second IP and configuration information on a receiver that receives the first packet.

The present disclosure provides a packet sending apparatus, which includes a receiving module, a processing module and a sending module. The receiving module is configured to receive a first packet from an AC. The processing module is configured to process the first packet to obtain at least one second packet, where each second packet includes a first IP. The first IP includes a second IP or an IP obtained by encrypting part bits of the second IP with an intrinsic entropy value of the first packet. The second IP is one of an ESI IP of an ESI corresponding to the AC, an IP obtained by modifying a designated bit of the ESI IP of the ESI corresponding to the AC according to a Root/Leaf attribute of the AC, an IP obtained by replacing part bits of the ESI IP of the ESI corresponding to the AC with a VLAN ID value corresponding to the AC, a third IP, or an IP obtained by modifying a designated bit of the third IP according to the Root/Leaf attribute of the AC. The ESI corresponding to the AC is an ESI bound to a main interface to which the AC belongs. The ESI IP of the ESI is an IP address corresponding to the ESI. The VLAN ID value corresponding to the AC is configured in the AC and used for matching the first packet. The third IP is determined through a PE node where the AC is located and a local index of the ESI corresponding to the AC on the PE node or determined through a VPN domain to which the PE node where the AC is located belongs and the local index of the ESI corresponding to the AC on the PE node. The sending module is configured to send each second packet.

The present disclosure further provides a packet processing apparatus, which includes a receiving module and a processing module. The receiving module is configured to receive a first packet sent by a provider edge (PE) node, where the first PE node processes a second packet received from an AC to obtain the first packet and the first packet includes a first IP. The first IP includes a second IP or an IP obtained by encrypting part bits of the second IP with an intrinsic entropy value of the second packet. The second IP is one of an ESI IP of an ESI corresponding to the AC, an IP obtained by modifying a designated bit of the ESI IP of the ESI corresponding to the AC according to a Root/Leaf attribute of the AC, an IP obtained by replacing part bits of the ESI IP of the ESI corresponding to the AC with a VLAN ID value corresponding to the AC, a third IP, or an IP obtained by modifying a designated bit of the third IP according to the Root/Leaf attribute of the first AC. The ESI corresponding to the AC is an ESI bound to a main interface to which the AC belongs. The ESI IP of the ESI is an IP address corresponding to the ESI. The VLAN ID value corresponding to the AC is configured in the AC and used for matching the second packet. The third IP is determined through a PE node where the AC is located and a local index of the ESI corresponding to the AC on the PE node or determined through a VPN domain to which a PE node where the AC is located belongs and the local index of the ESI corresponding to the AC on the PE node. The processing module is configured to process the first packet according to an ESI value corresponding to the first IP included in the first packet or perform ESI filtering on the first packet according to the second IP and configuration information on a receiver receiving the first packet.

The present disclosure further provides a PE node, which includes a communication interface and a processor. The communication interface is configured to receive a first packet from an access circuit (AC). The processor is configured to process the first packet to obtain at least one second packet. Each second packet includes a first IP. The first IP includes a second IP or an IP obtained from encryption of part bits of the second IP with an intrinsic entropy value of the first packet. The second IP is one of an ESI IP of an ESI corresponding to the AC, an IP obtained from a modification to a designated bit of the ESI IP of the ESI corresponding to the AC according to a Root/Leaf attribute of the AC, an IP obtained from replacement of part bits of the ESI IP of the ESI corresponding to the AC with a VLAN ID value corresponding to the AC, a third IP, or an IP obtained from a modification to a designated bit of the third IP according to the Root/Leaf attribute of the first AC. The ESI corresponding to the AC is an ESI bound to a main interface to which the AC belongs. The ESI IP of the ESI is an IP address corresponding to the ESI. The VLAN ID value corresponding to the AC is configured in the AC and used for matching the first packet. The third IP is determined through a PE node where the AC is located and a local index of the ESI corresponding to the AC on the PE node or determined through a VPN domain to which the PE node where the AC is located belongs and the local index of the ESI corresponding to the AC on the PE node. The communication interface is further configured to send each second packet.

The present disclosure further provides a node, which includes a communication interface and a processor. The communication interface is configured to receive a first packet sent by a provider edge (PE) node, where the PE node processes a second packet received from an AC to obtain the first packet and the first packet includes a first IP. The first IP includes a second IP or an IP obtained from encryption of part bits of the second IP with an intrinsic entropy value of the second packet. The second IP is one of an ESI IP of an ESI corresponding to the AC, an IP obtained from a modification to a designated bit of the ESI IP of the ESI corresponding to the AC according to a Root/Leaf attribute of the AC, an IP obtained from replacement of part bits of the ESI IP of the ESI corresponding to the AC with a VLAN ID value corresponding to the AC, a third IP, or an IP obtained from a modification to a designated bit of the third IP according to the Root/Leaf attribute of the AC. The ESI corresponding to the AC is an ESI bound to a main interface to which the AC belongs. The ESI IP of the ESI is an IP address corresponding to the ESI. The VLAN ID value corresponding to the AC is configured in the AC and used for matching the second packet. The third IP is determined through a PE node where the AC is located and a local index of the ESI corresponding to the AC on the PE node or determined through a VPN domain to which the PE node where the AC is located belongs and the local index of the ESI corresponding to the AC on the PE node. The processor is configured to process the first packet according to an ESI value corresponding to the first IP included in the first packet or perform ESI filtering on the first packet according to the second IP and configuration information on a receiver receiving the first packet.

The present disclosure provides a packet processing system, which includes a first node and a second node. The first node is configured to receive a first packet from an access circuit (AC), process the first packet to obtain at least one second packet and send the at least one second packet to the second node. Each second packet includes a first IP. The first IP includes a second IP or an IP obtained from encryption part bits of the second IP with an intrinsic entropy value of the first packet. The second IP is one of an ESI IP of an ESI corresponding to the AC, an IP obtained from a modification to a designated bit of the ESI IP of the ESI corresponding to the AC according to a Root/Leaf attribute of the AC, an IP obtained from replacement of part bits of the ESI IP of the ESI corresponding to the AC with a VLAN ID value corresponding to the AC, a third IP, or an IP obtained from a modification to a designated bit of the third IP according to the Root/Leaf attribute of the AC. The ESI corresponding to the AC is an ESI bound to a main interface to which the AC belongs. The ESI IP of the ESI is an IP address corresponding to the ESI. The VLAN ID value corresponding to the AC is configured in the AC and used for matching the first packet. The third IP is determined through a PE node where the AC is located and a local index of the ESI corresponding to the AC on the PE node or determined through a VPN domain to which the PE node where the AC is located belongs and the local index of the ESI corresponding to the AC on the PE node. The second node is configured to process each second packet according to an ESI value corresponding to the first IP included in each second packet or perform ESI filtering on each second packet according to the second IP and configuration information on a receiver receiving the second packet.

This embodiment further provides a storage medium, which includes a stored program. When the program is executed, any one method described above is performed.

The present disclosure further provides a processor, which is configured to execute a program. When the program is executed, any one method described above is performed.

DETAILED DESCRIPTION

The present disclosure will be described hereinafter in detail with reference to the drawings and in conjunction with embodiments.

The terms "first", "second" and the like in the description, claims and preceding drawings of the present disclosure are used to distinguish between similar objects and are not necessarily used to describe a particular order or sequence.

RFC7623 extends MPLS EVPN traffic defined in RFC7432 into provider backbone bridge (PBB) EVPN traffic. However, the PBB EVPN traffic still depends on an MPLS encapsulation but the MPLS technique is difficult to deploy in many scenario, for example, in the case where a virtual provider establishes virtual private network (VPN) service via a conventional provider network. Although the PBB EVPN does have some technical effects with its own features, it is not specified in related art how to keep these technical effects in an environment without a PBB and an MPLS encapsulation condition.

Additionally, a source IP does not have the necessary role in IP-packet forwarding since the IP packet forwarding is performed according to a destination IP. However, in some scenarios, the validity of the source IP may be checked by using techniques such as unicast reverse path forwarding (URPF), reverse path forwarding (RPF) and the like. This actually requires that the source IP is routable as a destination IP in an underlay network, resulting in wasting of IP address resources of the underlay network in some scenarios.

Embodiment One

Figure 1:
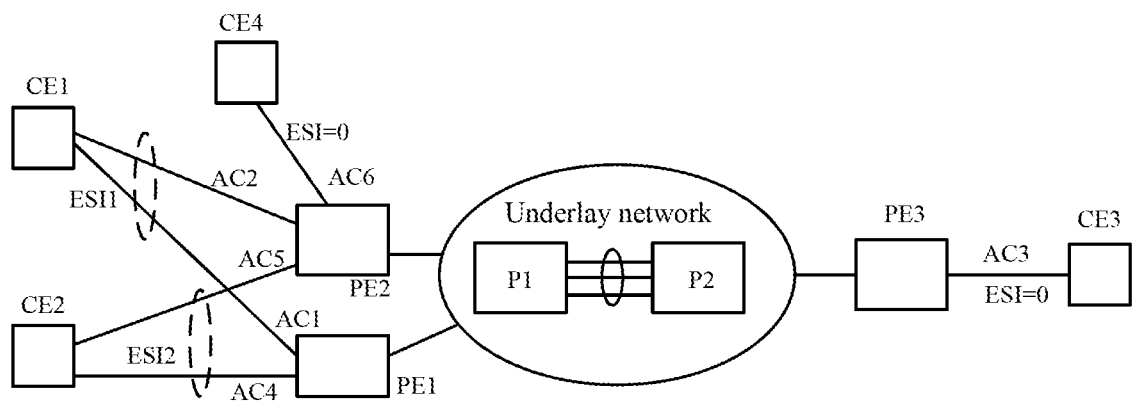
FIG. 1 is a typical topology diagram of VXLAN EVPN traffic defined in [EVPN Overlay] according to an embodiment.

The present disclosure provides a packet sending method, which is applicable to, but is not limited to, the topology shown in FIG. 1. FIG. 1 is a typical topology diagram of VXLAN EVPN traffic defined in [EVPN Overlay] according to an embodiment. This method may be performed by a PE node. For example, in the topology shown in FIG. 1, the sending method may be, but is not necessarily, performed by a node PE 1, a node PE 2 or a node PE 3 shown in FIG. 1.

Figure 2:
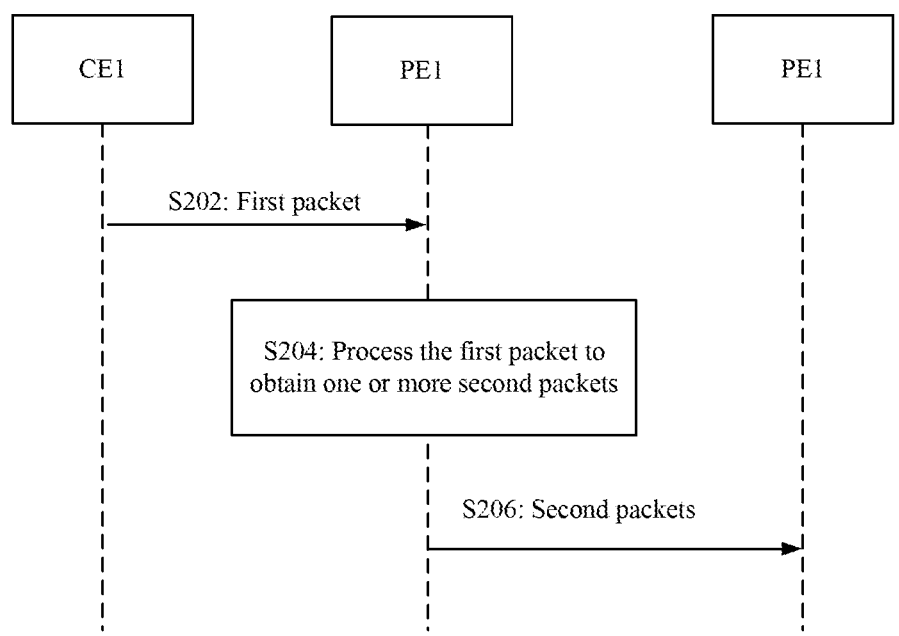
FIG. 2 is a flowchart of a packet sending method according to an embodiment.

A description is given below using an example in which the sending method is performed by the node PE 1 shown in FIG. 1 and a packet is sent from a customer edge (CE) node 1 to the node PE 2 in an underlay network via the node PE 1. FIG. 2 is a flowchart of a packet sending method according to an embodiment. As shown in FIG. 2, the method includes the steps described below.

In step S202, the PE 1 receives a first packet from a first AC.

In step S204, the PE 1 processes and encapsulates the first packet to obtain one or more second packets. In this embodiment, each second packet includes a first IP. The first IP includes a second IP or an IP obtained by encrypting part bits of the second IP with an intrinsic entropy value of the first packet (referring to exemplary embodiment five). The second IP is one of an ESI IP of an ESI corresponding to the first AC, an IP (referring to exemplary embodiment twelve) obtained by modifying a designated bit of the ESI IP of the ESI corresponding to the first AC according to a Root/Leaf attribute of the first AC, an IP (referring to exemplary embodiment four) obtained by replacing part bits of the ESI IP of the ESI corresponding to the first AC with a VLAN ID value corresponding to the first AC, a third IP, or an IP obtained by modifying a designated bit of the third IP according to the Root/Leaf attribute of the first AC. The ESI corresponding to the first AC is an ESI bound to a main interface to which the first AC belongs. The ESI IP of the ESI is an IP address corresponding to the ESI. The VLAN ID value corresponding to the first AC is configured in the first AC and used for matching the first packet. The third IP is determined through a PE node where the first AC is located and a local index of the ESI corresponding to the first AC on the PE node or determined through a VPN domain to which the PE node where the first AC is located belongs and the local index of the ESI corresponding to the first AC on the PE node.

In step S206, the PE 1 sends each second packet.

According to the preceding steps, the first IP included in each second packet carries information related to the ESI corresponding to the first AC receiving the first packet, so that traffic, for example, VXLAN traffic or the like, related to each second packet can support an ESI function and the problem that the VXLAN traffic cannot support the ESI is solved.

In this embodiment, the intrinsic entropy value is calculated from one or more feature fields in the first packet by using a designated algorithm. For example, in exemplary embodiment five, the feature field is the lower 32 bits of a source MAC, the designated algorithm is function $f(x)=x$, and a bitwise logical exclusive OR operation is a simple encryption algorithm, since if the bitwise logical exclusive OR operation is performed on a field B twice with value A, the obtained result is still the value before B is modified, where the first operation is equivalent to encryption and the second operation is equivalent to decryption.

In this embodiment, the first IP carries the related information about the ESI, that is, packets sent from different ESIs of the same PE include related information about their respective ESIs, so that a remote end, when receiving these packets, can distinguish these packets by using the related information of the different ESIs. In this way, the problem in which the packets which are received from different ESIs of the same PE and forwarded to the remote end cannot be distinguished can be solved, and the total traffic can be calculated when the traffic from the same ESI reaches the same remote PE node via different adjacent PE nodes.

In this embodiment, the preceding encapsulation may be an IP encapsulation, and in this mode, some effects of the PBB EVPN can be achieved without using the PBB and the MPLS encapsulation (referring to exemplary embodiments six, seven, thirteen to sixteen, and eighteen).

Additionally, according to an embodiment of the preceding method, the first IP carries the Root/Leaf attribute of the first AC, so that VXLAN EVPN traffic can be extended from an E-LAN into an E-TREE without using a VNI label stack structure in the packet. The value of the Root/Leaf attribute is Root or Leaf.

In this embodiment, the IP obtained from the modification to the designated bit of the ESI IP according to Root in the case where the value of the Root/Leaf attribute of the first AC is Root is different from the IP obtained from the modification to the designated bit of the ESI IP according to Leaf in the case where the value of the Root/Leaf attribute of the first AC is Leaf; and the IP obtained from the modification to the designated bit of the third IP according to Root in the case where the value of the Root/Leaf attribute of the first AC is Root is different from the IP obtained from the modification to the designated bit of the third IP according to Leaf in the case where the value of the Root/Leaf attribute of the first AC is Leaf.

In an embodiment, the preceding third IP may include a first part and a second part. The first part includes the local index. The second part includes at least one of a designated part (referring to exemplary embodiment one) of a designated IP address configured on the PE node where the first AC is located, where the third IP of each AC on the PE node includes the designated part; a common binary-bit part (referring to exemplary embodiment six) of designated attribute values configured ESI-by-ESI through a same configuration command on the PE node where the first AC is located; or a common binary-bit part (referring to exemplary embodiment one) of designated IP addresses configured through a same configuration command on PE nodes of a VPN domain to which the second packet belongs. The VPN domain is a set of PE nodes for sending or receiving the second packet.

In an embodiment, the local index is unique to an ESI on the PE node where the ESI is located, that is, the local index uniquely, but is not limited to, identifies the ESI corresponding to the local index on the PE node.

In an embodiment, the local index may include at least one of an ESI value (referring to exemplary embodiment eleven), an ESI alias value, an ESI local distinguishment value or an ESI intra-domain distinguishment value. The ESI alias value (referring to exemplary embodiment two) is a value configured for an attribute of the ESI corresponding to the first AC, where the ESI corresponding to the first AC differs from other ESIs on the PE node where the first AC is located in the attribute. The ESI local distinguishment value (referring to exemplary embodiment five) is the value of a first designated field in the ESI corresponding to the first AC, where the first designated fields corresponding to different ESIs have different values on the PE node. The ESI intra-domain distinguishment value (referring to exemplary embodiment six) is the value of a second designated field in the ESI corresponding to the first AC, where the second designated fields corresponding to different ESIs have different values in the VPN domain to which the PE node where the first AC is located belongs.

In an embodiment, in the case where the preceding third IP is an internet protocol version 6 (IPv6), the preceding local index may be, but is not limited to, the ESI value.

In an embodiment, the preceding first IP is located at one of the following positions of each second packet: a source IP or an IPv6 option header (referring to exemplary embodiment eleven).

In an embodiment, the step S204 may be processing the first packet according to at least one of the following control planes: a first EVPN control plane, a second EVPN control plane, a third EVPN control plane, a fourth EVPN control plane, a fifth EVPN control plane or a sixth EVPN control plane. The first EVPN control plane issues, through routing, not only a correspondence between the ESI IP and the ESI or a correspondence between information in the third IP and the ESI, but also a media access control (MAC) entry of AC learning to which an EVPN instance bound to the first AC is bound. The second EVPN control plane (referring to exemplary embodiment two) does not issue the correspondence between the ESI IP and the ESI or the correspondence between the information in the third IP and the ESI through routing, but issues, through routing, the MAC entry of the AC learning to which the EVPN instance bound to the first AC is bound. The third EVPN control plane (referring to exemplary embodiment seven) issues, through routing, the correspondence between the ESI IP and the ESI or the correspondence between the information in the third IP and the ESI, but does not issue, through routing, the MAC entry of the AC learning to which the EVPN instance bound to the first AC is bound. The fourth EVPN control plane (referring to exemplary embodiment six) does not issue the correspondence between the ESI IP and the ESI or the correspondence between the information in the third IP and the ESI through routing, and does not issue, through routing, the MAC entry of the AC learning to which the EVPN instance bound to the first AC is bound. The fifth EVPN control plane issues the correspondence between the ESI IP and the ESI or the correspondence between the information in the third IP and the ESI in a backbone IP-virtual routing and forwarding (IP-VRF) instance, where the backbone IP-VRF instance is an IP-VRF instance to which the EVPN instance bound to the first AC is bound. The sixth EVPN control plane issues the correspondence between the ESI IP and the ESI or the correspondence between the information in the third IP and the ESI in a backbone MAC-virtual routing and forwarding (MAC-VRF) instance, where the backbone MAC-VRF instance is a layer 2 virtual private network (L2VPN) instance to which the EVPN instance bound to the first AC is bound.

In an embodiment, when the first packet is processed based on the second EVPN control plane or the fourth EVPN control plane, the processing may not depend on the correspondence between the ESI IP and the ESI or the correspondence between the information in the third IP and the ESI.

In an embodiment, the second packet obtained by processing the first packet based on the fifth EVPN control plane includes a private network tag of the backbone IP- VRF instance (referring to exemplary embodiments eighteen) or does not include the private network tag of the backbone IP-VRF instance (referring to exemplary embodiments fourteen and sixteen), and the second packet obtained by processing the first packet on the basis of the sixth EVPN control plane includes a private network tag of the backbone MAC-VRF instance or does not include the private network tag of the backbone MAC-VRF instance (referring to exemplary embodiment fifteen).

In an embodiment, a source IP of the second packet is routable in the underlay network or is non-routable in the underlay network (referring to exemplary embodiments one, two, seven to eighteen).

In an embodiment, IP address resources of the underlay network can be saved by using the non-routable source IP in the underlay network.

In an embodiment, when the source IP of the second packet is non-routable in the underlay network, before the step S206, the method further includes at least one of: adding, in an outer layer of the source IP of the second packet, an MPLS encapsulation corresponding to a destination IP in the same IP header as the source IP (referring to exemplary embodiment thirteen), where the source IP is not in a routing table where the destination IP is located; setting the value of a protocol type field in an internet protocol version 4 (IPv4) header of each second packet to a first designated value (referring to exemplary embodiment eight); setting the value of a next header field in an IPv6 header of each second packet to a second designated value (referring to exemplary embodiment nine); or setting the value of an Ethernet type (ethertype) field in an outer Ethernet header corresponding to the IP header of each second packet to a third designated value (referring to exemplary embodiment ten).

Figure 3:
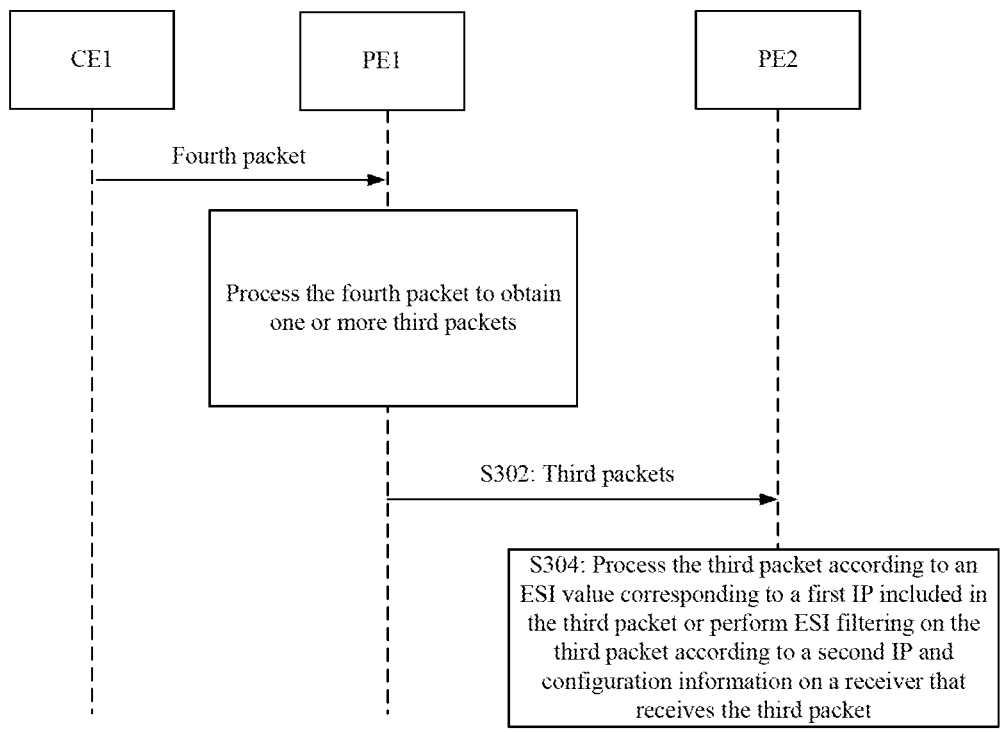
FIG. 3 is a flowchart of a packet processing method according to an embodiment.

This embodiment further provides a packet processing method, which is applicable to the topology shown in FIG. 1. The packet processing method may be performed by a PE node. A description is given below using an example in which the packet sending method is performed by the node PE 1 shown in FIG. 1 and a packet is sent from the node CE 1 to the node PE 2 via the node PE 1. FIG. 3 is a flowchart of a packet processing method according to an embodiment. As shown in FIG. 3, the method includes the steps described below.

In step S302: the node PE 2 receives a third packet sent by a first provider edge (PE) node, where the first PE node processes a fourth packet received from a first AC to obtain the third packet and the third packet includes a first IP. The first IP includes a second IP or an IP obtained from encryption of part bits of the second IP with an intrinsic entropy value of the fourth packet. The second IP is one of: an ESI IP of an ESI corresponding to the first AC, an IP obtained from a modification to a designated bit of the ESI IP of the ESI corresponding to the first AC according to a Root/Leaf attribute of the first AC, an IP obtained from replacement of part bits of the ESI IP of the ESI corresponding to the first AC with a VLAN ID value corresponding to the first AC, a third IP, or an IP obtained from a modification to a designated bit of the third IP according to the Root/Leaf attribute of the first AC. The ESI corresponding to the first AC is an ESI bound to a main interface to which the first AC belongs. The ESI IP of the ESI is an IP address corresponding to the ESI. The VLAN ID value corresponding to the first AC is configured in the first AC and used for matching the fourth packet. The third IP is determined through a PE node where the first AC is located and a local index of the ESI corresponding to the first AC on the PE node or determined through a VPN domain to which the PE node where the first AC is located belongs and the local index of the ESI corresponding to the first AC on the PE node.

In step S304, the third packet is processed according to an ESI value corresponding to the first IP included in the third packet or ESI filtering is performed on the third packet according to the second IP and configuration information on a receiver that receives the third packet.

According to the preceding steps, the first IP included in the third packet carries related information about the ESI corresponding to the first AC that receives the fourth packet, so that traffic, for example, VXLAN traffic or the like, related to the third packet can support an ESI function and the problem in which the VXLAN traffic cannot support the ESI is solved.

In an embodiment, the first PE may be the node PE 1. The third packet is equivalent to the second packet in the embodiment of the packet sending method described above, and the fourth packet is equivalent to the first packet in the embodiment of the packet sending method described above.

In an embodiment, processing the third packet according to the ESI value corresponding to the first IP in step S304 may include: mirroring the third packet to a designated server when the ESI value corresponding to the first IP included in the third packet is a first designated value, performing designated quality of service (QoS) processing on the third packet when the ESI value corresponding to the first IP included in the third packet is a second designated value, or performing performance statistics on the third packet by using a performance statistics counter bound to a third designated value when the ESI value corresponding to the first IP included in the third packet is the third designated value.

In an embodiment, performing the ESI filtering on the third packet according to the second IP and the configuration information on the receiver that receives the third packet in step 304 may include: determining one or more designated packets according to the third packet, determining a second AC for sending each designated packet, and performing the ESI filtering on each designated packet according to the second IP and configuration information of the second AC of each designated packet. The configuration information includes at least one of a Root/Leaf attribute of the second AC of each designated packet or an IP corresponding to the second AC of each designated packet.

In an embodiment, the IP corresponding to the second AC may include at least one of: an ESI IP of an ESI corresponding to the second AC, an IP obtained from a modification to a designated bit of the ESI IP of the ESI corresponding to the second AC according to the Root/Leaf attribute of the second AC, an IP obtained from replacement of part bits of the ESI IP of the ESI corresponding to the second AC with a VLAN ID value corresponding to the second AC, a third IP, or an IP obtained from a modification to a designated bit of the third IP according to the Root/Leaf attribute of the second AC. The ESI corresponding to the second AC is an ESI bound to a main interface to which the second AC belongs. The ESI IP of the ESI is an IP address corresponding to the ESI. The VLAN ID value corresponding to the second AC is configured in the second AC and used for matching the first packet. The fourth IP is determined through a PE node where the second AC is located and a local index of the ESI corresponding to the second AC on the PE node or determined through a VPN domain to which the PE node where the second AC is located belongs and the local index of the ESI corresponding to the second AC on the PE node.

In an embodiment, the step of performing the ESI filtering on each designated packet according to the second IP and the configuration information of the second AC of each designated packet may include: in the case where a main interface to which the second AC of each designated packet belongs is bound to a non-zero ESI or the value of the Root/Leaf attribute of the second AC of each designated packet is Leaf and in the case where the second IP and each second AC satisfy a first predetermined condition, discarding each designated packet. The second IP is the second IP or the IP obtained by decrypting part bits of the second IP by using the intrinsic entropy value of the fourth packet.

The first predetermined condition includes at least one of the following: the second IP is equal to the IP corresponding to the second AC of each designated packet (referring to exemplary embodiment one); the value of a designated binary bit in the second IP is 1 and the value of the Root/Leaf attribute of the second AC of each designated packet is Leaf (referring to exemplary embodiment twelve); the value of the designated binary bit in the second IP is 0 and the value of the Root/Leaf attribute of the second AC of each designated packet is Leaf (referring to exemplary embodiment twelve); IP1^IP2<(m+1) (referring to exemplary embodiment two), where ^ denotes a bitwise logical exclusive OR operator; or (IP1 & IP2) & Flag=Flag (referring to exemplary embodiment twelve), where & denotes a bitwise logical AND operator, Flag denotes a predetermined value, and only one binary bit in Flag has a value of 1, where IP1 denotes the second IP, IP2 denotes the IP corresponding to the second AC of each designated packet, and m denotes an IP-address inverse mask. The IP-address inverse mask is obtained from a bitwise negation operation on an IP-address mask of an ESI IP corresponding to the ESI bound to the main interface to which the second AC of each designated packet belongs.

In an embodiment, the preceding third IP may include a first part and a second part. The first part includes the local index. The second part includes at least one of a designated part of a designated IP address configured on the first PE node where the first AC is located, where the third IP of each AC on the PE node includes the designated part; a common binary-bit part of attribute values configured for ESI-by-ESI through the same configuration command on the first PE node; or a common binary-bit part of designated IP addresses configured through the same configuration command on PE nodes of a VPN domain to which the second packet belongs. The VPN domain is a set of PE nodes for sending or receiving the second packet.

In an embodiment, the preceding local index may include at least one of an ESI value, an ESI alias value, an ESI local distinguishment value or an ESI intra-domain distinguishment value. The ESI alias value is a value configured for an attribute of the ESI corresponding to the first AC, where the ESI corresponding to the first AC differs from other ESIs on the node where the first AC is located in the attribute. The ESI local distinguishment value is the value of a first designated field in the ESI corresponding to the first AC, where the first designated fields corresponding to different ESIs have different values on the first PE node. The ESI intra-domain distinguishment value is the value of a second designated field in the ESI corresponding to the first AC, where the second designated fields corresponding to different ESIs have different values in a VPN domain to which the first PE node.

In one embodiment, the first IP is located at one of the following positions of the third packet: a source IP or an IPv6 option header.

In an embodiment, the first PE processes the fourth packet based on at least one of the following control planes to obtain the third packet: a first EVPN control plane, a second EVPN control plane, a third EVPN control plane, a fourth EVPN control plane, a fifth EVPN control plane or a sixth EVPN control plane. The first EVPN control plane issues, through routing, not only a correspondence between the ESI IP and the ESI or a correspondence between information in the third IP and the ESI, but also a MAC entry of AC learning to which an EVPN instance bound to the first AC is bound. The second EVPN control plane does not issue the correspondence between the ESI IP and the ESI or the correspondence between the information in the third IP and the ESI through routing, but issues, through routing, the MAC entry of the AC learning to which the EVPN instance bound to the first AC is bound. The third EVPN control plane issues the correspondence between the ESI IP and the ESI or the correspondence between the information in the third IP and the ESI through routing, but does not issue, through routing, the MAC entry of the AC learning to which the EVPN instance bound to the first AC is bound. The fourth EVPN control plane does not issue the correspondence between the ESI IP and the ESI or the correspondence between the information in the third IP and the ESI through routing, and does not issue, through routing, the MAC entry of the AC learning to which the EVPN instance bound to the first AC is bound. The fifth EVPN control plane issues the correspondence between the ESI IP and the ESI or the correspondence between the information in the third IP and the ESI in a backbone IP-VRF instance, where the backbone IP-VRF instance is an IP-VRF instance to which the EVPN instance bound to the first AC is bound. The sixth EVPN control plane issues the correspondence between the ESI IP and the ESI or the correspondence between the information in the third IP and the ESI in a backbone MAC-VRF instance, where the backbone MAC-VRF instance is an L2VPN instance to which the EVPN instance bound to the first AC is bound.

In one embodiment, the source IP of the third packet is routable in an underlay network or is non-routable in the underlay network.

In an embodiment, the source IP of the third packet is not route reachable in the underlay network when satisfying one of the following conditions: the value of a protocol type field in an IPv4 header of the third packet is a first designated value, the value of a next header field in an IPv6 header of the third packet is a second designated value, the value of an ethertype field in an outer Ethernet header corresponding to an IP header of the third packet is a third designated value, a designated bit of the source IP of the third packet is a fourth designated value, or a designated bit of a destination IP of the third packet is a fifth designated value and a designated bit of the source IP of the third packet is a sixth designated value.

In an embodiment, the first designated value, the second designated value, the third designated value, the fourth designated value, the fifth designated value and the sixth designated value may be, but not necessarily, set according to actual needs.

In an embodiment, when the source IP of the third packet is not routable in the underlay network, the preceding step S304 may be at least one of: performing no URPF check (referring to the explanation of a service unaware node in exemplary embodiment one), performing the URPF check according to a designated routing table (referring to exemplary embodiment eight) and the source IP of the third packet, sending no fifth packet (referring to exemplary embodiment one), sending the fifth packet according to the designated routing table (referring to exemplary embodiment one), performing no RPF check when the destination IP of the third packet is a multicast IP (referring to exemplary embodiment ten), or performing the RPF check according to the designated routing table and the source IP of the third packet when the destination IP of the third packet is the multicast IP (referring to exemplary embodiment ten). The designated routing table is different from a routing table for forwarding the third packet according to the destination IP of the third packet, and the fifth packet is generated when the third packet satisfies a predetermined condition.

In an embodiment, the preceding method further includes performing one of the following operations on the third packet when the source IP of the third packet is non-routable in the underlay network: performing no URPF check (referring to the explanation of the service unaware node in exemplary embodiment one), performing the URPF check according to the designated routing table (referring to exemplary embodiment eight) and the source IP of the third packet, sending no fifth packet (referring to exemplary embodiment one), sending the fifth packet according to the designated routing table (referring to exemplary embodiment one), performing no RPF check when the destination IP of the third packet is the multicast IP (referring to exemplary embodiment ten), or performing the RPF check according to the designated routing table and the source IP of the third packet when the destination IP of the third packet is the multicast IP (referring to exemplary embodiment ten). The designated routing table is different from the routing table for forwarding the third packet according to the destination IP of the third packet, and the fifth packet is generated when the third packet satisfies the predetermined condition.

From the description of the embodiments described above, it may be understood by those skilled in the art that the method of any embodiment described above may be implemented by means of software plus a general-purpose hardware platform, may be implemented by hardware, or may take a form of a software product. The computer software product is stored in a storage medium (for example, a read-only memory (ROM)/random access memory (RAM), a magnetic disk and an optical disk) and includes multiple instructions for enabling a terminal device (for example, a mobile phone, a computer, a server or a network device) to perform the method of any one of the embodiments described above.

Embodiment Two

This embodiment further provides a packet sending apparatus, which is configured to implement the preceding embodiment. What has been described will not be repeated. As used below, the term "module" may be software, hardware or a combination thereof capable of implementing predetermined functions. The apparatuses in the embodiment described below may be implemented by the software, but implementation by the hardware or by a combination of the software and the hardware is also possible and conceived.

Figure 4:
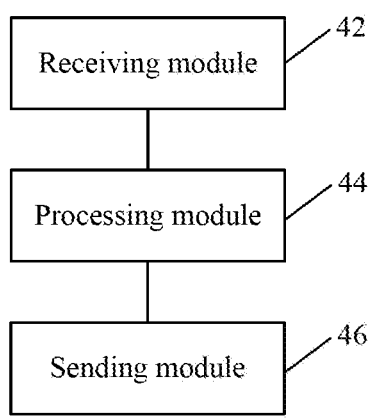
FIG. 4 is a structural block diagram of a packet sending apparatus according to an embodiment.

FIG. 4 is a structural block diagram of a packet sending apparatus according to an embodiment. The sending apparatus may be located in a PE node in the architecture shown in FIG. 1. A description is given below using an example in which the sending apparatus is located in the node PE 1 shown in FIG. 1. The sending apparatus includes a receiving module 42, a processing module 44 and a sending module 46. The receiving module 42 is configured to receive a first packet from a first AC. The processing module 44 is connected to the receiving module 42 and configured to process the first packet to obtain one or more second packets, where each second packet includes a first IP. The first IP includes a second IP or an IP obtained by encrypting part bits of the second IP with an intrinsic entropy value of the first packet. The second IP is one of: an ESI IP of an ESI corresponding to the first AC, an IP obtained from a modification to a designated bit of the ESI IP of the ESI corresponding to the first AC according to a Root/Leaf attribute of the first AC, an IP obtained from replacement of part bits of the ESI IP of the ESI corresponding to the first AC with a VLAN ID value corresponding to the first AC, a third IP, or an IP obtained from a modification to a designated bit of the third IP according to the Root/Leaf attribute of the first AC. The ESI corresponding to the first AC is an ESI bound to a main interface to which the first AC belongs. The ESI IP of the ESI is an IP address corresponding to the ESI. The VLAN ID value corresponding to the first AC is configured in the first AC and used for matching the first packet. The third IP is determined through a PE node where the first AC is located and a local index of the ESI corresponding to the first AC on the PE node or determined through a VPN domain to which the PE node where the first AC is located belongs and the local index of the ESI corresponding to the first AC on the PE node. The sending module 46 is connected to the processing module 44 and configured to send each second packet.

According to the preceding apparatus, the first IP included in each second packet carries related information about the ESI corresponding to the first AC for receiving the first packet, so that traffic, for example, VXLAN traffic or the like, related to each second packet can support an ESI function and the problem in which the VXLAN traffic cannot support the ESI is solved.

In an embodiment, the first IP carries the related information about the ESI, that is, packets sent from different ESIs of the same PE include related information about their respect ESI, so that these packets can be distinguished by using the related information about their respect ESI when received at a remote end. In this way, the problem in which the packets received from different ESIs of the same PE cannot be distinguished when forwarded to the remote end can be solved, and the total traffic from the same ESI reaching the same remote PE node via different adjacent PE nodes can be calculated.

In an embodiment, the encapsulation may be an IP encapsulation, and in this mode some effects of a PBB EVPN can be achieved without using a PBB and an MPLS encapsulation.

Additionally, according to an embodiment of the method described above, the first IP carries the Root/Leaf attribute of the first AC, so that MPLS EVPN traffic can be extended from an E-LAN into an E-TREE without using a VNI label stack structure in a packet.

In an embodiment, the IP obtained from the modification to the designated bit of the ESI IP according to Root in the case where the value of the Root/Leaf attribute of the first AC is Root is different from the IP obtained from the modification to the designated bit of the ESI IP according to Leaf in the case where the value of the Root/Leaf attribute of the first AC is Leaf; and the IP obtained from the modification to the designated bit of the third IP according to Root in the case where the value of the Root/Leaf attribute of the first AC is Root is different from the IP obtained from the modification to the designated bit of the third IP according to Leaf in the case where the value of the Root/Leaf attribute of the first AC is Leaf.

In an embodiment, the third IP may include a first part and a second part. The first part includes the local index. The second part includes at least one of a designated part of a designated IP address configured on the PE node where the first AC is located, where the third IP of each AC on the PE node includes the designated part; a common binary-bit part of designated attribute values configured ESI-by-ESI through the same configuration command on the PE node where the first AC is located; or a common binary-bit part of designated IP addresses configured through the same configuration command on PE nodes of a VPN domain to which the second packet belongs. The VPN domain is a set of PE nodes for sending or receiving the second packet.

In an embodiment, the local index is unique to an ESI on the PE node where the ESI is located, that is, the local index uniquely, but is not necessarily, identifies an ESI corresponding to the local index on the PE node.

In an embodiment, the local index may include at least one of: an ESI value, an ESI alias value, an ESI local distinguishment value or an ESI intra-domain distinguishment value. The ESI alias value is a value configured for an attribute of the ESI corresponding to the first AC, where the ESI corresponding to the first AC differs from other ESIs on the node where the first AC is located in the attribute. The ESI local distinguishment value is the value of a first designated field in the ESI corresponding to the first AC, where the first designated fields corresponding to different ESIs have different values on the PE node where the first AC is located. The ESI intra-domain distinguishment value is the value of a second designated field in the ESI corresponding to the first AC, where the second designated fields corresponding to different ESIs have different values in the VPN domain to which the PE node where the first AC is located belongs.

In an embodiment, in the case where the preceding third IP is an IPv6, the local index may be, but is not limited to, the ESI value.

In one embodiment, the preceding first IP is located at one of the following positions of each second packet: a source IP or an IPv6 option header.

In one embodiment, the preceding processing module 54 is configured to process the first packet based on at least one of: a first EVPN control plane, a second EVPN control plane, a third EVPN control plane, a fourth EVPN control plane, a fifth EVPN control plane or a sixth EVPN control plane. The first EVPN control plane issues, through routing, not only a correspondence between the ESI IP and the ESI or a correspondence between information in the third IP and the ESI, but also a MAC entry of AC learning to which an EVPN instance bound to the first AC is bound. The second EVPN control plane does not issue the correspondence between the ESI IP and the ESI or the correspondence between the information in the third IP and the ESI through routing, but issues, through routing, the MAC entry of the AC learning to which the EVPN instance bound to the first AC is bound. The third EVPN control plane issues the correspondence between the ESI IP and the ESI or the correspondence between the information in the third IP and the ESI through routing, but does not issue, through routing, the MAC entry of the AC learning to which the EVPN instance bound to the first AC is bound. The fourth EVPN control plane does not issue the correspondence between the ESI IP and the ESI or the correspondence between the information in the third IP and the ESI through routing, and does not issue, through routing, the MAC entry of the AC learning to which the EVPN instance bound to the first AC is bound. The fifth EVPN control plane issues the correspondence between the ESI IP and the ESI or the correspondence between the information in the third IP and the ESI in a backbone IP-VRF instance, where the backbone IP-VRF instance is an IP-VRF instance to which the EVPN instance bound to the first AC is bound. The sixth EVPN control plane issues the correspondence between the ESI IP and the ESI or the correspondence between the information in the third IP and the ESI in a backbone MAC-VRF instance, where the backbone MAC-VRF instance is an L2VPN instance to which the EVPN instance bound to the first AC is bound.

In an embodiment, when processing the first packet based on the second EVPN control plane or the fourth EVPN control plane, the processing module 44 may not depend on the correspondence between the ESI IP and the ESI or the correspondence between the information in the third IP and the ESI.

In an embodiment, when the processing module 44 processes the first packet based on the fifth EVPN control plane, each second packet does not include a private network tag of the backbone IP-VRF instance or includes the private network tag of the backbone IP-VRF instance; and when the processing module 44 processes the first packet based on the sixth EVPN control plane, each second packet does not include a private network tag of the backbone MAC-VRF instance or includes the private network tag of the backbone MAC-VRF instance.

In one embodiment, in the case where the source IP of each second packet is used as a destination IP, the source IP is routable in an underlay network or non-routable in the underlay network.

IP address resources of the underlay network can be saved by using the source IP non-routable in the underlay network.

In an embodiment, when the source IP of each second packet is non-routable in the underlay network, the preceding processing module 54 is configured to perform at least one of the following operations: adding, outside the source IP of each second packet, an MPLS encapsulation corresponding to a destination IP in the same IP header as the source IP, where the source IP is not in a routing table where the destination IP is located; setting the value of a protocol type field in an IPv4 header of each second packet to a first designated value; setting the value of a next header field in an IPv6 header of each second packet to a second designated value; or setting the value of an Ethernet type (ethertype) field in an outer Ethernet header corresponding to the IP header of each second packet to a third designated value.

Figure 5:
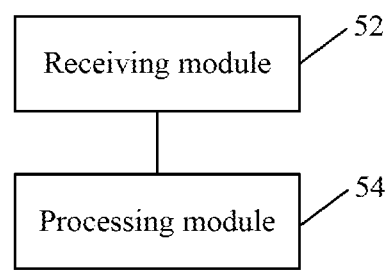
FIG. 5 is a structural block diagram of a packet processing apparatus according to an embodiment.

This embodiment further provides a packet processing apparatus, which may be located in a PE node shown in FIG. 1. A description is given below using an example in which the apparatus is located in the node PE 2 shown in FIG. 1. FIG. 5 is a structural block diagram of a packet processing apparatus according to an embodiment. As shown in FIG. 5, the apparatus includes a receiving module 52 and a processing module 54. The receiving module 52 is configured to receive a third packet sent by a first provider edge (PE) node, where the first PE node processes a fourth packet received from a first AC to obtain the third packet and the third packet includes a first IP. The first IP includes a second IP or an IP obtained from encryption of part bits of the second IP with an intrinsic entropy value of the fourth packet. The second IP is one of: an ESI IP of an ESI corresponding to the first AC, an IP obtained from a modification to a designated bit of the ESI IP of the ESI corresponding to the first AC according to a Root/Leaf attribute of the first AC, an IP obtained from replacement of part bits of the ESI IP of the ESI corresponding to the first AC with a VLAN ID value corresponding to the first AC, a third IP, or an IP obtained from a modification to a designated bit of the third IP according to the Root/Leaf attribute of the first AC. The ESI corresponding to the first AC is an ESI bound to a main interface to which the first AC belongs. The ESI IP of the ESI is an IP address corresponding to the ESI. The VLAN ID value corresponding to the first AC is configured in the first AC and used for matching the fourth packet. The third IP is determined through a PE node where the first AC is located and a local index of the ESI corresponding to the first AC on the PE node or determined through a VPN domain to which a PE node where the first AC is located belongs and the local index of the ESI corresponding to the first AC on the PE node. The processing module 54 is connected to the preceding receiving module 52 and configured to process the third packet according to an ESI value corresponding to the first IP included in the third packet or perform ESI filtering on the third packet according to the second IP and configuration information on a receiver receiving the third packet.

According to the preceding apparatus, the first IP included in the third packet carries related information about the ESI corresponding to the first AC for receiving the first packet, so that traffic, for example, VXLAN traffic or the like, related to the fourth packet can support an ESI function and the problem in which the VXLAN traffic cannot support the ESI is solved.

In an embodiment, the preceding first PE may be the node PE 1. The preceding third packet is equivalent to the second packet in embodiment of the packet sending method described above, and the preceding fourth packet is equivalent to the first packet in the embodiment of the packet sending method described above.

In an embodiment, the processing module 54 is configured to process the third packet in at least one of the following manners according to the ESI value corresponding to the first IP included in the third packet: mirroring the third packet to a designated server when the ESI value corresponding to the first IP included in the third packet is a first designated value, performing designated quality of service (QoS) processing on the third packet when the ESI value corresponding to the first IP included in the third packet is a second designated value, or performing performance statistics on the third packet by using a performance statistics counter bound to a third designated value when the ESI value corresponding to the first IP included in the third packet is the third designated value.

In an embodiment, the preceding processing module 54 is configured to perform the ESI filtering on the third packet according to the second IP and the configuration information on the receiver receiving the third packet in the following manner: determining one or more designated packets according to the third packet, determining a second AC for sending each designated packet, and performing the ESI filtering on each designated packet according to the second IP and configuration information of the second AC of each designated packet. The configuration information includes at least one of a Root/Leaf attribute of the second AC of each designated packet or an IP corresponding to the second AC of each designated packet.

In an embodiment, the processing module 54 is configured to perform the ESI filtering on each designated packet according to the second IP and the configuration information of the second AC of each designated packet in the following manner: in the case where a main interface to which the second AC of each designated packet belongs is bound to a non-zero ESI or the value of the Root/Leaf attribute of the second AC is Leaf and in the case where the second IP and the second AC of each designated packet satisfy a first predetermined condition, discarding each designated packet.

The first predetermined condition includes at least one of the following: the second IP is equal to the IP corresponding to the second AC; the value of a designated binary bit in the second IP is 1 and the value of the Root/Leaf attribute of the second AC of each designated packet is Leaf; the value of the designated binary bit in the second IP is 0 and the value of the Root/Leaf attribute of the second AC is Leaf; IP1^IP2<(m+1), where ^ denotes a bitwise logical exclusive OR operator; or (IP1 & IP2) & Flag=Flag, where & denotes a bitwise logical AND operator, Flag denotes a predetermined value, and only one binary bit in Flag has a value of 1, where IP1 denotes the second IP, IP2 denotes the IP corresponding to the second AC, and m denotes an IP-address inverse mask. The IP-address inverse mask is obtained from a bitwise negation operation on an IP-address mask of an ESI IP corresponding to the ESI bound to the main interface to which the second AC belongs.

In an embodiment, the third IP may include a first part and a second part. The first part includes the local index. The second part includes at least one of: a designated part of a designated IP address configured on the first PE node, where the third IP of each AC on the PE node includes the designated part, or a common binary-bit part of designated attribute values configured ESI-by-ESI through the same configuration command on the first PE node, or a common binary-bit part of designated IP addresses configured through the same configuration command on each PE node of a VPN domain to which the one or more second packets belong. The VPN domain is a set of PE nodes for sending or receiving the one or more second packets.

In an embodiment, the local index may include at least one of: an ESI value, an ESI alias value, an ESI local distinguishment value or an ESI intra-domain distinguishment value. The ESI alias value is a value configured for an attribute of the ESI corresponding to the first AC, where the ESI corresponding to the first AC differs from other ESIs on the node where the first AC is located in the attribute. The ESI local distinguishment value is the value of a first designated field in the ESI corresponding to the first AC, where the first designated fields corresponding to different ESIs have different values on the first PE node. The ESI intra-domain distinguishment value is the value of a second designated field in the ESI corresponding to the first AC, where the second designated fields corresponding to different ESIs have different values in a VPN domain to which the first PE node belongs.

In one embodiment, the first IP is located at one of the following positions of the third packet: the outermost source IP or an IPv6 option header.

In an embodiment, the first PE processes the fourth packet on the basis of the following control planes to obtain the third packet: a first EVPN control plane, a second EVPN control plane, a third EVPN control plane, a fourth EVPN control plane, a fifth EVPN control plane or a sixth EVPN control plane. The first EVPN control plane issues, through routing, not only a correspondence between the ESI IP and the ESI or a correspondence between information in the third IP and the ESI, but also a MAC entry of AC learning to which an EVPN instance bound to the first AC is bound. The second EVPN control plane does not issue the correspondence between the ESI IP and the ESI or the correspondence between the information in the third IP and the ESI through routing, but issues, through routing, the MAC entry of the AC learning to which the EVPN instance bound to the first AC is bound. The third EVPN control plane issues the correspondence between the ESI IP and the ESI or the correspondence between the information in the third IP and the ESI through routing, but does not issue, through routing, the MAC entry of the AC learning to which the EVPN instance bound to the first AC is bound. The fourth EVPN control plane does not issue the correspondence between the ESI IP and the ESI or the correspondence between the information in the third IP and the ESI through routing, and does not issue, through routing, the MAC entry of the AC learning to which the EVPN instance bound to the first AC is bound. The fifth EVPN control plane issues the correspondence between the ESI IP and the ESI or the correspondence between the information in the third IP and the ESI in a backbone IP-VRF instance, where the backbone IP-VRF instance is an IP-VRF instance to which the EVPN instance bound to the first AC is bound. The sixth EVPN control plane issues the correspondence between the ESI IP and the ESI or the correspondence between the information in the third IP and the ESI in a backbone MAC-VRF instance, where the backbone MAC-VRF instance is an L2VPN instance to which the EVPN instance bound to the first AC is bound.

In one embodiment, in the case where a source IP of the third packet is used as a destination IP, the source IP is routable in an underlay network or non-routable in the underlay network.

In an embodiment, the source IP of the third packet is route-unreachable in the underlay network when satisfying one of the following conditions: the value of a protocol type field in an IPv4 header of the third packet is a first designated value, the value of a next header field in an IPv6 header of the third packet is a second designated value, the value of an ethertype field in an outer Ethernet header corresponding to an IP header of the third packet is a third designated value, a designated bit of the source IP of the third packet is a fourth designated value, or a designated bit of the destination IP of the third packet is a fifth designated value and a designated bit of the source IP of the third packet is a sixth designated value.

In an embodiment, the first designated value, the second designated value, the third designated value, the fourth designated value, the fifth designated value and the sixth designated value may be, but not necessarily, set according to actual needs.

In an embodiment, when the source IP of the third packet is non-routable in the underlay network, the preceding processing module is further configured to perform at least one of the following operations on the third packet: performing no URPF check, performing the URPF check according to a designated routing table and the source IP of the third packet, sending no fifth packet, sending the fifth packet according to the designated routing table, performing no RPF check when the destination IP of the third packet is a multicast IP, or performing the RPF check according to the designated routing table and the source IP of the third packet when the destination IP of the third packet is the multicast IP. The designated routing table is different from a routing table for forwarding the third packet according to the destination IP of the third packet, and the fifth packet is generated when the third packet satisfies a predetermined condition.

In an embodiment, the preceding various modules may be implemented by software or hardware. Implementation by the hardware may, but may not necessarily, be performed in the following manner: the preceding various modules are located in the same processor or located in their respective processors in any combination form.

Embodiment Three

Figure 6:
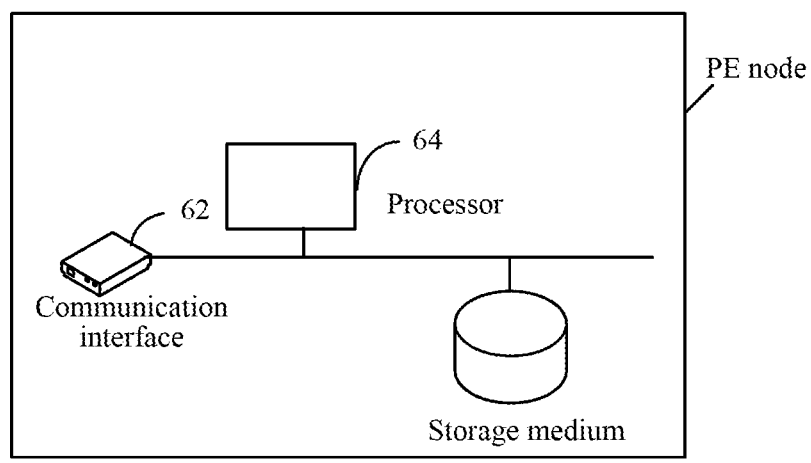
FIG. 6 is a schematic diagram of a PE node according to an embodiment.

This embodiment further provides a PE node, which may be, but not limited to, a PE node in the architecture shown in FIG. 1. FIG. 6 is a schematic diagram of a PE node according to an embodiment. As shown in FIG. 6, the PE node includes a communication interface 62 and a processor 64. The communication interface 62 is configured to receive a first packet from a first access circuit (AC). The processor 64 is connected to the preceding communication interface 72 and configured to process the first packet to obtain one or more second packets. Each second packet includes a first IP. The first IP includes a second IP or an IP obtained from encryption of part bits of the second IP with an intrinsic entropy value of the first packet. The second IP is one of an ESI IP of an ESI corresponding to the first AC, an IP obtained from a modification to a designated bit of the ESI IP of the ESI corresponding to the first AC according to a Root/Leaf attribute of the first AC, an IP obtained from replacement of part bits of the ESI IP of the ESI corresponding to the first AC with a VLAN ID value corresponding to the first AC, a third IP, or an IP obtained from a modification to a designated bit of the third IP according to the Root/Leaf attribute of the first AC. The ESI corresponding to the AC is an ESI bound to a main interface to which the first AC belongs. The ESI IP of the ESI is an IP address corresponding to the ESI. The VLAN ID value corresponding to the first AC is configured in the first AC and used for matching the first packet. The third IP is determined through a PE node where the first AC is located and a local index of the ESI corresponding to the first AC on the PE node or determined through a VPN domain to which the PE node where the first AC is located belongs and the local index of the ESI corresponding to the first AC on the PE node. The communication interface 62 is further configured to send each second packet.

According to the preceding PE node, the first IP included in a third packet carries related information about the ESI corresponding to the first AC for receiving the first packet, so that traffic, for example, VXLAN traffic or the like, related to a fourth packet can support an ESI function and the problem in which the VXLAN traffic cannot support the ESI is solved.

In this embodiment, the first IP carries the related information about the ESI, that is, packets sent from different ESIs of the same PE include related information about their respect ESI, so that these packets can be distinguished by using the related information about their respect ESI when received at a remote end. In this way, the problem in which the packets received from different ESIs of the same PE cannot be distinguished when forwarded to the remote end can be solved, and the total traffic from the same ESI and reaching the same remote PE node via different adjacent PE nodes can be calculated.

In an embodiment, the preceding encapsulation may be an IP encapsulation, and in this mode some effects of a PBB EVPN can be achieved without using a PBB and an MPLS encapsulation.

Additionally, according to an embodiment of the method described above, the first IP carries the Root/Leaf attribute of the first AC, so that MPLS EVPN traffic can be extended from an E-LAN into an E-TREE without using a VNI tag stack structure in a packet.

In an embodiment, the IP obtained from the modification to the designated bit of the ESI IP according to Root in the case where the value of the Root/Leaf attribute of the first AC is Root is different from the IP obtained from the modification to the designated bit of the ESI IP according to Leaf in the case where the value of the Root/Leaf attribute of the first AC is Leaf; and the IP obtained from the modification to the designated bit of the third IP according to Root in the case where the value of the Root/Leaf attribute of the first AC is Root is different from the IP obtained from the modification to the designated bit of the third IP according to Leaf in the case where the value of the Root/Leaf attribute of the first AC is Leaf.

In an embodiment, the third IP may include a first part and a second part. The first part includes the local index. The second part includes at least one of a designated part of a designated IP address configured on the PE node where the first AC is located, where the third IP of each AC on the PE node includes the designated part; a common binary-bit part of designated attribute values configured ESI-by-ESI through the same configuration command on the PE node where the first AC is located; or a common binary-bit part of designated IP addresses configured through the same configuration command on PE nodes of a VPN domain to which the one or more second packets belong. The VPN domain is a set of PE nodes for sending or receiving the one or more second packets.

In an embodiment, the preceding local index is unique to an ESI on the PE node where the ESI is located, that is, the local index uniquely, but is not necessarily, identifies an ESI corresponding to the local index on the PE node.

In an embodiment, the preceding local index may include at least one of an ESI value, an ESI alias value, an ESI local distinguishment value or an ESI intra-domain distinguishment value. The ESI alias value is a value configured for an attribute of the ESI corresponding to the first AC, where the ESI corresponding to the first AC differs from other ESIs on the node where the first AC is located in the attribute. The ESI local distinguishment value is the value of a first designated field in the ESI corresponding to the first AC, where the first designated fields corresponding to different ESIs have different values on the first PE node. The ESI intra-domain distinguishment value is the value of a second designated field in the ESI corresponding to the first AC, where the second designated fields corresponding to different ESIs have different values in the VPN domain to which the PE node where the first AC is located belongs.

In an embodiment, in the case where the third IP is an IPv6, the preceding local index may be, but is not limited to, the ESI value.

In one embodiment, the preceding first IP is located at one of the following positions of each second packet: a source IP or an IPv6 option header.

In one embodiment, the preceding processor 64 is configured to process the first packet on the basis of at least one of a first EVPN control plane, a second EVPN control plane, a third EVPN control plane, a fourth EVPN control plane, a fifth EVPN control plane or a sixth EVPN control plane. The first EVPN control plane issues, through routing, not only a correspondence between the ESI IP and the ESI or a correspondence between information in the third IP and the ESI, but also a MAC entry of AC learning to which an EVPN instance bound to the first AC is bound. The second EVPN control plane does not issue the correspondence between the ESI IP and the ESI or the correspondence between the information in the third IP and the ESI through routing, but issues, through routing, the MAC entry of the AC learning to which the EVPN instance bound to the first AC is bound. The third EVPN control plane issues the correspondence between the ESI IP and the ESI or the correspondence between the information in the third IP and the ESI through routing, but does not issue, through routing, the MAC entry of the AC learning to which the EVPN instance bound to the first AC is bound. The fourth EVPN control plane does not issue the correspondence between the ESI IP and the ESI or the correspondence between the information in the third IP and the ESI through routing, and does not issue, through routing, the MAC entry of the AC learning to which the EVPN instance bound to the first AC is bound. The fifth EVPN control plane issues the correspondence between the ESI IP and the ESI or the correspondence between the information in the third IP and the ESI in a backbone IP-VRF instance, where the backbone IP-VRF instance is an IP-VRF instance to which the EVPN instance bound to the first AC is bound. The sixth EVPN control plane issues the correspondence between the ESI IP and the ESI or the correspondence between the information in the third IP and the ESI in a backbone MAC-VRF instance, where the backbone MAC-VRF instance is an L2VPN instance to which the EVPN instance bound to the first AC is bound.

In an embodiment, when processing the first packet on the basis of the second EVPN control plane or the fourth EVPN control plane, the preceding processor 64 may not depend on the correspondence between the ESI IP and the ESI or the correspondence between the information in the third IP and the ESI.

In an embodiment, when the preceding processor 64 processes the first packet on the basis of the fifth EVPN control plane, the obtained second packet does not include a private network tag of the backbone IP-VRF instance or includes the private network tag of the backbone IP-VRF instance; and when the preceding processor 44 processes the first packet on the basis of the sixth EVPN control plane, the obtained second packet does not include a private network tag of the backbone MAC-VRF instance or includes the private network tag of the backbone MAC-VRF instance.

In one embodiment, in the case where the source IP of the second packet is used as a destination IP, the source IP is routable in an underlay network or non-routable in the underlay network.

IP address resources of the underlay network can be saved by using the source IP non-routable in the underlay network.

In an embodiment, when the source IP of each second packet is non-routable in the underlay network, the preceding processor 64 is further configured to perform at least one of the following operations: adding, outside the source IP of each second packet, an MPLS encapsulation corresponding to a destination IP in the same IP header as the source IP, where the source IP is not in a routing table where the destination IP is located; setting the value of a protocol type field in an IPv4 header of each second packet to a first designated value; setting the value of a next header field in an IPv6 header of each second packet to a second designated value; or setting the value of an ethertype field in an outer Ethernet header corresponding to the IP header of each second packet to a third designated value.

This embodiment further provides another node, which may be located on a PE node shown in FIG. 1. The structure of the PE node in this embodiment is similar to the structure of the PE node shown in FIG. 6 and is not repeated here. The node includes a communication interface and a processor. The communication interface is configured to receive a third packet sent by a first provider edge (PE) node, where the first PE node processes a fourth packet received from a first AC to obtain the third packet and the third packet includes a first IP. The first IP includes a second IP or an IP obtained from encryption of part bits of the second IP with an intrinsic entropy value of the fourth packet. The second IP is one of: an ESI IP of an ESI corresponding to the first AC, an IP obtained from a modification to a designated bit of the ESI IP of the ESI corresponding to the first AC according to a Root/Leaf attribute of the first AC, an IP obtained from replacement of part bits of the ESI IP of the ESI corresponding to the first AC with a VLAN ID value corresponding to the first AC, a third IP, or an IP obtained from a modification to a designated bit of the third IP according to the Root/Leaf attribute of the first AC. The ESI corresponding to the first AC is an ESI bound to a main interface to which the first AC belongs. The ESI IP of the ESI is an IP address corresponding to the ESI. The VLAN ID value corresponding to the first AC is configured in the first AC and used for matching the fourth packet. The third IP is determined through a PE node where the first AC is located and a local index of the ESI corresponding to the first AC on the PE node or determined through a VPN domain to which the PE node where the first AC is located belongs and the local index of the ESI corresponding to the first AC on the PE node. The processor is connected to the preceding communication interface and configured to process the third packet according to an ESI value corresponding to the first IP included in the third packet or perform ESI filtering on the third packet according to the second IP and configuration information on a receiver receiving the third packet.

According to the preceding apparatus, the first IP included in the second packet carries related information about the ESI corresponding to the first AC for receiving a first packet, so that traffic, for example, VXLAN traffic or the like, related to each second packet can support an ESI function and the problem in which the VXLAN traffic cannot support the ESI is solved.

In an embodiment, the preceding first PE may be node PE 1. The preceding third packet is equivalent to the second packet in the embodiment of the packet sending method described above, and the preceding fourth packet is equivalent to the first packet in the embodiment of the packet sending method described above.

In an embodiment, the preceding processor is configured to process the third packet in at least one of the following manners according to the ESI value corresponding to the first IP included in the third packet: mirroring the third packet to a designated server when the ESI value corresponding to the first IP included in the third packet is a first designated value, performing designated quality of service (QoS) processing on the third packet when the ESI value corresponding to the first IP included in the third packet is a second designated value, or performing performance statistics on the third packet by using a performance statistics counter bound to a third designated value when the ESI value corresponding to the first IP included in the third packet is the third designated value.

In an embodiment, the preceding processor is configured to perform the ESI filtering on the third packet according to the second IP and the configuration information on the receiver receiving the third packet in the following manner: determining one or more designated packets according to the third packet, determining a second AC for sending each designated packet, and performing the ESI filtering on each designated packet according to the second IP and configuration information of the second AC of each designated packet. The configuration information includes at least one of a Root/Leaf attribute of the second AC of each designated packet or an IP corresponding to the second AC of each designated packet.

In an embodiment, the processor performs the ESI filtering on each designated packet according to the second IP and the configuration information of the second AC of each designated packet in the following manner: in the case where a main interface to which the second AC of each designated packet belongs is bound to a non-zero ESI or the value of the Root/Leaf attribute of the second AC is Leaf and in the case where the second IP and the second AC of each designated packet satisfy a first predetermined condition, discarding each designated packet. The second IP is the second IP or an IP obtained by decrypting part bits of the second IP by using the intrinsic entropy value of the fourth packet.

The preceding first predetermined condition includes at least one of the following: the second IP is equal to the IP corresponding to the second AC; the value of a designated binary bit in the second IP is 1 and the value of the Root/Leaf attribute of the second AC is Leaf; the value of the designated binary bit in the second IP is 0 and the value of the Root/Leaf attribute of the second AC is Leaf; $IP1\char`\^IP2<(m+1)$, where $\char`\^$ denotes a bitwise logical exclusive OR operator; or (IP1 & IP2) & Flag=Flag, where & denotes a bitwise logical AND operator, Flag denotes a predetermined value, and only one binary bit in Flag has a value of 1, where IP1 denotes the second IP, IP2 denotes the IP corresponding to the second AC, and m denotes an IP-address inverse mask. The IP-address inverse mask is obtained from a bitwise NOT operation on an IP-address mask of an ESI IP corresponding to the ESI bound to the main interface to which the second AC belongs.

In an embodiment, the preceding third IP may include a first part and a second part. The first part includes the local index. The second part includes at least one of: a designated part of a designated IP address configured on the first PE node, where the third IP of each AC on the PE node includes the designated part; a common binary-bit part of designated attribute values configured ESI-by-ESI through the same configuration command on the first PE node; or a common binary-bit part of designated IP addresses configured through the same configuration command on PE nodes of a VPN domain to which the one or more second packets belong. The VPN domain is a set of PE nodes for sending or receiving the one or more second packets.

In an embodiment, the preceding local index may include at least one of an ESI value, an ESI alias value, an ESI local distinguishment value or an ESI intra-domain distinguishment value. The ESI alias value is a value configured for an attribute of the ESI corresponding to the first AC, where the ESI corresponding to the first AC differs from other ESIs on the node where the first AC is located in the attribute. The ESI local distinguishment value is the value of a first designated field in the ESI corresponding to the first AC, where the first designated fields corresponding to different ESIs have different values of on the first PE node. The ESI intra-domain distinguishment value is the value of a second designated field in the ESI corresponding to the first AC, where the second designated fields corresponding to different ESIs have different values in a VPN domain to which the first PE node.

In one embodiment, the first IP is located at one of the following positions of the third packet: the outermost layer source IP or an IPv6 option header.

In an embodiment, the first PE processes the fourth packet on the basis of the following control planes to obtain the third packet: a first EVPN control plane, a second EVPN control plane, a third EVPN control plane, a fourth EVPN control plane, a fifth EVPN control plane or a sixth EVPN control plane. The first EVPN control plane issues, through routing, not only a correspondence between the ESI IP and the ESI or a correspondence between information in the third IP and the ESI, but also a MAC entry of AC learning to which an EVPN instance bound to the first AC is bound. The second EVPN control plane does not issue the correspondence between the ESI IP and the ESI or the correspondence between the information in the third IP and the ESI through routing, but issues, through routing, the MAC entry of the AC learning to which the EVPN instance bound to the first AC is bound. The third EVPN control plane issues the correspondence between the ESI IP and the ESI or the correspondence between the information in the third IP and the ESI through routing, but does not issue, through routing, the MAC entry of the AC learning to which the EVPN instance bound to the first AC is bound. The fourth EVPN control plane does not issue the correspondence between the ESI IP and the ESI or the correspondence between the information in the third IP and the ESI through routing, and does not issue, through routing, the MAC entry of the AC learning to which the EVPN instance bound to the first AC is bound. The fifth EVPN control plane issues the correspondence between the ESI IP and the ESI or the correspondence between the information in the third IP and the ESI in a backbone IP-VRF instance, where the backbone IP-VRF instance is an IP-VRF instance to which the EVPN instance bound to the first AC is bound. The sixth EVPN control plane issues the correspondence between the ESI IP and the ESI or the correspondence between the information in the third IP and the ESI in a backbone MAC-VRF instance, where the backbone MAC-VRF instance is an L2VPN instance to which the EVPN instance bound to the first AC is bound.

In one embodiment, in the case where the source IP of the third packet is used as a destination IP, the source IP is routable in an underlay network or non-routable in the underlay network.

In an embodiment, the source IP of the third packet is not route reachable in the underlay network when satisfying one of the following conditions: the value of a protocol type field in an IPv4 header of the third packet is a first designated value, the value of a next header field in an IPv6 header of the third packet is a second designated value, the value of an ethertype field in an outer Ethernet header corresponding to an IP header of the third packet is a third designated value, a designated bit of the source IP of the third packet is a fourth designated value, or a designated bit of the destination IP of the third packet is a fifth designated value and a designated bit of the source IP of the third packet is a sixth designated value.

In this embodiment, the first designated value, the second designated value, the third designated value, the fourth designated value, the fifth designated value and the sixth designated value may be, but not necessarily, set according to actual needs.

In an embodiment, when the source IP of the third packet is non-routable in the underlay network, the preceding processing module is further configured to perform at least one of the following operations: performing no URPF check, performing the URPF check according to a designated routing table and the source IP of the third packet, sending no fifth packet, sending the fifth packet according to the designated routing table, performing no RPF check when the destination IP of the third packet is a multicast IP, or performing the RPF check according to the designated routing table and the source IP of the third packet when the destination IP of the third packet is the multicast IP. The designated routing table is different from a routing table for forwarding the third packet according to the destination IP of the third packet, and the fifth packet is generated when the third packet satisfies a predetermined condition.

Embodiment Four

This embodiment further provides a packet processing system, which includes a first node and a second node. The first node is configured to receive a first packet from a first access circuit (AC), process the first packet to obtain one or more second packets and send the one or more second packets to the second node. Each second packet includes a first IP. The first IP includes a second IP or an IP obtained from encryption of part bits of the second IP with an intrinsic entropy value of the first packet. The second IP is one of: an ESI IP of an ESI corresponding to the first AC, an IP obtained from a modification to a designated bit of the ESI IP of the ESI corresponding to the first AC according to a Root/Leaf attribute of the first AC, an IP obtained from replacement of part bits of the ESI IP of the ESI corresponding to the first AC with a VLAN ID value corresponding to the first AC, a third IP, or an IP obtained from a modification to a designated bit of the third IP according to the Root/Leaf attribute of the first AC. The ESI corresponding to the first AC is an ESI bound to a main interface to which the first AC belongs. The ESI IP of the ESI is an IP address corresponding to the ESI. The VLAN ID value corresponding to the first AC is configured in the first AC and used for matching the first packet. The third IP is determined through a provider edge (PE) node where the first AC is located and a local index of the ESI corresponding to the first AC on the PE node or determined through a VPN domain to which the PE node where the first AC is located belongs and the local index of the ESI corresponding to the first AC on the PE node. The second node is configured to process each second packet according to an ESI value corresponding to the first IP included in each second packet or perform ESI filtering on each second packet according to the second IP and configuration information on a receiver receiving each second packet.

In an embodiment, the first node may be a PE node shown in FIG. 6 in embodiment three described above, that is, the PE node sending each second packet in embodiment three described above, and the second node may be another node in embodiment three described above, that is, the node for receiving the third packet. For the explanation of the first node and the second node, see embodiment three, which will not be repeated here.

Embodiment Five

This embodiment further provides a storage medium, which includes a stored program. When the program is executed, the method of any one of the embodiments described above is performed.

In this embodiment, the preceding storage medium may include, but is not limited to, at least one of a USB disk, a ROM, a RAM, a mobile hard disk, a magnetic disk, an optical disk or another medium capable of storing program codes.

This embodiment further provides a processor, which is configured to execute a program. When the program runs, the steps in any one of the methods described above are performed.

For examples in this embodiment, see the examples described in the embodiments described above, which will not be repeated in this embodiment.

The disclosure will be described below in conjunction with exemplary embodiments.

Figure 7:
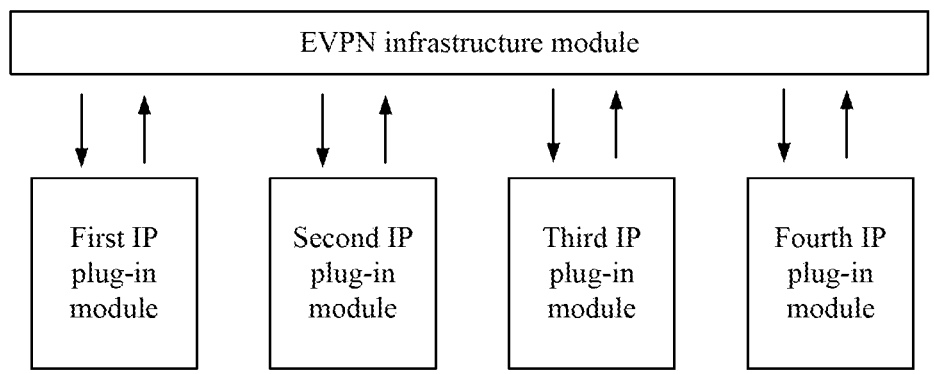
FIG. 7 is a structural diagram of a PE node according to another embodiment.

FIG. 7 is a structural diagram of a PE node according to an exemplary embodiment. As shown in FIG. 7, the PE node includes an EVPN infrastructure module, a first IP plug-in module, a second IP plug-in module, a third IP plug-in module and a fourth IP plug-in module. The first IP plug-in module, the second IP plug-in module, the third IP plug-in module and the fourth IP plug-in module are optional. A description is given below using the second IP plug-in module as an example. The second IP plug-in module is optional, that is, the preceding PE node may include the second IP plug-in module, or may not include the second IP plug-in module. In an embodiment, whether the PE node includes the second IP plug-in module may, but not necessarily, be set according to needs.

The preceding EVPN infrastructure module may, but not necessarily, perform functions similar to functions of the receiving module 42 and the sending module 46 described above and part functions of the processing module 44 described above, or may perform functions of the communication interface 62 and part functions of the processor 64 described above.

The first IP plug-in module, the second IP plug-in module, the third IP plug-in module and the fourth IP plug-in module described above may, but not necessarily, perform, in combination, in partial combination or individually, part functions of the processing module 44 or the processor 64 described above.

Figure 8:
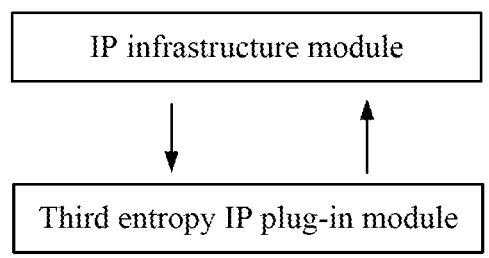
FIG. 8 is a structural diagram of a service unaware node according to an embodiment.

FIG. 8 is a structural diagram of a service unaware node according to an embodiment. As shown in FIG. 8, the service unaware node includes an IP basic setting module and a third entropy IP plug-in module. In this embodiment, the third entropy IP plug-in module is optional, that is, the service unaware node may include the third entropy IP plug-in module, or may not include the third entropy IP plug-in module. Whether the service unaware node includes the third entropy IP plug-in module may, but not necessarily, be set according to needs.

In an embodiment, the IP basic setting module may, but not necessarily, perform part functions of the communication interface 62 and the processor 64 described above, and the third entropy IP plug-in module may, but not necessarily, perform part functions of the processor 64 described above.

The exemplary embodiments described below will be used to describe preceding functions of the modules included in the PE node or the service unaware node described above.

This exemplary embodiment provides an apparatus (system) for avoiding an ESI inner loop of EVPN traffic. The PE node provided by this exemplary embodiment includes a standard EVPN control plane module and a standard EVPN forwarding-table management module. The standard EVPN control plane module manages a VXLAN control plane as specified in RFC7348, and also manages routing and forwarding of an underlay network required for the deployment of a VXLAN, such as a multiprotocol-border gateway protocol (MP-BGP) session and the like. The standard EVPN forwarding-table management module manages multiple forwarding tables of the VXLAN as specified in RFC7348.

The apparatus further includes an ESI alias mapping module, which determines an ESI alias value for a designated ESI. The ESI alias value may be designated explicitly or extracted from a certain field of the ESI. Moreover, this module delivers a mapping relationship between the ESI alias value and the ESI configured by a user to a new EVPN forwarding module. The ESI alias mapping module further determines a designated forwarder (DF)/non-DF role of each AC corresponding to the ESI. The effect of the DF/non-DF role in a forwarding process is defined as in RFC7432, but a method for determining whether each AC is the DF role or the non-DF role is not limited to RFC7432.

The new EVPN forwarding module implements all functions of the VXLAN as specified in RFC7348 except for the differences described below. This module can read an ESI alias value corresponding to an ESI to which an AC interface belongs and record the ESI alias value as an ESI alias value of the AC. This module can read an underlay source IP address of a broadcast, unknown unicast and multicast (BUM) packet with a VXLAN encapsulation, and record the underlay source IP address as an ESI alias value of the packet. This module can compare the ESI alias value of the BUM packet with an ESI alias value of a forwarding and export AC of the BUM packet, the packet is discarded if the ESI alias value of the BUM packet is the same as the ESI alias value of the forwarding and export AC of the BUM packet, and the packet is allowed for subsequent forwarding if the ESI alias value of the BUM packet is different from the ESI alias value of the forwarding and export AC of the BUM packet. For ease of description, this rule is referred to as an ESI IP check rule of a VXLAN data packet in the present disclosure, and a process of checking an ESI IP according to this rule is referred to as an ESI IP check process. Compared with RFC7348, this module can further identify an IPv6 segment routing (SRv 6) and an End.dx2 encapsulation packet on the basis of an IPv6, and an SRv6 segment identifier (SID) of an End.dx2 type is used to perform functions of a VNI and a VXLAN tunnel end point (VTEP) IP to a VXLAN instance in RFC7348. See exemplary embodiment five.

The method for avoiding an ESI inner loop of EVPN traffic provided by this exemplary embodiment includes the basic steps described below.

In step 1, VXLAN traffic is deployed according to a VXLAN-traffic deployment mode defined in RFC7348, where each PE node implements the ESI alias mapping module and the new EVPN forwarding module. Thus, through this step, the VXLAN traffic already has basic functions of the VXLAN traffic defined in RFC 7348.

In step 2, each ESI (non-zero) in an EVPN network is mapped to an ESI alias value, where different ESIs (non-zero) are mapped to different ESI alias values, and each PE node in the EVPN network is mapped to one ESI alias value that is used as a common ESI alias value for all ACs whose ESIs are zero on the PE node. The same ESI (non-zero) is mapped to the same ESI alias value on different PE nodes. For ease of description, the above rule is referred to as an ESI alias rule (equivalent to the preceding mapping).

In step 3, on each node, the mapping between all local ESIs and their respective ESI alias values on the node is configured through a configuration interface provided by the ESI alias mapping module. This includes the case where the ESI is zero and the case where the ESI is non-zero.

Through a VXLAN EVPN enhancement node provided by this exemplary embodiment, the problem in which the basic VXLAN traffic defined in RFC7348 does not support an ESI function is solved, a networking limitation of a local bias mechanism defined in [EVPN Overlay] to the ESI is avoided, and traffic statistics of VXLAN encapsulation packets are accuracy to the ESI.

Exemplary Embodiment One

The implementation of a PE node of a technical solution of a method and apparatus (system) in which transmission is an outer IP header and an entropy value of an inner packet is used is described in conjunction with FIG. 7.

1: The EVPN infrastructure module is implemented.

If the VXLAN EVPN traffic is implemented according to draft-ietf-bess-evpn-overlay ([EVPN overlay]), then a obtained control plane module of the VXLAN EVPN traffic is a control plane part of the VPN infrastructure module.

Similarly, if the VXLAN EVPN traffic is implemented according to [EVPN overlay], then a forwarding plane module of the VXLAN EVPN traffic is a forwarding plane part of the VPN infrastructure module.

The EVPN control plane module obtained from the above method includes related configuration of an L2VPN EVPN address family of an MP-BGP protocol, configuration of an EVPN instance, binding configuration of the AC and the EVPN instance, related configuration of the ESI and the like. The EVPN instance is identified by the VNI from user configuration.

In this module, a VXLAN tunnel and a binding relationship between the VXLAN tunnel and the EVPN instance are dynamically generated through the MP-BGP session as specified in [EVPN Overlay] protocol.

When this module is implemented as software, it needs to implement the following plug-in mechanism. The first packet is encapsulated into one or more X-th packets according to a forwarding process of [EVPN Overlay], where the X-th packet is an IP packet having no corresponding link layer encapsulation (for example, an MAC header). Then, each X-th packet is processed in the following manner. Firstly, the first IP plug-in is called to modify each X-th packet, and then the second IP plug-in is called to modify each X-th packet. After the second IP plug-in, the X-th packet is forwarded according to the [EVPN Overlay] process that including adding corresponding multiple outer encapsulations (including the link layer encapsulation) to each X-th packet according to a destination IP to obtain the second packet, and sending the second packet. After a receiving end receives the third packet and determines that the third packet includes a VXLAN encapsulation to be terminated, all other packet headers outer than an outer IP header of the VXLAN encapsulation are stripped, and a Y packet (in which the outer IP header remains) is obtained. An EVPN instance to which the Y packet belongs is determined through a VNI in the Y-th packet. Then, before the Y-th packet is processed in the EVPN instance, the third IP plug-in is called to modify the Y-th packet. The obtained packet continues to be processed according to the process defined in [EVPN Overlay] in the EVPN instance, and one or more Z-th packets are obtained, for each of the one or more Z-th packets, an export AC is determined for sending the Z-th packet. Accordingly, the fourth IP plug-in is called with each Z-th packet and the export AC of each Z-th packet as parameters, and if the fourth IP plug-in does not discard each Z-th packet, then the process in [EVPN Overlay] continues.

Different from the EVPN infrastructure module, when receiving the BUM packet from the AC, this module ignores a recommendation for implementing the local bias mechanism in [EVPN Overlay] section 8.3.1 and still cannot forward the BUM packet to an AC of the non-DF role as specified in RFC7432.

In an exemplary embodiment, the underlay network is configured to an IPv4 network, so both a source IP and a destination IP of the EVPN tunnel are IPv4 addresses.

Different from the VPN infrastructure module, when a destination IP of the Y-th packet matches a direct route prefix corresponding to an interface for the source IP of the EVPN tunnel, this module determines that the Y-th packet matches the tunnel and does not check whether a source IP of the Y-th packet matches the destination IP of the EVPN tunnel.

2: A method for implementing the first IP plug-in module is described below.

This module designates, through configuration, that when the higher 16 bits of the source IP of the received Y-th packet are the same as higher 16 bits of designated 16-bit route prefix (Prefix1/16), the Y-th packet is processed according to the following rules: (1) when the third packet triggers a passive packet returning, the packet is returned to designated IP address S1; and (2) when the third packet triggers a source IP reachability check, the check is ignored.

When Prefix1/16 is designated to have the effect described above, Prefix1 is referred to as a source-IP specific black-hole route prefix of this node in this specification. There may be multiple source-IP specific black-hole route prefixes. For ease of description, one node is configured to have only one source-IP specific black-hole route prefix here.

When receiving a callback of the EVPN infrastructure, this module overwrites the higher 16 bits of a source IP of each X-th packet with the higher 16 bits of the source-IP specific black-hole route prefix, and then returns the modified packet to the EVPN infrastructure module.

3: A method for implementing the second IP plug-in module is described below.

This module designates a locally unique 16-bit ESI alias value corresponding to each local ESI through configuration. When receiving the callback of the EVPN infrastructure, this module overwrites the lower 16 bits of the source IP of the second packet with an ESI alias value of an ESI corresponding to a main interface to which an import AC of the first packet encapsulated by each X-th packet belongs, and then returns the modified packet to the EVPN infrastructure module.

4: A method for implementing the third IP plug-in module is described below.

This module returns the Y-th packet without modification to the EVPN infrastructure module.

5: A method for implementing the fourth IP plug-in module is described below.

If the ESI of the export AC of the Z-th packet is zero, then the Z-th packet is directly returned to the EVPN infrastructure module.

If the ESI of the export AC of the Z-th packet is not zero, this module compares the lower 16 bits of a source IP of the Z-th packet with an ESI alias value of an ESI corresponding to a main interface to which the export AC belongs, discards the packet if the lower 16 bits are equal to the ESI alias value, and returns the packet to the EVPN infrastructure module for further processing if the lower 16 bits are not equal to the ESI alias value.

In this exemplary embodiment, since the ESI alias value is unique among ESI alias values of all ESIs in the VPN domain to which the second packet belongs, the ESI alias value may be used for packet statistics. Statistical data of packets from different ESIs at the remote end is recorded into different counters, so that the accuracy of packet statistics is improved.

The implementation of a service unaware node of the technical solution of the method and apparatus (system) in which transmission is in the outer IP header and an entropy value of an inner packet is used is described in conjunction with FIG. 8.

1: The IP infrastructure module is implemented.

Basic IPv4 routing and IPv4 forwarding functions are implemented. The IPv4 forwarding function includes a load balancing function on the basis of a multi-chase-link aggregation group (MC-LAG), and the load balancing function uses IP 5-tuple as the entropy calculation factor.

This module performs forwarding only based on an IP header (including the IPv6 option header) of the X-th packet.

This module performs IP forwarding on the X-th packet whose destination IP is not a local direct IP address of this node, and a process of IP forwarding on the X-th packet according to the destination IP is not changed with respect to the related art.

This module specifics, through configuration, that when the route-reachability check is performed on a source IP of an IP packet whose higher 16 bits are designated value Prefix2, the entropy third IP plug-in module is called for the source IP route-reachability check.

Moreover, when the source IP of the X-th packet satisfies the condition and the passive packet returning is triggered, the entropy third IP plug-in is called for obtaining a destination IP address used for packet returning. In the related art, the source IP address of the X-th packet is directly used as the destination IP address of packet returning.

In an embodiment, this module may not perform passive packet returning when the passive packet returning is triggered. In this case, the third entropy IP plug-in does not need not be called.

2: A method for implementing the third entropy IP plug-in module is described below.

This module designates, through configuration, that when the higher 16 bits of the source IP of the X-th packet received are designated value Prefix2, the packet is processed according to the following rules: (1) when the third packet triggers the passive packet returning, the packet is returned to designated IP address S1; and (2) when the third packet triggers the source IP route-reachability check, the check is ignored.

The IP address returned by this module is designated IP address S1 corresponding to the source-IP specific black-hole route prefix.

The EVPN topology shown in FIG. 1 is used as an example, and the processing of network and traffic deployment includes the steps described below.

In step 1, the implementation of each node is selected. PE nodes defined in this exemplary embodiment are selected as nodes PE 1, PE 2 and PE 3, and service unaware nodes defined in this exemplary embodiment are selected as nodes P 1 and P 2. The nodes defined in this exemplary embodiment are used as node PE 1, PE 2, PE 3, P 1 and P 2 in the network and traffic deployment process of this exemplary embodiment and the exemplary embodiments described blow, and this will not be repeated. Both the PE node and the service unaware node defined in this exemplary embodiment are IPv4 nodes, and this means that the underlay network selected in this exemplary embodiment is the IPv4 network.

In step 2, an EVPN router ID of each PE node is configured and issued. A local loopback interface is configured for each PE node, and an IP address and a corresponding subnet mask are configured for the loopback interface. The IP address of the loopback interface is used as the EVPN router ID of the PE, and a Route prefix generated through the EVPN router ID and the subnet mask corresponding to the EVPN router ID is route-reachable (can pass the ping test) in the underlay network. EVPN router IDs of different PEs correspond to different route prefixes. In this exemplary embodiment, a subnet mask of the loopback interface has 32 bits, and IP addresses of multiple loopback interfaces all have a host identification part with a value of 1.

In step 3, the VXLAN EVPN network shown in FIG. 1 is established. MP-BGP session is configured between any two of PE 1, PE 2 and PE 3, and the related configuration of the L2VPN EVPN address family is also enabled. For ease, through an adjustment to the BGP configuration, an EVPN RT-3 route may dynamically generate all VXLAN tunnels required for traffic. In an embodiment, through the adjustment to the BGP configuration, the VXLAN tunnels generated by the RT-3 route may satisfy the following rules: only one bi-directional VXLAN tunnel is generated between any two PE nodes; at each end of any bi-directional VXLAN tunnel, the EVPN router ID of the local node is used as the source IP of the VXLAN tunnel; and for each of two ends of the same bi-directional VXLAN tunnel, a source IP of the tunnel at one end is a destination IP of the tunnel at the other end and a destination IP of the tunnel at the one end is a source IP of the tunnel at the other end. Similarly, through the adjustment to the BGP configuration, the RT-3 route can also generate binding relationships between all VXLAN tunnels and EVPN instances.

In step 4, a VXLAN EVPN service is established according to FIG. 1 and the same VNI is designated for the VXLAN EVPN traffic on each PE node. Six interfaces AC 1, AC 2, AC 3, AC 4, AC 5 and AC 6 are used as access circuits and bound to the VXLAN EVPN service. After the above configuration is completed, the MP-BGP session starts exchanging the RT-3 route according to a signaling process defined in [EVPN Overlay], so that VXLAN tunnels between different nodes can be established and bound to the VXLAN EVPN service.

In step 5, ESI basic configuration is configured. Physical interfaces through which CE 1 accesses PE 1 and PE 2 are mapped to the same ESI (denoted as ESI 1) and related configuration of ESI 1 is set, so that the MP-BGP session is triggered to perform DF negotiation and issue an RT-1 route according to an RT-4 route described in [EVPN Overlay]. Similarly, physical interfaces through which CE2 accesses PE 1 and PE 2 are mapped to the same ESI (denoted as ESI 2) and related configuration of ESI 2 is set. In this embodiment, it is assumed that a result of the DF negotiation is that AC 1 and AC 4 are non-DF interfaces of ESI 1 and ESI 2 in the services, respectively.

In step 6, ESI filtering configuration is configured. The same source-IP specific black-hole route prefix is configured on each PE node, and each non-zero ESI on the same PE is configured with one ESI alias value, so that the same non-zero ESI has the same ESI alias value on different Pes, and any two different non-zero ESIs have different ESI alias values, no matter whether the two different non-zero ESIs are located on the same PE.

Through the above steps, the VXLAN EVPN traffic is established. The forwarding behavior and effects on the PE node and the service unaware node P defined in this exemplary embodiment can be verified by using a data packet.

The EVPN topology shown in FIG. 1 is used as an example, and the processing of an end-to-end packet forwarding includes the steps described below.

In step 1, when a node PE 1 receives address resolution protocol (ARP) packet B1 (equivalent to the preceding first packet) from local AC 1, the EVPN infrastructure module forwards the packet B1, including forwarding the packet to a remote node PE 2 and a remote node PE 3 and local AC 4. However, since AC 4 is of the non-DF role according to negotiation, the copy is discarded. For ease of description, the copy of packet B1 sent to PE 2 by PE 1 is denoted as B1*b* (equivalent to the second packet described above), and the copy of packet B1 sent to PE 3 by PE 1 is denoted as B1*c*. The VXLAN encapsulations of the two copies B1*b* and B1*c* have the same outer source IP that is denoted as ESI_IP 1. The higher 16 bits of the ESI_IP 1 are the higher 16 bits of the source-IP specific black-hole route prefix, and the lower 16 bits of ESI_IP 1 are the ESI alias value.

In step 2, when the node PE 2 receives the packet B1*b*, the EVPN infrastructure module forwards the packet B1*b*, where the packet B1*b* is the BUM packet and the source IP of the packet is ESI_IP 1. When a copy of the packet is forwarded to AC 2, since an ESI alias value of an ESI corresponding to a physical interface to which AC 2 belongs is equal to the lower 16 bits of ESI_IP 1, the copy cannot be forwarded to AC 2. When another copy of the packet is forwarded to AC 5, since an ESI alias value of an ESI corresponding to a physical interface to which AC 5 belongs is not equal to the lower 16 bits of ESI_IP 1, the copy can be forwarded to AC 5. When another copy is forwarded to AC 6, since an ESI of AC 6 is zero, the filtering process according to the ESI alias value is skipped and the packet is directly forwarded via AC 6.

In step 3, when the node PE 3 receives the packet B1*c*, the EVPN infrastructure module forwards the packet B1*c* to AC 3. Since an ESI of AC 3 is zero, ESI filtering is also not required although the packet B1*c* is the BUM packet.

In step 4, when the node PE 1 receives BUM packet B4 from AC 4, according to a forwarding process similar to B1, the outer source IP of the VXLAN encapsulation is filled to ESI_IP 2. When a copy B4*c* of the packet B4 is forwarded to the node PE 3, the node PE3 counts B4*c* into two records since outer source IPs of B4*c* and B1*c* are different. However, according to the standard [EVPN Overlay] process, B4*c* and B1*c* can only be counted into one record since the VXLAN encapsulation and the outer IP encapsulation are identical. Therefore, this embodiment can implement more accurate traffic statistics than the standard [EVPN Overlay].

Combining step 1 and step 2, it can been proved that the BUM packet received from ESI 1 (AC 1) is impossible to be forwarded via adjacent links (AC 2) of ESI 1 in this embodiment, and meanwhile, in the present disclosure, when the BUM packet received from ESI 1 (AC 1) is forwarded to ESI 2 (AC 4 and AC 5), only one copy of the BUM packet is forwarded at most (since only one of AC 4 or AC 5 is of the DF role).

Exemplary Embodiment Two

The implementation of the PE node of the technical solution of the method and apparatus (system) in which transmission is in the outer IP header and an entropy value of an inner packet is used is described in conjunction with FIG. 7.

1: The EVPN infrastructure module is implemented.

This module is the same as the module having the same name in embodiment one except for what is specifically noted.

Different from in exemplary embodiment one, this module does not call the first IP plug-in module or the third IP plug-in module.

Different from in exemplary embodiment one, this module does not implement related functions of the RT-1 route in [EVPN Overlay], and this means that an ESI field of an RT-2 route issued by this module is zero.

In related art, the [EVPN Overlay] technique cannot avoid a loop within the same Ethernet segment (ES) without the RT-1 route, but the present disclosure can avoid the loop within the same Ethernet segment (ES) without the RT-1 route.

2: A method for implementing the first IP plug-in module is described below.

This module makes no change to the packet.

3: A method for implementing the second IP plug-in module is described below.

This module is the same as the module having the same name in embodiment one except for what is specifically noted.

Different from that in exemplary embodiment one, this module designates an ESI IP and a corresponding ESI IP mask for each local ESI through configuration. The higher 16 bits of the ESI IP are the same as the higher 16 bits of the source-IP specific black-hole route prefix, and the higher 16 bits of the ESI IP mask are 0x0FFFF.

Different from that in exemplary embodiment one, this module overwrites the source IP of the second packet with the ESI IP, and then returns the modified packet to the EVPN infrastructure module.

4: A method for implementing the third IP plug-in module is described below.

This module makes no change to the packet.

5: A method for implementing the fourth IP plug-in module is described below.

If the ESI of the export AC of the Z-th packet is zero, the Z-th packet is directly returned to the EVPN infrastructure module.

If the ESI of the export AC of the Z-th packet is non-zero, this module performs matching between the source IP of the third packet and the ESI IP mask and the ESI IP corresponding to the ESI corresponding to a main interface to which the export AC of the Z-th packet belongs, discards the packet if the source IP can match the ESI IP and ESI IP mask, and returns the packet to the EVPN infrastructure module for further processing if the source IP cannot match the ESI IP and ESI IP mask.

In this embodiment, the source IP of the third packet is denoted as IP1, the ESI IP is denoted as IP2 and the mask is denoted as m, and then the rule of discarding the packet is actually equivalent to discarding the packet when IP1^IP2<(m+1).

The implementation of the service unaware node of the technical solution of the method and apparatus (system) in which transmission is in the outer IP header and an entropy value of an inner packet is used is described in conjunction with FIG. 8.

1: The EVPN infrastructure module is implemented.

This module is the same as the module having the same name in exemplary embodiment one.

2: A method for implementing the third entropy IP plug-in module is described below.

This module is the same as the module having the same name in exemplary embodiment one.

The EVPN topology shown in FIG. 1 is used as an example, and the processing of the network and traffic deployment includes the steps described below.

In step 1, the implementation of each node is selected, which is the same as that in exemplary embodiment one except that multiple PE nodes and P nodes are all nodes defined in this embodiment.

In step 2, the EVPN router ID of each PE node is configured and issued, which is the same as that in embodiment one.

In step 3, the VXLAN EVPN network shown in FIG. 1 is established, which is same as that in exemplary embodiment one.

In step 4, a VXLAN EVPN service is established according to FIG. 1 and the same VNI is designated for the VXLAN EVPN service on each PE node, which is the same as that in exemplary embodiment one.

In step 5, the ESI basic configuration is configured, which is the same as that in exemplary embodiment one.

In step 6, the ESI filtering configuration is configured. This is the same as in exemplary embodiment one except that each ESI is configured with an ESI IP and a 28-bit IP address mask corresponding to the ESI IP and the higher 16 bits of the ESI IP are the same as the higher 16 bits of the source-IP specific black-hole route prefix. ESI IPs of the same ESI on different PEs have the same higher 28 bits, and ESI IPs of different ESIs have different higher 28 bits.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding part includes the steps described below.

In step 1, when a node PE 1 receives an ARP packet B1 from a local AC 1, the process of forwarding two copies B1*b* and B1*c* of the packet B1 by the EVPN infrastructure module is the same as that in exemplary embodiment one except that outer source IPs of VXLAN encapsulations of B1*b* and B1*c* become ESI_IP 2. ESI_IP 2 is an ESI IP configured on an ESI corresponding to a physical interface to which AC 1 belongs.

In step 2, when a node PE 2 receives the packet B1*b*, the process of forwarding the packet B1*b* by the EVPN infrastructure module is the same as that in exemplary embodiment one and the result of the ESI filtering is the same as that in exemplary embodiment one except that the ESI filtering rule is changed into comparing a source IP of the packet B1*b* with an ESI IP configured on an ESI corresponding to a physical interface to which each export AC belongs.

Step 3 and step 4 are the same as those in embodiment one except for the value of the outer source IP of the VXLAN encapsulation.

Since a BGP next-hop of the RT-2 route is an EVPN router ID of a route source node, the BGP next-hops of the RT-2 route in MAC advertisement learned by different adjacent PEs of the same ESI are different. As a result, in this module, VXLAN packets forwarded to the same remote ESI from different adjacent PEs have different outer destination IPs, so this module cannot support a flow-by-flow load sharing mode. However, the module still supports per service load-balance, as long as load sharing can be performed on the CE. That is, on node PE 3, the node for forwarding the packet U responded by the node CE3 for the packet W is determined based on the node passed through by the packet W sent by the CE 1, so that the PE node via which packet U is forwarded varies when the PE node via which packet W is forwarded varies and different packets U are forwarded via different PE nodes if different W packets are forwarded via different PE nodes. This implements a per service load-balance effect.

As a source IP of the packet B1*c*, the ESI IP is actually a context entropy value of the packet B1, so when the same packet B1 enters the node PE 1 via different ACs of the node PE 1 and the packets B1*c* are generated, forwarding paths selected for the packets B1*c* through a load-balance process on the P1 node are different in the two case.

In this embodiment, the context entropy value is obtained from mapping of one or more pieces of feature configuration information corresponding to an AC interface through which the packet B1 is received. In this embodiment, the feature configuration information includes ESI information corresponding to a main interface to which the AC interface belongs, the ESI IP represents the entropy of the ESI. When the packet X1 having the same byte sequence as the packet B1 is received from another AC interface, in other words, the packet X1 and packet B1 packet are different only in context, the context entropy value identifies the context.

Exemplary Embodiment Three

The implementation of the PE node of the technical solution of the method and apparatus (system) in which transmission is in the outer IP header and an entropy value of an inner packet is used is described in conjunction with FIG. 7.

1: The EVPN infrastructure module is implemented.

If the general VXLAN traffic is implemented according to RFC7348, then a control plane module of the VXLAN traffic obtained is a control plane and human-machine interface part of the VPN infrastructure module.

Similarly, if the VXLAN traffic is implemented according to RFC7348, then a forwarding plane module of the VXLAN traffic obtained is a forwarding plane part of the VPN infrastructure module.

This module is the same as the human-machine interface and the processing flow corresponding to RFC7348 described above except for what is specifically noted.

In this embodiment, the EVPN control plane module obtained according to the above method may be used in configuration of the VXLAN tunnel, the configuration of the EVPN instance, the binding configuration of the AC and the EVPN instance, binding configuration of the VXLAN tunnel and the EVPN instance and the like. The EVPN instance is identified by the VNI from the user configuration. On each of two nodes of the VXLAN tunnel, the EVPN router ID of the local-end node is used as the source IP of the VXLAN tunnel, and an EVPN router ID of the opposite-end node is used as the destination IP of the VXLAN tunnel. In this embodiment, the EVPN router ID is an IP address of a loopback interface. For ease of description, a node is configured to have only one EVPN router ID in this module.

When this module is implemented as software, the plug-in mechanism described in this paragraph needs to be implemented. The first packet is encapsulated into an X-th packet according to a forwarding process of RFC7348, where the X-th packet is an IP packet without a link layer encapsulation (for example, an MAC header). The first IP plug-in is called with the X-th packet as a parameter, and then the second IP plug-in is called with the obtained result as a parameter. After the Y-th packet is received and the EVPN instance to which the Y-th packet belongs is determined, the third IP plug-in is called with the Y-th packet as a parameter before the Y-th packet is processed in the EVPN instance. The obtained packet continues to be processed in the EVPN instance according to the process defined in RFC7348, and one or more Z-th packets and the export AC of the Z-th packet are obtained. Accordingly, the fourth IP plug-in is called with the Z-th packet and the export AC of the Z-th packet as parameters, and if the fourth IP plug-in does not discard the Z-th packet, the process in [EVPN Overlay]

continues, including adding the link layer encapsulation to the Z-th packet according to the destination IP.

In this embodiment, the plug-in mechanism may be a function call, a callback function, a polymorphic function or an independent plug-in.

A forwarding plane of this module has the same processing flow of a corresponding forwarding plane of RFC7348 except for the plug-in mechanism. The processing flow of the forwarding plane includes a BUM packet forwarding process, an MAC learning process, a unicast forwarding process and the like.

In this exemplary embodiment, the underlay network is configured to be an IPv6 network, so both the source IP and the destination IP of the EVPN tunnel are IPv6 addresses.

Additionally, when the destination IP of the third packet (equivalent to the second packet or the third packet in the embodiment described above) received by this module matches a direct route prefix corresponding to the interface for the source IP of the EVPN tunnel, this module determines that the third packet matches the tunnel and does not check whether the source IP of the third packet matches the destination IP of the EVPN tunnel.

2: A method for implementing the first IP plug-in module is described below.

This module is the same as the module having the same name in embodiment two except for what is specifically noted.

Different from in exemplary embodiment one, this module does not need to configure the source-IP specific blackhole route prefix.

Different from in exemplary embodiment one, each ESI in this module has a homonymic virtual interface, and is referred to as an ESI virtual interface and has all functions of a loopback interface.

Different from in embodiment one, the ESI IP in this module is configured on the ESI virtual interface and configured to a 128-bit IPv6 mask.

Different from in exemplary embodiment one, this module overwrites the source IP of the X-th packet with the ESI IP, and then returns the modified packet to the EVPN infrastructure module.

3: A method for implementing the second IP plug-in module is described below.

This module returns a packet input by the EVPN infrastructure module to the EVPN infrastructure module intact.

4: A method for implementing the third IP plug-in module is described below.

This module returns the packet input by the EVPN infrastructure module to the EVPN infrastructure module intact without changing the packet.

5: A method for implementing the fourth IP plug-in module is described below.

If the ESI of the export AC of the Z-th packet is zero, then the Z-th packet is directly returned to the EVPN infrastructure module.

If the ESI of the export AC of the Z-th packet is non-zero, then this module compares the source IP of the Z-th packet with an ESI IP of an ESI virtual interface corresponding to the main interface to which the export AC of the Z-th packet belongs, discards the packet if the source IP is equal to the ESI IP, and returns the packet to the EVPN infrastructure module for further processing if the source IP is not equal to the ESI IP.

The implementation of the service unaware node of the technical solution of the method and apparatus (system) in which transmission is in an outer IP header and an entropy value of an inner packet is used is described in conjunction with FIG. 8.

1: The EVPN infrastructure module is implemented.

Basic IPv6 routing and IPv6 forwarding functions are implemented. The IPv6 forwarding function includes a load balancing function based on MC-LAG, where the load balancing function uses IP 5-tuple as the entropy calculation factor.

In this embodiment, this module does not sense whether the entropy value exists in an IP packet. However, if the source IP or the destination IP of the Z-th packet already includes the entropy value of the inner packet, then entropy calculation factor automatically includes the entropy value of the inner packet, and accordingly, the obtained new entropy also includes the entropy value of the inner packet.

This module also does not need to call the third entropy IP plug-in.

2: A method for implementing the third entropy IP plug-in module is described below.

The module does not exist on these nodes which are all existing nodes in the related art.

The EVPN topology shown in FIG. 1 is used as an example, and the processing of the network and traffic deployment includes the steps described below.

In step 1, the implementation of each node is selected. This is the same as that in embodiment one except that multiple PE nodes and P nodes are all nodes defined in this embodiment.

In step 2, the EVPN router ID of each PE node is configured and issued. This is the same as that in exemplary embodiment one.

In step 3, the general VXLAN EVPN network shown in FIG. 1 is established and each VXLAN tunnel is configured. Only one bi-directional VXLAN tunnel exists between the same pair of PE nodes. When a VXLAN tunnel is configured for a designated target PE node, an EVPN router ID of the target PE node is used as a destination IP address of the VXLAN tunnel, and an EVPN router ID of the local-end node is used as a source IP address of the VXLAN tunnel. A VXLAN tunnel between PE 1 and PE 3 is used as an example of the VXLAN tunnel configured in this way. For PE 1, a source IP of the tunnel is an EVPN router ID of PE 1 and a destination IP of the tunnel is an EVPN router ID of PE 3. For PE 3, the source IP of the tunnel is the EVPN router ID of PE 3 and the destination IP of the tunnel is the EVPN router ID of PE 1.

In step 4, the VXLAN EVPN traffic is established according to FIG. 1. Six interfaces AC 1, AC 2, AC 3, AC 4, AC 5 and AC 6 are used as access circuits and are bound to the VXLAN EVPN traffic, and each VXLAN tunnel is bound to the VXLAN traffic.

In step 5, the ESI basic configuration is configured. This is the same as the corresponding step in exemplary embodiment one except that the PE node in this embodiment only issues the RT-4 route.

In step 6, the ESI filtering configuration is configured. This is the same as the corresponding step in exemplary embodiment one except that the ESI alias value in exemplary embodiment one is replaced with the ESI IP and the ESI IP is route-reachable in the underlay network.

In step 7, through the above steps, the VXLAN EVPN traffic is established and forwarding behavior and effects on the PE node and the service unaware node P defined in this exemplary embodiment can be verified by using the data packet.

The EVPN topology shown in FIG. 1 is used as an example, and the processing of the end-to-end packet forwarding part include the steps described below.

In step 1, when a node PE 1 receives an ARP packet B1 from a local AC 1, the process of forwarding two copies B1b and B1c of the packet B1 by the EVPN infrastructure module is the same as that in embodiment one except that outer source IPs of VXLAN encapsulations of B1b and B1c become ESI_IP 3. ESI_IP 3 is the ESI IP configured on the ESI corresponding to the physical interface to which AC 1 belongs.

In step 2, when a node PE 2 receives the packet B1b, the process of forwarding the packet B1b by the EVPN infrastructure module is the same as that in exemplary embodiment one and the result of the ESI filtering is the same as that in exemplary embodiment one except that the ESI filtering rule is changed into comparing the source IP of the packet B1b with the ESI IP configured on the ESI corresponding to the physical interface to which each export AC belongs.

Step 3 and step 4 are the same as those in embodiment one except for the value of the outer source IP of the VXLAN encapsulation.

Combining step 1 and step 2, it can be proved that it is impossible to forward the BUM packet received from ESI 1 (AC 1) via adjacent links (AC 2) of ESI 1 in this exemplary embodiment, and meanwhile, when the BUM packet received from ESI 1 (AC 1) is forwarded to ESI 2 (AC 4 and AC 5), only one copy of the BUM packet can be forwarded at most (since only one of AC 4 or AC 5 is the DF role). Moreover, RFC7348 does not support the ESI property originally, so a [EVPN Overlay] control plane, including at least the RT-4 route and the local bias mechanism (including the RT-1 route), needs to be introduced to support the ESI property. However, in this exemplary embodiment, the RFC7348 has the ESI property by only introducing the RT-4 route.

Different from that in exemplary embodiment one, in this embodiment, PE 2 and PE 3 also perform data plane MAC learning according to RFC7348 while forwarding two packets B1b and B1c. The MAC learning process is a standard RFC7348 process. However, since values of outer source IPs of VXLAN encapsulations of B1b and B1c are different from values of outer source IPs of standard VXLAN encapsulations in RFC7348, results of the MAC learning are also different. However, unicast forwarding of the VXLAN traffic can be normally performed, so this exemplary embodiment does not list forwarding steps of a unicast packet.

Exemplary Embodiment Four

The implementation of the PE node of the technical solution of the method and apparatus (system) in which transmission is in an outer IP header and an entropy value of an inner packet is used is described in conjunction with FIG. 7.

1: The EVPN infrastructure module is implemented.

This module is the same as the module having the same name in embodiment three except for what is specifically noted.

Different from that in exemplary embodiment three, the ESI instance in this module also has a homonymic virtual interface referred to as an EVPN instance interface, and the EVPN instance interface has all functions of the loopback interface. This means that an IP address of the EVPN instance interface serves as a local host route and is added into a routing table, and the IP address combined with an IP address mask configured on the EVPN instance interface serves as a local direct route prefix and is added into the routing table. Then, the interface (necessarily an EVPN instance interface) from which the route is generated may be known from a route entry corresponding to the local host route or the local direct route prefix.

Different from that in exemplary embodiment three, the VNI configured on the EVPN instance of this module is only a value identifying the EVPN instance and does not have the function of the VNI in RFC7348. Instead, an IP address is directly configured on the EVPN instance interface to perform the function of the VNI.

Different from that in exemplary embodiment three, each VXLAN tunnel in this exemplary embodiment is dedicated to one service, and each service deploys one VXLAN tunnel for each remote node in the service. In this exemplary embodiment, the source IP of each VXLAN tunnel is an IP address of an EVPN instance interface corresponding to an EVPN instance to which the VXLAN tunnel belongs, and the destination IP of each VXLAN tunnel is an IP address of an EVPN instance interface corresponding to an EVPN instance to which the VXLAN tunnel belongs on a destination node of the VXLAN tunnel.

Figure 10:
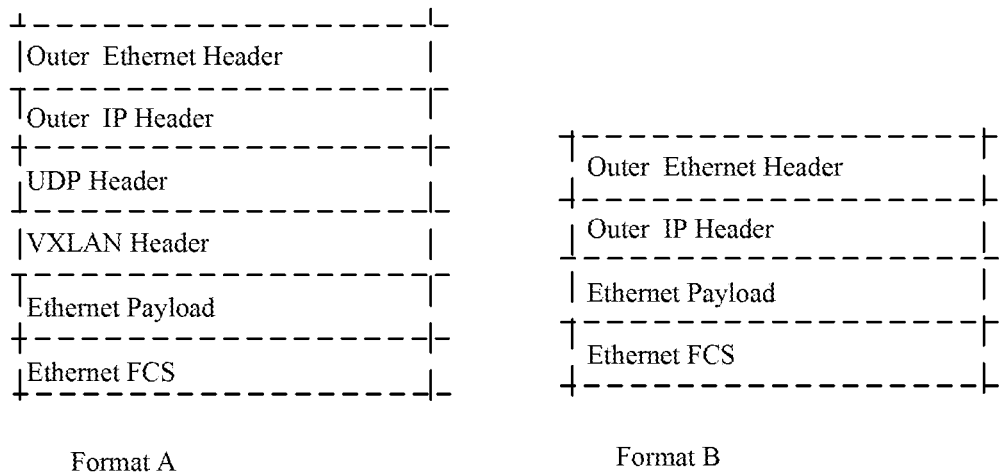
FIG. 10 is a schematic diagram of an SRv6 encapsulation format according to an embodiment.
Figure 11:
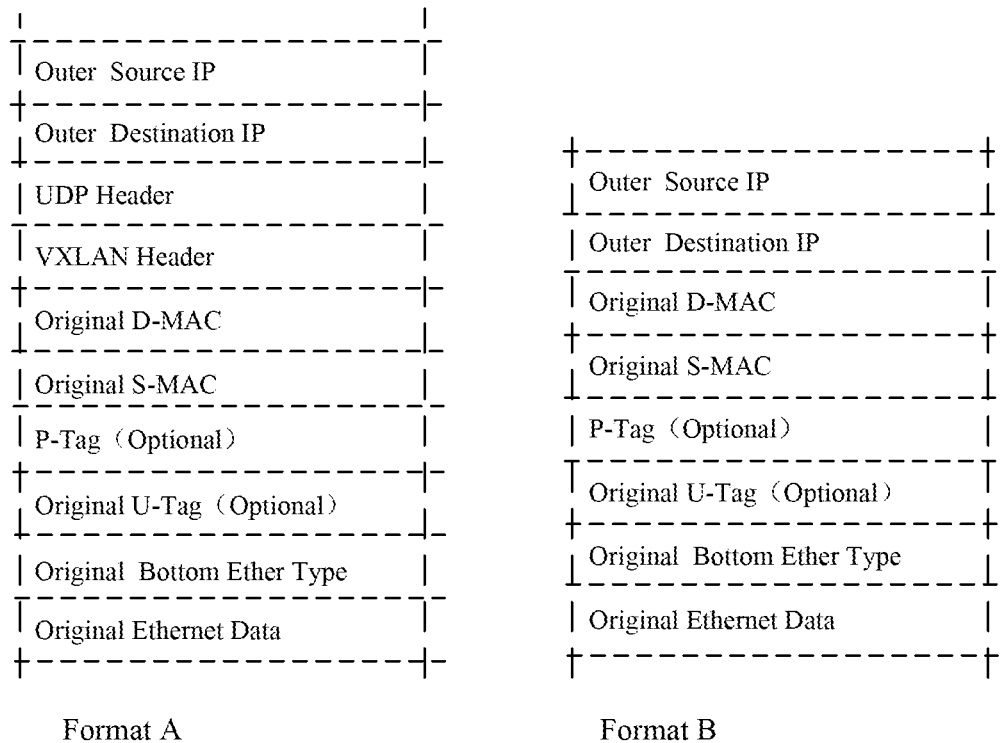
FIG. 11 is a schematic diagram of an SRv6 encapsulation format according to another embodiment.

Compared with the VXLAN encapsulation adopted in embodiment three, the encapsulation for encapsulating the first packet into the second packet used in this module does not have a user datagram protocol (UDP) header and a VXLAN header, and thus has the same format as a packet whose destination IP is the SID having the SRv6 function of the End.DX2 type. This encapsulation format is referred to as an A-type extended SRv6 encapsulation in this disclosure. As shown in format B of FIG. 10 and format B of FIG. 11, where FIG. 11 is an extension of FIG. 10, multiple fields from the source IP to the Ethernet payload data are compared. In this exemplary embodiment, the concepts of SRv6, End.DX2, SID and Function are the same as those described in section 4 of draft-filsfils-spring-srv6-network-programming-01 ([srv6-program]).

When this module receives the third packet, if the destination IP of the third packet matches a local direct route and the route is generated from an EVPN instance interface, then the third packet is regarded to have the A-type extended SRv6 encapsulation and is forwarded in the EVPN instance corresponding to the EVPN instance interface. During the forwarding except for encapsulating, de-encapsulating and special instructions, each field in format B of FIG. 11 has the same function as the field having the same name in format A of FIG. 11.

Different from that in exemplary embodiment three, when the destination IP of the third packet matches a direct network-segment route of the ESI virtual interface, the lower 12 bytes of the destination IP of the packet are used as an inner VLAN ID, and the higher 12 bytes of the lower 24 bytes of the destination IP of the packet are used as an outer VLAN ID. Then, <inner VLAN ID, outer VLAN ID, ESI virtual interface> is used to search for a corresponding sub-interface, and an EVPN instance bound to the sub-interface is used as an EVPN instance to which the packet belongs. A format used for decoding the third packet and corresponding to an IP address of an EVPN instance interface of the EVPN instance to which the packet belongs is used as a decoding format of the third packet. If both the inner VLAN ID and the outer VLAN ID are 0x3FF, then the AC is a main interface. If the inner VLAN ID is 0x3FF, then the AC is a sub-interface with a single VLAN ID. If the inner VLAN ID is not 0x3FF, then the AC is a sub-interface with double VLANs.

Different from the VPN infrastructure module, the plug-in mechanism implemented in this module is the same as that in embodiment three.

In this embodiment, the destination IP of the third packet is actually a local SID with a parameter on a PE node configured with the destination IP, and the concept of the local SID with the parameter is the concept of a local SID of format "LOC:FUNCT:ARGS" in section 3 of [srv6-program]. Actually, a new SRv6 parameter arguments (ARGS) and SRv6 Function corresponding to SRv6 ARGS are defined in this module. The concept of SRv6 Function is the concept of SRv6 Function in section 4 of [srv6-program]. This new SRv6 Function indicates that ARGS included in the lower 24 bits of the local SID are used for searching for a sub-interface matching corresponding VLAN ID information on an ESI corresponding to the SID and forwarding the third packet in an EVPN instance to which the sub-interface belongs. This embodiment may be used in conjunction with a segment routing-policy (SR-Policy) function of the SRv6. At this time, according to a packet encapsulation specification of the SR-Policy, the destination IP of the third packet is not the local SID with the parameter on a destination PE node (that is, the executing subject of this module) at first. However, the destination IP of the third packet eventually becomes the local SID on the destination PE node after being modified in an SRv6 forwarding process of at least one service unaware node or destination PE node, and the third packet is processed according to rules of the new SRv6 Function.

2: A method for implementing the first IP plug-in module is described below.

This module is the same as the module having the same name in embodiment three except for what is specifically noted.

Different from that in exemplary embodiment two, the ESI IP in this module is configured on the ESI virtual interface and configured with a 104-bit IPv6 mask.

Same as that in exemplary embodiment two, this module overwrites the source IP of the second packet with the ESI IP, and then returns the modified packet to the EVPN infrastructure module.

3: A method for implementing the second IP plug-in module is described below.

This module is the same as the module having the same name in embodiment three except for what is specifically noted.

Different from that in exemplary embodiment three, this module uses an inner VLAN ID of an import AC of the first packet as the lower 12 bits of a source IP of the packet inputted by the EVPN infrastructure module, and uses an outer VLAN ID of the import AC of the packet as the higher 12 bits of the lower 24 bits of the source IP of the packet inputted by the EVPN infrastructure module. When the import AC is not the sub-interface, both the inner VLAN ID and the outer VLAN ID are regarded as 0x3FF. When the import AC is the sub-interface configured with only a single VLAN ID, the inner VLAN ID is regarded as 0x3FF. Then, this module returns the modified packet to the EVPN infrastructure module.

4: A method for implementing the third IP plug-in module is described below.

This module is the same as the module having the same name in exemplary embodiment three.

5: A method for implementing the fourth IP plug-in module is described below.

If the ESI of the export AC of the Z-th packet is zero, then the Z-th packet is directly returned to the EVPN infrastructure module.

If the ESI of the export AC of the Z-th packet is non-zero, then this module performs matching between the source IP of the Z-th packet, and a corresponding ESI IP mask and an ESI IP of an ESI virtual interface of the ESI corresponding to the main interface to which the export AC of the Z-th packet belongs, discards the packet if the source IP can match the ESI IP and the ESI IP mask, and returns the packet to the EVPN infrastructure module for further processing if the source IP cannot match the ESI IP and the ESI IP mask.

The implementation of the service unaware node of the technical solution of the method and apparatus (system) for transmitting and using an entropy value of an inner packet in an outer IP header is described in conjunction with FIG. 8.

1: The EVPN infrastructure module is implemented.

This module is the same as the module having the same name in exemplary embodiment three.

2: A method for implementing the third entropy IP plug-in module is described below.

This module is the same as the module having the same name in exemplary embodiment three.

The EVPN topology shown in FIG. 1 is used as an example, and the processing of the network and traffic deployment includes the steps described below.

In step 1, the implementation of each node is selected, which is the same as that in exemplary embodiment three except that multiple PE nodes and P nodes are all nodes defined in this embodiment.

In step 2, the EVPN router ID of each PE node is configured and issued, which is the same as that in exemplary embodiment three.

In step 3, the general VXLAN network shown in FIG. 1 is established and each VXLAN tunnel is configured, which is the same as the corresponding step in exemplary embodiment three.

In step 4, the VXLAN EVPN traffic is established according to FIG. 1, which is the same as the corresponding step in exemplary embodiment three.

In step 5, the ESI basic configuration is configured, which is the same as the corresponding step in exemplary embodiment three.

In step 6, the ESI filtering configuration is configured, which is the same as the corresponding step in exemplary embodiment three except that the IP address mask corresponding to the ESI IP is a 104-bit mask, the 104-bit route prefix corresponding to the ESI IP is ensured to be routable in the underlay network through configuration, and the same 104-bit routing prefix is issued for the same ESI on different PEs and different 104-bit routing prefixes are issued for different ESIs.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when the node PE 1 receives an ARP packet B1 from a local AC 1, the process of forwarding two copies B1*b* and B1*c* of the packet B1 by the EVPN infrastructure module is the same as the process in exemplary embodiment three except that higher 104 bits of the outer source IP of VXLAN encapsulation of each of the two copies B1*b* and B1*c* are the same as the higher 104 bits of ESI_IP 4, and the ESI IP is configured on the ESI corresponding to the physical interface to which AC 1 belongs.

In step 2, when the node PE 2 receives the packet B1*b*, the process of forwarding the packet B1*b* by the EVPN infrastructure module is the same as that in exemplary embodiment three and the result of the ESI filtering is the same as that in exemplary embodiment three except that the ESI filtering rule is changed to comparing the higher 104 bits of the source IP of the packet B1*b* with the higher 104 bits of the ESI IP configured on the ESI corresponding to the physical interface to which each export AC belongs.

Step 3 to step 4 are the same as those in exemplary embodiment three except that packet encapsulation format is an extension SRv6 format and the value of an outer source IP is different.

In this exemplary embodiment, the ESI IP may be in the source IP or the destination IP. When the first packet is a broadcast packet, the destination IP has no ESI IP. However, when the first packet is a known unicast packet, the destination IP also includes the higher-bit part of the ESI IP.

Exemplary Embodiment Five

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in exemplary embodiment four except for what is specifically noted.

Different from that in exemplary embodiment four, this module implements signaling and the forwarding process according to [EVPN Overlay].

Different from that in exemplary embodiment four, when issuing an EVPN route for the EVPN instance, this module uses an IP address of the EVPN instance interface corresponding to the EVPN instance as a border gateway protocol (BGP) next-hop of the corresponding route. The EVPN route includes the RT-4 route, the RT-3 route, the RT-2 route and an RT-1 per Ethernet virtualization interconnection (EVI) route.

Different from that in exemplary embodiment four, when the destination IP of the received Y-th packet is an IP address of a certain EVPN instance interface, this module determines that the Y-th packet belongs to an EVPN instance corresponding to the EVPN instance interface.

Different from that in exemplary embodiment four, this module sets the configured ESI to use an ESI format that satisfies the following requirements: the ESI has a field such that fields in different ESIs on this node have different values. For ease of description, the field is referred to as a specific field.

Such a specific field exists in type 3, type 4 and type 5 defined in RFC7432 section 5, and the specific field is referred to as a local discriminator value (LDV).

Different from that in exemplary embodiment four, this module sets that only the lower 32 bits of the specific field are used if the number of bits of the specific field in the configured ESI is greater than 32.

2: A method for implementing the first IP plug-in module is described below.

This module supports configuring a loopback interface address with a 96-bit subnet mask, and the higher 96 bits of an IP address of the loopback interface are referred to as a middle-range prefix. The loopback interface forms a 96-bit route prefix corresponding to the middle-range prefix in an IP routing table and issues the routing prefix in the underlay network. When receiving a packet whose destination IP matches the route prefix, the node regards the packet as a packet of the loopback interface and performs the same processing as a packet whose destination IP is the IP address of the loopback interface.

The module overwrites the higher 96 bits of the source IP of the packet inputted by the EVPN infrastructure module with the middle-range prefix, and then returns the modified packet to the EVPN infrastructure module.

3: A method for implementing the second IP plug-in module is described below.

This module performs the bitwise logical exclusive OR operation between the lower 32 bits of the source MAC of the first packet and the value of the specific field in the ESI corresponding to the main interface to which the import AC of the encapsulated first packet inputted by the EVPN infrastructure module belongs, then uses the operation result as the lower 32 bits of the source IP, and returns the modified packet to the EVPN infrastructure module.

In this embodiment, the lower 32 bits of the source MAC are the intrinsic entropy value of the first packet, and the specific field and the higher 96 bits of the source IP are the context entropy value of the packet. The intrinsic entropy value is used to encrypt the source IP, so that the corresponding second packet can select a different load balancing path on node P1 when the source MAC of the first packet changes.

4: A method for implementing the third IP plug-in module is described below.

The lower 32 bits of the source IP address are the binary bits that need to be restored before IP address-related processing in the Y-th packet determined by this module. The binary bits are restored in the following manner: firstly, the intrinsic entropy value of the fourth packet carried on an inner layer of the Y-th packet is calculated through the same algorithm as the second IP plug-in module, then the bitwise logical exclusive OR operation is performed between the intrinsic entropy value and the lower 32 bits of the source IP address, and the result obtained is stored in the lower 32 bits of the source IP address, so that the value before the source IP address is encrypted by the second IP plug-in module is stored in the lower 32 bits of the new source IP address, that is, the value of the specific field is stored.

Then, the modified packet is returned to the EVPN infrastructure module.

5: A method for implementing the fourth IP plug-in module is described below.

If the export AC of the Z-th packet has a zero ESI, then the Z-th packet is directly returned to the EVPN infrastructure module.

If the export AC of the Z-th packet has a zero ESI, then this module compares the lower 32 bits of the source IP of the Z-th packet with the specific field in the ESI corresponding to the main interface to which the export AC of the Z-th packet belongs and compares the higher 96 bits of the source IP of the Z-th packet with the higher 96 bits of the middle-range prefix. If the source IP of the Z-th packet is equal to the specific field in the ESI corresponding to the main interface to which the export AC of the Z-th packet belongs and the higher 96 bits of the source IP of the Z-th packet are equal to the higher 96 bits of the middle-range prefix, then this module discards the packet. If the lower 32 bits of the source IP of the Z-th packet are not equal to the specific field in the ESI corresponding to the main interface to which the export AC of the Z-th packet belongs and the higher 96 bits of the source IP of the Z-th packet are not equal to the higher 96 bits of the middle-range prefix and, then this module returns the packet to the EVPN infrastructure module for further processing.

The implementation of the service unaware node of the technical solution of the method and apparatus (system) for transmitting and using an entropy value of an inner packet in an outer IP header is described in conjunction with FIG. 8.

1: The EVPN infrastructure module is implemented.

This module is the same as the module having the same name in exemplary embodiment three.

2: A method for implementing the third entropy IP plug-in module is described below.

This module is the same as the module having the same name in exemplary embodiment three.

The EVPN topology shown in FIG. 1 is used as an example, and the processing of the network and traffic deployment includes the steps described below.

In step 1, the implementation of each node is selected. This is the same as in exemplary embodiment four except that multiple PE nodes and P nodes are all nodes defined in this embodiment.

In step 2, the EVPN router ID of each PE node is configured and issued. This is the same as in exemplary embodiment four.

In step 3, the VXLAN EVPN network shown in FIG. 1 is established. This is the same as in exemplary embodiment four.

In step 4, the VXLAN EVPN traffic is established according to FIG. 1 and the same VNI is designated for the VXLAN EVPN traffic on each PE node. This is the same as in exemplary embodiment four.

In step 5, the ESI basic configuration is configured. This is the same as in exemplary embodiment four.

In step 6, the ESI filtering configuration is configured. This is the same as in exemplary embodiment four except that each node is configured with a loopback interface with a 96-bit mask, and that the higher 96 bits (referred to as the middle-range prefix) of the IP address of the loopback interface are designated as the higher 96 bits of an ESI IP of any local ESI and a local distinguishment value field in the ESI is designated as the lower 32 bits of the ESI IP. Different PE nodes in the same VPN domain have different middle-range prefixes.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding part include the steps described below.

In step 1, when a node PE 1 receives an ARP packet B1 from a local AC 1, the process of forwarding two copies B1*b* and B1*c* of the packet B1 by the EVPN infrastructure module is the same as the process in exemplary embodiment four except that outer source IPs of VXLAN encapsulations of B1*b* and B1*c* become ESI_IP 5 that is the ESI IP configured on the ESI corresponding to the physical interface to which AC 1 belongs.

In step 2, when a node PE 2 receives the packet B1*b*, the process of forwarding the packet B1*b* by the EVPN infrastructure module is the same as the forwarding process in exemplary embodiment four and the result of the ESI filtering is the same as that in exemplary embodiment four except that the ESI filtering rule is changed into comparing the source IP of packet B1*b* with the ESI IP configured on the ESI corresponding to the physical interface to which each export AC belongs.

Step 3 and step 4 are the same as those in embodiment four except for the value of an outer source IP of the extension SRv6 encapsulation.

Exemplary Embodiment Six

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in embodiment one except for what is specifically noted.

Different from in embodiment one, this module does not have corresponding functions for implementing the RT-1 route and the RT-2 route in [EVPN Overlay].

This means that this module learns remote MAC entries on the basis of the MAC learning process of RFC7348, instead of through the RT-2 route.

Figure 9:
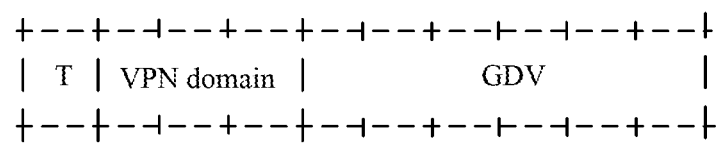
FIG. 9 is a schematic diagram of an ESI format according to an embodiment.

Different from in exemplary embodiment one, the ESI IP in this module is not only the source IP address of the X-th packet, but also the destination IP address of the X-th packet. This is determined by the MAC learning process in RFC 7348. Therefore, the ESI IP in this module is route-reachable in the underlay network Different from in embodiment one, this module sets the configured ESI with an ESI format identified by triple <ESI type, VPN domain, GDV>. The ESI type is TBD1 (whose value may need to be defined by internet assigned numbers authority (IANA), and TBD2, TBD3 and TBD4 are defined in the same way and will not be repeated later). The VPN domain is an identifier of a VPN domain. The global discriminator value (GDV) is an identifier of the ESI in the VPN domain. A possible implementation of the new ESI format is, but not necessarily, the format shown in FIG. 9. For ease of implementation, this module limits the value of the VPN domain to be not greater than 0x0FFFFFF and the value of the GDV is not greater than 0x0FF. Moreover, the value of the VPN domain is used as the higher 24 bits and the ESI alias value is used as the lower 24 bits, so that an IPv4 address denoted as <Domain:GDV> is obtained.

Different from in exemplary embodiment one, each ESI in this module has a homonymic virtual interface referred to as an ESI interface, <Domain:GDV> is an IP address of the ESI interface and the IP address is referred to as an ESI IP, and ESI IPs corresponding to other ESIs in the VPN domain are different than this ESI IP and have the same higher 24 bits as this ESI IP.

Different from in exemplary embodiment one, this module does not call the second IP plug-in module and the third IP plug-in module.

2: A method for implementing the first IP plug-in module is described below.

The module uses <Domain:GDV> as a source IP to overwrite the source IP of the packet inputted by the EVPN infrastructure module, and then returns the modified packet to the EVPN infrastructure module.

3: A method for implementing the second IP plug-in module is described below.

This module does not exist in this exemplary embodiment.

4: A method for implementing the third IP plug-in module is described below.

This module does not exist in this exemplary embodiment.

5: A method for implementing the IP fourth plug-in module is described below.

If the export AC of the Z-th packet has a zero ESI, then the Z-th packet is directly returned to the EVPN infrastructure module.

If the export AC of the Z-th packet has a non-zero ESI, this module compares the lower 8 bits of the source IP of the Z-th packet with a GDV field of the ESI corresponding to the main interface to which the export AC of the Z-th packet belongs, discards the packet if the lower 8 bits are equal to the GDV field, and returns the packet to the EVPN infrastructure module for further processing if the lower 8 bits are not equal to the GDV field.

The implementation of the service unaware node of the technical solution of the method and apparatus (system) for transmitting and using an entropy value of an inner packet in an outer IP header is described in conjunction with FIG. 8.

1: The EVPN infrastructure module is implemented.

This module is the same as the module having the same name in exemplary embodiment three except for what is specifically noted.

Different from in exemplary embodiment three, this module is based on IPv4 routing and forwarding techniques and processes IPv4 packets.

2: A method for implementing the third entropy IP plug-in module is described below.

This module is the same as the module having the same name in exemplary embodiment three except for what is specifically noted.

The EVPN topology shown in FIG. 1 is used as an example, and the processing of the network and traffic deployment includes the steps described below.

In step 1, the implementation of each node is selected, which is same as that in exemplary embodiment one except that multiple PE nodes and P nodes are all nodes defined in this exemplary embodiment.

In step 2, the EVPN router ID of each PE node is configured and issued. This is the same as that in exemplary embodiment one.

In step 3, the VXLAN EVPN network shown in FIG. 1 is established. This is the same as that in exemplary embodiment one.

In step 4, the VXLAN EVPN traffic is established according to FIG. 1 and the same VNI is designated for the VXLAN EVPN traffic on each PE node. This is the same as that in exemplary embodiment one except for turning off the RT-2 route, issuing the RT-1 route and enabling the MAC learning of the data plane.

In step 5, the ESI basic configuration is configured. This is the same as that in exemplary embodiment one.

In step 6, the ESI filtering configuration is configured. This is the same as that in exemplary embodiment one except that each ESI adopts an ESI format of type TBD1. The ESI format of type TBD1 includes a field (denoted as A) for which all ESIs in the same VPN domain have the same value, and a field (denoted as B) for which different ESIs in the VPN domain have different values. In this exemplary embodiment, the ESI IP of the ESI is composed of the lower 24 bits of A and the lower 8 bits of B.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1$b$ and B1$c$ of the packet B1 by the EVPN infrastructure module is the same as in exemplary embodiment one except that outer source IPs of VXLAN encapsulations of B1$b$ and B1$c$ become ESI_IP 6 that is the ESI IP configured on the ESI corresponding to the physical interface to which AC 1 belongs.

In step 2, when a node PE 2 receives the packet B1$b$, the process of forwarding the packet B1$b$ by the EVPN infrastructure module is the same as the forwarding process in exemplary embodiment one and the result of the ESI filtering is the same as the result of the ESI filtering in exemplary embodiment one except that the ESI filtering rule is changed into comparing the source IP of packet B1$b$ with the ESI IP configured on the ESI corresponding to the physical interface to which each export AC belongs.

Step 3 and step 4 are the same as those in embodiment one except for the value of the outer source IP of the VXLAN encapsulation.

In this exemplary embodiment, after the RT-1 route and the RT-2 route are removed, the remote MAC entries are obtained from the data plane MAC learning, and this means that only on a PE node where the MAC entries are refreshed by the data flow, the MAC entries exist stably. If no data flow actually exists to refresh the MAC entries on the PE node, the MAC entries quickly age out. Compared with EVPN control planes, for example, [EVPN Overlay] and the like, this exemplary embodiment greatly saves memory resources and CPU processing resources occupied by the MAC entries. In this way, this exemplary embodiment also has this advantage the PBB EVPN defined in RFC7623. Meanwhile, compared with RFC7348, this exemplary embodiment can also support ESI and other features.

Exemplary Embodiment Seven

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in exemplary embodiment six except for what is specifically noted.

Different from in exemplary embodiment six, this module also implements the function corresponding to the RT-1 route in [EVPN Overlay]. In this exemplary embodiment, this module does not implement the function corresponding to the RT-2 route as in exemplary embodiment six, so the remote MAC learning process of the data plane still exists, and the remote MAC learning process still attempts to use the ESI_IP of the ESI at the remote end as the destination IP of the X-th packet as in exemplary embodiment six.

Different from in exemplary embodiment six, the IP address <Domain:GDV> of the ESI interface in this module is not issued in the underlay network, so the ESI IP is no longer the destination IP of the X-th packet.

2: A method for implementing the first IP plug-in module is described below.

This module is the same as the module having the same name in exemplary embodiment six except for what is specifically noted.

Different from that in exemplary embodiment six, this module further replaces the destination IP of the X-th packet in the following manner: the higher 24 bits of the destination IP are used as the value of a VPN domain field of a target ESI and the lower 8 bits of the destination IP are used as the value of a GDV of the target ESI, and then an RT-1 route corresponding to the target ESI is found and the value of a BGP nexthop of the RT-1 route is used as a new value of the destination IP, so that the Y-th packet is formed. However, only when the first packet is the known unicast packet, does the destination IP needs to be replaced, and when the first packet is the BUM packet, the destination IP does not need to be replaced.

3: A method for implementing the second IP plug-in module is described below.

This module is the same as the module having the same name in exemplary embodiment six.

4: A method for implementing the third IP plug-in module is described below.

This module is the same as the module having the same name in exemplary embodiment six.

5: A method for implementing the fourth IP plug-in module is described below.

This module is the same as the module having the same name in exemplary embodiment six.

The implementation of the service unaware node of the technical solution of the method and apparatus (system) for transmitting and using an entropy value of an inner packet in an outer IP header is described in conjunction with FIG. 8.

1: The EVPN infrastructure module is implemented.

This module is the same as the module having the same name in exemplary embodiment one.

2: A method for implementing the third entropy IP plug-in module is described below.

This module is the same as the module having the same name in exemplary embodiment one.

The EVPN topology shown in FIG. 1 is used as an example, and the processing of the network and traffic deployment includes the steps described below.

In step 1, the implementation of each node is selected, which is the same as in exemplary embodiment six except that multiple PE nodes and P nodes are all nodes defined in this embodiment.

In step 2, the EVPN router ID of each PE node is configured and issued. This process is the same as that in embodiment six.

In step 3, the VXLAN EVPN network shown in FIG. 1 is established. This process is the same as that in exemplary embodiment six.

In step 4, the VXLAN EVPN traffic is established according to FIG. 1 and the same VNI is designated for the VXLAN EVPN traffic on each PE node. This process is the same as that in exemplary embodiment six except for turning off the RT-2 route, issuing the RT-1 route and enabling the MAC learning of the data plane.

In step 5, the ESI basic configuration is configured. This process is the same as that in exemplary embodiment six.

In step 6, the ESI filtering configuration is configured. This process is the same as that in exemplary embodiment six except that the ESI IP is non-routable in the underlay network.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1b and B1c of the packet B1 by the EVPN infrastructure module is the same as that in exemplary embodiment one except that outer source IPs of VXLAN encapsulations of B1b and B1c become ESI_IP 7, where ESI_IP 7 is the ESI IP configured on the ESI corresponding to the physical interface to which AC 1 belongs.

In step 2, when a node PE 2 receives the packet B1b, the process of forwarding the packet B1b by the EVPN infrastructure module is the same as that in exemplary embodiment one and the result of the ESI filtering is the same as that in exemplary embodiment one except that the ESI filtering rule is changed into comparing the source IP of packet B1b with the ESI IP configured on the ESI corresponding to the physical interface to which each export AC belongs.

Step 3 and step 4 are the same as those in exemplary embodiment one except for the value of the outer source IP of the VXLAN encapsulation.

This exemplary embodiment solves the problem of requiring the first IP of the third packet to be route-reachable in the underlay network in exemplary embodiment six. This is because the remote MAC entries in embodiment six are known on the basis of the data plane MAC learning process in RFC7348. That is, for a bi-directional communication session between CE 1 and CE 3, an IP address used as the source IP of the third packet in one communication direction of the session is used as the destination IP of the third packet in the other communication direction of the same session, and a destination IP needs to be routable in the underlay network. After this solution is imported, the MAC learning process has not changed. However, in the forwarding process, the destination IP of the third packet is replaced with an IP address of a BGP next-hop of the corresponding RT-1 route, and the IP address of the BGP next-hop is routable in the underlay network. Moreover, the IP address of the source IP of the third packet in one communication direction is no longer used as the destination IP in the opposite communication direction, so the first IP has the necessary condition of occupying no IP address resource of the underlay network.

Exemplary Embodiment Eight

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in exemplary embodiment seven.

2: A method for implementing the first IP plug-in module is described below.

This module is the same as the module having the same name in exemplary embodiment seven except for what is specifically noted.

Different from that in exemplary embodiment seven, this module changes a protocol type field in an IPv4 header of the X-th packet into TBD2.

Different from in exemplary embodiment seven, if a protocol type field in an IPv4 header of a Y-th packet received by this module is TBD2, then this module determines that a UDP packet is carried in an inner layer of the IPv4 header of the Y-th packet and the source IP of the Y-th packet is not in a routing table where the destination IP is searched for, but in a second routing table. Packet resolution is performed according to a packet header in the UDP by using the same method as in exemplary embodiment seven. In this exemplary embodiment, even if a route in the routing table where the destination IP is searched for formally matches the source IP, the route is independent of the source IP since the destination IP and the source IP are not in the same routing space.

Different from the exemplary embodiment seven, if a route of the source IP is related, this module processes the Y-th packet on the basis of the second routing table. Generally, such processing does not exist in normal forwarding and is usually in an abnormal situation of an unreachable destination IP, expiring of time to live (TTL) or the like. At this time, the Y-th packet cannot be processed normally unless entering these processing flows. Therefore, the second routing table does not affect the normal forwarding performance of the Y-th packet. Additionally, the second routing table needs to be used in another situation where the source IP reachability check needs to be performed in the second routing table or the source IP reachability check needs to be ignored for an IP packet with protocol type TBD2 in an IPv4 header when the source IP reachability check is enabled in the underlay network.

Different from the exemplary embodiment seven, this module issues the ESI IP of the ESI interface in the underlay network. However, it needs to indicate that the route is in the second routing table.

Different from the exemplary embodiment seven, according to an underlay routing protocol of this module, when receiving a route in the second routing table, this module needs to add the route to the second routing table and indicates, in a corresponding entry of the second routing table, whether a next-hop of the route is an IP address in the first routing table or an IP address in the second routing table.

Different from the exemplary embodiment seven, when this module searches the second routing table with the source IP of the Y-th packet, if the next-hop is still the IP address in the second routing table, and then this module continues to search for the next-hop address in the second routing table iteratively until a next-hop address in the routing table where the destination IP is searched for is obtained.

3: A method for implementing the second IP plug-in module is described below.

This module is the same as the module having the same name in exemplary embodiment seven.

4: A method for implementing the third IP plug-in module is described below.

This module is the same as the module having the same name in exemplary embodiment seven.

5: A method for implementing the fourth IP plug-in module is described below.

This module is the same as the module having the same name in exemplary embodiment seven.

The implementation of the service unaware node of the technical solution of the method and apparatus (system) for transmitting and using an entropy value of an inner packet in an outer IP header is described in conjunction with FIG. 8.

1: The EVPN infrastructure module is implemented.

This module implements all underlay routing, forwarding and processing flows related to a processing flow of receiving the IP packet with protocol type TBD2 in the IPv4 header in the EVPN infrastructure module in this exemplary embodiment.

2: A method for implementing the third entropy IP plug-in module is described below.

This module is the same as the module having the same name in exemplary embodiment six.

The EVPN topology shown in FIG. 1 is used as an example, and the processing of the network and traffic deployment includes the steps described below.

In step 1, the implementation of each node is selected. This is the same as that in exemplary embodiment seven except that multiple PE nodes and P nodes are all nodes defined in this embodiment.

In step 2, the EVPN router ID of each PE node is configured and issued. This is the same as that in exemplary embodiment seven.

In step 3, the VXLAN EVPN network shown in FIG. 1 is established. This is the same as that in exemplary embodiment seven.

In step 4, the VXLAN EVPN traffic is established according to FIG. 1 and the same VNI is designated for the VXLAN EVPN traffic on each PE node. This is the same as that in exemplary embodiment seven.

In step 5, the ESI basic configuration is configured. This is the same as that in exemplary embodiment seven.

In step 6, the ESI filtering configuration is configured. This is the same as that in exemplary embodiment seven except that ESI IP needs to be issued in the second routing table, which means an IGP route issues the route in the second routing table.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1*b* and B1*c* of the packet B1 by the EVPN infrastructure module is the same as that in exemplary embodiment one except that outer source IPs of VXLAN encapsulations of B1*b* and B1*c* become ESI_IP 8, where ESI_IP 8 is the ESI IP configured on the ESI corresponding to the physical interface to which AC 1 belongs.

In step 2, when a node PE 2 receives the packet B1*b*, the process of forwarding the packet B1*b* by the EVPN infrastructure module is the same as that in exemplary embodiment one and the result of the ESI filtering is the same as the result of the ESI filtering in exemplary embodiment one except that the ESI filtering rule is changed into comparing the source IP of packet B1*b* with the ESI IP configured on the ESI corresponding to the physical interface to which each export AC belongs.

Step 3 and step 4 are the same as those in exemplary embodiment one except for the value of the outer source IP of the VXLAN encapsulation.

Exemplary Embodiment Nine

This exemplary embodiment is the same as exemplary embodiment eight except that the underlay network uses the IPv6 and uses TBD3 as the value of the next header field of an IPv6 packet header to indicate that the UDP packet is carried in an inner layer of an IP header of the X-th packet or the Y-th packet and the source IP of the X-th packet or the Y-th packet is in the second routing table.

Exemplary Embodiment Ten

This exemplary embodiment is the same as exemplary embodiment eight except that TBD4 is used as the value of the ethertype field in the Ethernet header to indicate that the IP packet is carried in an inner layer of the Ethernet header and a source IP of the IP packet is in the second routing table.

In this exemplary embodiment, the protocol type field in the IPv4 header, the next header field in the IPv6 header or the ethertype field in the ethertype header is configured to a designated value to indicate that a source IP and a destination IP of a corresponding IP header are not in the same routing table. This is a general method and is not limited by whether the source IP includes the first IP. It is just to say that when the source IP includes the first IP, the three solutions can further prevent the first IP of the present disclosure from consuming the IP address resources in the underlay network, thereby having better effects.

In exemplary embodiment eight, when the first packet is the BUM packet, the forwarding depends on an import replication tunnel, but in fact, an IP multicast group may be used to be combined with embodiment eight. At this time, when the third packet has an ethertype field with a value of TBD4, the URPF check may not be performed or be performed in a designated routing table.

Exemplary Embodiment Eleven

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in exemplary embodiment five except for what is specifically noted.

Figure 12:
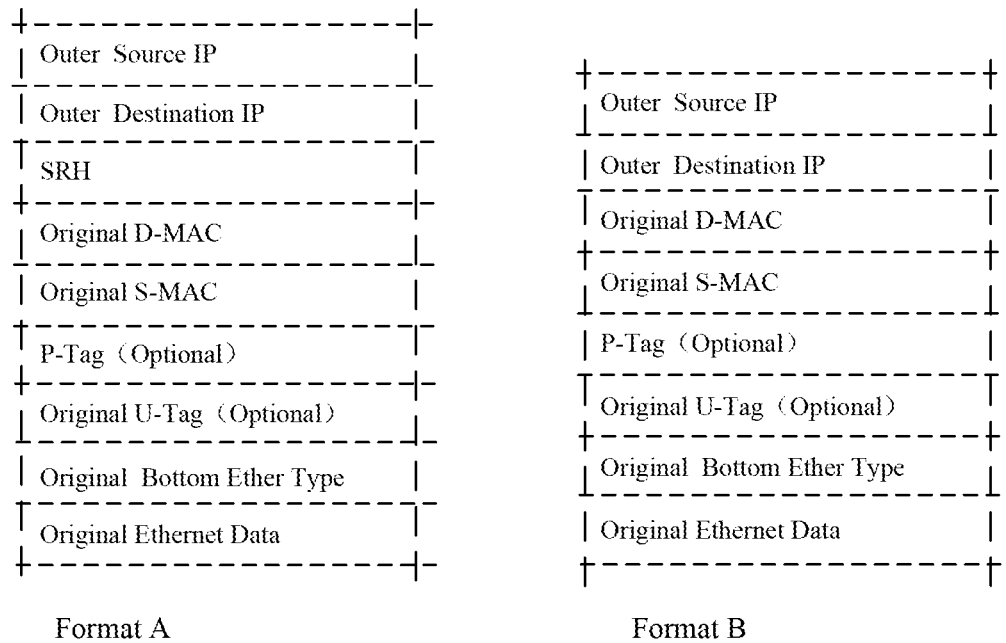
FIG. 12 is a schematic diagram of a position of an SHR header in an SRv6 encapsulation according to an embodiment.

Different from the exemplary embodiment five, compared with the encapsulation format used in this embodiment, the encapsulation format used in the X-th packet sent by this module is added with a segment routing header (SRH) whose position is shown in format A in FIG. 12. Format B in FIG. 12 is the format used in exemplary embodiment five. The SRH is a segment routing header defined by IETF in draft-ietf-6man-segment-routing-header ([SRH]), and [SRH] defines the format, including a Segment List field, of the SRH.

Different from the exemplary embodiment five, the Y-th packet received by this module also adopts the same encapsulation format as the X-th packet.

In this embodiment, both adding and stripping the SRH are not performed by this module, but the module needs to identify an [SRH] encapsulation and be able to send and receive a packet with the [SRH] encapsulation.

Different from the exemplary embodiment five, this module does not limit the type and format of the configured ESI.

2: A method for implementing the first IP plug-in module is described below.

This module is the same as the module having the same name in embodiment five except for what is specifically noted.

Different from in exemplary embodiment five, the middle-range prefix does not need to be configured.

Different from the exemplary embodiment five, this module directly uses the ESI (10 bytes) corresponding to the main interface to which the import AC of the first packet belongs as the lower 10 bytes of the 16-byte entropy value, and uses the higher 6 bytes of the EVPN Router ID as the higher 6 bytes of the 16-byte entropy value.

Different from the exemplary embodiment five, this module uses the [SRH] encapsulation and fills in Segment List [0] of a Segment List array field of the SRH with the entropy value.

Then, this module returns the modified packet to the EVPN infrastructure module.

In this exemplary embodiment, this module does not modify the source IP field of the X-th packet.

3: A method for implementing the second IP plug-in module is described below.

This module returns the packet inputted by the EVPN infrastructure module to the EVPN infrastructure module intact.

4: A method for implementing the third IP plug-in module is described below.

This module returns the packet inputted by the EVPN infrastructure module to the EVPN infrastructure module intact.

5: A method for implementing the fourth IP plug-in module is described below.

If the export AC of the Z-th packet has a zero ESI, then the Z-th packet is directly returned to the EVPN infrastructure module.

If the export AC of the Z-th packet has a non-zero ESI, then this module uses a value read from the lower 10 bytes of filed Segment List [0] of the SRH of the Z-th packet as an ESI value, and discards the Zth packet if this ESI value is the same as the ESI value corresponding to the main interface to which the export AC of the Zth packet belongs. If this ESI value is different from the ESI value corresponding to the main interface to which the export AC of the Z-th packet belongs, then after the SRH header is stripped off, the modified packet is returned to the VPN infrastructure module for further processing.

In this exemplary embodiment, the ESI alias value may be used for the packet statistics, and statistical data of packets from different ESIs at the remote end is recorded into different counters, so that the accuracy of the packet statistics is improved. Additionally, an export PE may be configured to mirror a packet of a designated import ESI to a monitoring server for analysis or perform the designated QoS processing on the third packet from the designated import ESI. In RFC7348 or the VXLAN EPVN in related art, similar processing cannot be performed since the packet does not include information related to the import ESI.

In this embodiment, the destination IP of the third packet is actually a local SID on the PE node configured with the destination IP (for the concept of the local SID, see exemplary embodiment four). This module actually defines a new SRv6 Function (for the concept of the SRv6 Function, see exemplary embodiment four) corresponding to the local SID. This new SRv6 Function indicates that the lower 10 bytes of filed Segment List [0] are an ESI value if filed Segment List [0] of the SRH of the Z-th packet is different from the destination IP and the Zth packet is discarded if this ESI value is the same as the ESI value corresponding to the main interface to which the export AC belongs. This embodiment may be used in conjunction with the SR-Policy function of the SRv6, and see embodiment four for the principle.

In addition to the SRv6 encapsulation, EVPN encapsulations similar to the VXLAN encapsulation include network virtualization using generic routing encapsulation (NVGRE), a generic network virtualization encapsulation (Geneve), a VXLAN generic protocol extension (VXLAN GPE) encapsulation. Meanwhile, the SRV6 encapsulation is used to complete a function equivalent, in a certain sense, to a designated function completed by the VXLAN encapsulation, and this has been fully reflected in several embodiments in this specification. Combining these, it is not difficult for those skilled in the art to obtain a method for completing the function equivalent, in a certain sense, to this embodiment by using the NVGRE, the Geneve and the VXLAN GPE encapsulation. For example, variable length options in the Geneve encapsulation may be used to bear the content carried by the SRH in this embodiment, a next protocol of the VXLAN-GPE encapsulation may indicate whether the inner packet includes the content carried by the SRH in this embodiment, and a protocol type of the NVGRE encapsulation may indicate whether the inner packet includes the content carried by the SRH in this exemplary embodiment. A basic standard of the Geneve is draft-ietf-nvo3-geneve, a basic standard of the VXLAN-GPE is draft-ietf-nvo3-vxlan-gpe, and a basic standard of the NVGRE is RFC7637, which may be referred to.

The implementation of the service unaware node of the technical solution of the method and apparatus (system) for transmitting and using an entropy value of an inner packet in an outer IP header is described in conjunction with FIG. 8.

1: The EVPN infrastructure module is implemented.

This module is the same as the module having the same name in exemplary embodiment three.

2: A method for implementing the third entropy IP plug-in module is described below.

This module is the same as the module having the same name in exemplary embodiment three.

The EVPN topology shown in FIG. 1 is used as an example, and the processing of the network and traffic deployment includes the steps described below.

In step 1, the implementation of each node is selected. This is the same as that in exemplary embodiment five except that multiple PE nodes and P nodes are all nodes defined in this exemplary embodiment.

In step 2, the EVPN router ID of each PE node is configured and issued. This is the same as that in exemplary embodiment five.

In step 3, the VXLAN EVPN network shown in FIG. 1 is established. This is the same as that in exemplary embodiment five.

In step 4, the VXLAN EVPN traffic is established according to FIG. 1 and the same VNI is designated for the VXLAN EVPN traffic on each PE node. This is the same as that in embodiment five.

In step 5, the ESI basic configuration is configured. This is the same as that in embodiment five.

In step 6, the ESI filtering configuration is configured. This is the same as that in embodiment five except for enabling an SRH decoding capability and designating the overall ESI value to be stored in the SRH.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1b and B1c of the packet B1 by the EVPN infrastructure module is the same as that in embodiment five except that extension SRv6 encapsulations used in packet B1b and B1c are added with SRHs, where the value of the lower 10 bytes in Segment List [0] of the SRH is the ESI value of 10 bytes.

In step 2, when a node PE 2 receives the packet B1b, the process of forwarding the packet B1b by the EVPN infrastructure module is the same as the forwarding process in exemplary embodiment five and the result of the ESI filtering is the same as that in exemplary embodiment five except that the ESI filtering rule is changed into comparing the value of the lower 10 bytes in Segment List [0] of an SRH of packet B1b with the 10-byte ESI value corresponding to the physical interface to which each export AC belongs.

Step 3 and step 4 are the same as those in exemplary embodiment six except that the value of the outer source IP is different and the ESI filtering is performed by using the SRH.

Exemplary Embodiment Twelve

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in exemplary embodiment two.

2: A method for implementing the first IP plug-in module is described below.

This module is the same as the module having the same name in exemplary embodiment two.

3: A method for implementing the second IP plug-in module is described below.

This module modifies, according to the Root/Leaf attribute of the first AC, the least significant bit of the source IP of the packet inputted by the EVPN infrastructure module. The method is as follows. When the value of the Root/Leaf attribute of the first AC is Leaf, this module sets the value of the least significant bit of the source IP to 1, and when the value of the Root/Leaf attribute of the first AC is Root, this module sets the value of the least significant bit of the source IP to 0.

This module returns the modified packet to the EVPN infrastructure module.

In this exemplary embodiment, there may be multiple sub-interfaces on the same ES, and some of these sub-interfaces may have the Root attribute and others have the Leaf attribute, so when first packets are received via different sub-interfaces on the same ESI, the corresponding second packets may have different source IPs.

4: A method for implementing the third IP plug-in module is described below.

This module is the same as the module having the same name in exemplary embodiment two.

5: A method for implementing the fourth IP plug-in module is described below.

When the least significant bit of the source IP of the third packet is 1 and the value of the Root/Leaf attribute of the export AC of the Z-th packet is Leaf, this module directly discards the Z-th packet. When the least significant bit of the source IP of the third packet is not 1 or the value of the Root/Leaf attribute of the export AC of the Z-th packet is not Leaf, if the ESI of the export AC is 0, then this module returns the packet to the EVPN infrastructure module intact for further forwarding. In this embodiment, this module uses the least significant bit "1" of the source IP of the third packet to indicate that the value of a Root/Leaf attribute of a first AC corresponding to a source IP on an import PE of the third packet is Leaf. Actually, the least significant bit "0" of the source IP may be used for indicating that the value of the Root/Leaf attribute is Leaf and the least significant bit "1" of the source IP may be used for indicating that the value of the Root/Leaf attribute is Root, this scheme can be implemented technically according to this exemplary embodiment, but this disclosure is not limited to this. Moreover, the bit for representing the Root/Leaf attribute in the source IP is not necessarily the least significant bit, and the least significant bit is selected here for ease merely.

In this exemplary embodiment, when the export AC of the Z-th packet corresponds to the non-zero ESI and the value of the Root/Leaf attribute of the export AC is Leaf, the source IP of the third packet is denoted as IP3, a second IP corresponding to the export AC is denoted as IP4, and 0x01 is denoted as Flag. Then, the above condition for discarding the Z-th packet is actually equivalent to discarding the packet when (IP3 & IP4) & Flag=Flag.

If (IP3 & IP4) & Flag is not equal to Flag, this module performs matching between the source IP of the third packet, and the corresponding ESI IP mask and the ESI IP of the ESI corresponding to the main interface to which the export AC of the Z-th packet belongs, discards the packet if the source IP can match the ESI IP and ESI IP mask, and returns the packet to the EVPN infrastructure module for further processing if the source IP cannot match the ESI IP and ESI IP mask.

The implementation of the service unaware node of the technical solution of the method and apparatus (system) for transmitting and using an entropy value of an inner packet in an outer IP header is described in conjunction with FIG. 8.

1: The EVPN infrastructure module is implemented.

This module is the same as the module having the same name in exemplary embodiment two.

2: A method for implementing the third entropy IP plug-in module is described below.

This module is the same as the module having the same name in exemplary embodiment two.

The EVPN topology shown in FIG. 1 is used as an example, and the processing of the network and traffic deployment includes the steps described below.

In step 1, the implementation of each node is selected. This is the same as in exemplary embodiment two except that multiple PE nodes and P nodes are all nodes defined in this exemplary embodiment.

In step 2, the EVPN router ID of each PE node is configured and issued. This is the same as that in exemplary embodiment two except that each EVPN Router ID is even.

In step 3, the VXLAN EVPN network shown in FIG. 1 is established. This is the same as that in exemplary embodiment two.

In step 4, the VXLAN EVPN traffic is established according to FIG. 1 and the same VNI is designated for the VXLAN EVPN traffic on each PE node. This is the same as that in exemplary embodiment two except that AC 1 and AC 2 are designated to the Leaf attribute, AC 4 and AC 5 are designated to the Root attribute, AC 6 is designated to the Leaf attribute and AC 7 is designated to the Root attribute.

In step 5, the ESI basic configuration is configured. This is the same as that in exemplary embodiment two.

In step 6, the ESI filtering configuration is configured. This is the same as that in exemplary embodiment two except that each EVPN Router ID configured is even.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1b and B1c of the packet B1 by the EVPN infrastructure module is the same as the forwarding process in exemplary embodiment two except that higher 31 bits of the outer source IP of the VXLAN encapsulation of each of B1b and B1c are higher 31 bits of ESI_IP 12, where ESI_IP 12 is the ESI IP configured on the ESI corresponding to the physical interface to which AC 1 belongs. The least significant bit of ESI_IP 12 is determined by the Root/Leaf attribute of AC 1, where the least significant bit is 1 when the Root/Leaf attribute of AC 1 is Leaf and the least significant bit is 0 when the Root/Leaf attribute of AC 1 is Root.

In step 2, when a node PE 2 receives the packet B1b, the process of forwarding the packet B1b by the EVPN infrastructure module is the same as that in exemplary embodiment two and the result of the ESI filtering is the same as that in exemplary embodiment two except for adding a process. The process includes: discarding the corresponding copy B1b in response to determining that the least significant bit of the source IP of the packet B1b is 1 and the value of the Root/Leaf attribute of the export AC is Leaf. As a result of this process, the copy of the packet B1b to be forwarded to AC 6 is discarded.

Step 3 and step 4 are the same as those in exemplary embodiment one except for the value of the outer source IP of the VXLAN encapsulation.

In this exemplary embodiment, since the BGP next-hop of the RT-2 route is the EVPN Router ID of the route source node, BGP next-hops of the RT-2 routes of MACs learned from different adjacent PEs of the same ESI are different. As a result, in this module, VXLAN packets forwarded to the same remote ESI from different adjacent PEs have different outer destination IPs, so this module cannot support the flow-by-flow load sharing mode. However, the module still supports the per service load-balance, as long as the load sharing can be performed on the CE.

Exemplary Embodiment Thirteen

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in embodiment seven except for what is specifically noted.

Different from the exemplary embodiment seven, in this module, the underlay network supports the MPLS. This means that there may be an export label in a routing table of the underlay network and there may be an MPLS label in the third packet received by this module.

Different from the exemplary embodiment seven, when the fourth IP plug-in module returns a packet, the module searches for a destination IP of the packet returned by the fourth IP plug-in module in the underlay routing table. If a matched route entry has the MPLS label, an export label stack and forwarding information on the outer of the export label stack are encapsulated according to an MPLS forwarding process, and then the final packet is sent out.

Different from the exemplary embodiment seven, the third packet is terminated in an MPLS layer and an IP layer, and when an UDP layer is a port number corresponding to the VXLAN data packet, the EVPN forwarding process is performed.

In this embodiment, a label switching path (LSP) label of the underlay network described above is added, and the problem in which a source IP is non-routable in the underlay network no longer exists in the underlay network, because in this case, a forwarding process of the service unaware node in the underlay network is only a general label switching and is not related to the URPF check and other processing flows. Thus, subsequent exemplary embodiments fourteen, fifteen and sixteen all keep this idea.

2: A method for implementing the first IP plug-in module is described below.

This module is the same as the module having the same name in exemplary embodiment seven.

In this embodiment, referring to exemplary embodiment seven, this module replaces both the source IP and the destination IP of the X-th packet.

3: A method for implementing the second IP plug-in module is described below.

This module is the same as the module having the same name in exemplary embodiment seven.

4: A method for implementing the third IP plug-in module is described below.

This module is the same as the module having the same name in exemplary embodiment seven.

5: A method for implementing the fourth IP plug-in module is described below.

This module is the same as the module having the same name in exemplary embodiment seven.

The implementation of the service unaware node of the technical solution of the method and apparatus (system) for transmitting and using an entropy value of an inner packet in an outer IP header is described in conjunction with FIG. 8.

1: The EVPN infrastructure module is implemented.

Basic functions of mapping an IPv4 route into the LSP and performing corresponding MPLS forwarding are implemented.

This module also does not need to call the third entropy IP plug-in module.

2: A method for implementing the third entropy IP plug-in module is described below.

This exemplary embodiment does not need this module.

The EVPN topology shown in FIG. 1 is used as an example, and the processing of the network and traffic deployment includes the steps described below.

This is the same as that in exemplary embodiment seven except for deploying the MPLS function of the underlay network additionally.

The EVPN topology shown in FIG. 1 is used as an example, and the processing of the end-to-end packet forwarding includes the steps described below.

This is the same as that in exemplary embodiment seven except that an EVPN network side packet is added with the MPLS label outside the outer IP header.

Exemplary Embodiment Fourteen

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in embodiment thirteen except for what is specifically noted.

Different from the exemplary embodiment thirteen, this module binds each EVPN instance with an IP-VRF instance, where the IP-VRF instance is referred to as a backbone IP-VRF instance of the EVPN instance.

Different from the exemplary embodiment thirteen, this module does not issue an RT-1 per EVI route, but issues only an RT-1 per ES route, and the route RT-1 per ES issued by this module is also different from that in embodiment thirteen. In this embodiment, if an EVPN instance VNI_I is bound to a certain AC, and VRF_B is a backbone IP-VRF instance of VNI_I, where ESI E1 corresponds to the AC and the ESI IP of E1 is IP_E, then IP_E is used as a local host IP address in VRF_B. The RT-1 per ES route is issued for each local host IP address T1 in VRF_B, an ESI of this route is an ESI corresponding to T1, ETI is 0xFFFFFFFFF, a route distinguisher (RD) is an RD of VRF_B, a route target carries an export route target of the IP-VRF instance, a BGP next-hop of this route is the EVPN Router ID of the route source node, and a label value of this route is an MPLS implicit empty label.

When receiving the RT-1 per ES route, this module imports the RT-1 per ES route into a corresponding backbone IP-VRF instance according to the route target to form 32-bit route T2. The lower 24 bits of a VPN domain field of an ESI of the RT-1 per ESI route are used as the higher 24 bits of T2, the lower 8 bits of a GDV field of the ESI are used as the lower 8 bits of T2, and a next-hop of route T2 is the next-hop of the RT-1 per ES route, that is, the EVPN Router ID of the route source node.

2: A method for implementing the first IP plug-in module is described below.

This module is the same as the module having the same name in exemplary embodiment thirteen except for what is specifically noted.

Different from the exemplary embodiment thirteen, the method adopted by this module to replace the destination IP of the X-th packet is as follows: searching for the destination IP in a routing table of the backbone IP-VRF instance to which the EVPN instance is bound to, using the value of a BGP next-hop of a matched route entry as a new value of the destination IP to form the Y-th packet, and returning the Y-th packet to the EVPN infrastructure module for further forwarding.

3: A method for implementing the second IP plug-in module is described below.

This module is the same as the module having the same name in exemplary embodiment thirteen.

4: A method for implementing the third IP plug-in module is described below.

This module is the same as the module having the same name in exemplary embodiment thirteen.

5: A method for implementing the fourth IP plug-in module is described below.

This module is the same as the module having the same name in exemplary embodiment thirteen.

The implementation of the service unaware node of the technical solution of the method and apparatus (system) for transmitting and using an entropy value of an inner packet in an outer IP header is described in conjunction with FIG. 8.

1: The IP infrastructure module is implemented.

This module is the same as the module having the same name in exemplary embodiment thirteen.

2: A method for implementing the third entropy IP plug-in module is described below.

This module is the same as the module having the same name in exemplary embodiment thirteen.

The EVPN topology shown in FIG. 1 is used as an example, and the processing of the network and traffic deployment includes the steps described below.

In step 1, the implementation of each node is selected. This is the same as that in exemplary embodiment seven except that multiple PE nodes and P nodes are all nodes defined in this embodiment.

In step 2, the EVPN router ID of each PE node is configured and issued. This is the same as that in exemplary embodiment thirteen.

In step 3, the VXLAN EVPN network shown in FIG. 1 is established. This is the same as that in exemplary embodiment thirteen.

In step 4, the VXLAN EVPN traffic is established according to FIG. 1 and the same VNI is designated for the VXLAN EVPN traffic on each PE node. This is the same as that in exemplary embodiment thirteen.

In step 5, the ESI basic configuration is configured. This is the same as that in exemplary embodiment thirteen.

In step 6, the ESI filtering configuration is configured. This is the same as that in exemplary embodiment thirteen except for configuring the backbone IP-VRF instance and designating the backbone IP-VRF instance corresponding to the EVPN instance.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1*b* and B1*c* of the packet B1 by the EVPN infrastructure module is the same as that in exemplary embodiment thirteen except that outer source IPs of VXLAN encapsulations of B1*b* and B1*c* become ESI_IP 8, where ESI_IP 8 is the ESI_IP configured on the ESI corresponding to the physical interface to which AC 1 belongs.

In step 2, when a node PE 2 receives the packet B1*b*, the process of forwarding the packet B1*b* by the EVPN infrastructure module is the same as that in exemplary embodiment thirteen and the result of the ESI filtering is the same as that in exemplary embodiment thirteen except that the ESI filtering rule is changed into comparing the source IP of packet B1*b* with the ESI IP configured on the ESI corresponding to the physical interface to which each export AC belongs.

Step 3 and step 4 are the same as those in embodiment one except for the value of the outer source IP of the VXLAN encapsulation.

Exemplary Embodiment Fifteen

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in embodiment fourteen except for what is specifically noted.

Different from the exemplary embodiment fourteen, the underlay network in this module is the IPv6 network.

Different from the exemplary embodiment fourteen, this module configures a unicast MAC address as the ESI alias value for each ESI, and different ESIs on the same node have different ESI alias values.

Different from the exemplary embodiment fourteen, this module configures an 80-bit IPv6 unicast prefix and ESI IPs of all ESIs on this node have the same higher 80 bits as the higher 80 bits of the IPv6 unicast prefix.

Different from the exemplary embodiment fourteen, the lower 48 bits of the ESI IP corresponding to the ESI in this module are composed of the ESI alias value of a unicast MAC address format.

Different from the exemplary embodiment fourteen, this module uses the RT-2 route in RFC7623 to replace the RT-1 per ES route in embodiment fourteen. In this embodiment, if the EVPN instance VNI_I is bound to a certain AC, VPLS_B is a backbone MAC-VRF instance of VNI_I, ESI E1 corresponds to the AC and an ESI IP of E1 is MAC_E, then MAC_E is used as a local host IP address in VRF_B. The RT-2 route is issued for each local host MAC address M1 in VPLS_B, where the value of an ESI field is zero, the value of an MAC address field is the ESI alias value, values of an RD and a routing target are the same as those in embodiment sixteen, the value of an Ethernet tag identifier (ID) field is zero, the value of an MPLS-Label1 field is an MPLS explicit null label, and an IP Address field and an MPLS-Label2 field are vacant (do not exist in the route).

Different from the exemplary embodiment fourteen, when receiving the RT-2 route, this module imports the RT-2 route into a corresponding backbone MAC-VRF instance according to a route target to form backbone MAC entry M2. The value of the MAC address field of the RT-2 route is the value of M2, a next-hop of entry M2 is the BGP next-hop of the RT-2 route, that is, the EVPN router ID of the route source node.

2: A method for implementing the first IP plug-in module is described below.

This module is the same as the module having the same name in exemplary embodiment fourteen except for what is specifically noted.

Different from the exemplary embodiment fourteen, the method adopted by this module to replace the destination IP of the X-th packet is as follows: searching for the lower 48 bits of destination IP in a routing table of the backbone MAC-VRF instance bound to the EVPN instance, using the value of a next-hop of a matched route entry as a new value of the destination IP to form the Y-th packet, and returning the Y-th packet to the EVPN infrastructure module for further forwarding.

3: A method for implementing the second IP plug-in module is described below.

This module is the same as the module having the same name in exemplary embodiment fourteen.

4: A method for implementing the third IP plug-in module is described below.

This module is the same as the module having the same name in exemplary embodiment fourteen.

5: A method for implementing the fourth IP plug-in module is described below.

This module is the same as the module having the same name in exemplary embodiment fourteen.

The implementation of the service unaware node of the technical solution of the method and apparatus (system) for transmitting and using an entropy value of an inner packet in an outer IP header is described in conjunction with FIG. 8.

1: The IP infrastructure module is implemented.

This module is the same as the module having the same name in exemplary embodiment thirteen.

2: A method for implementing the third entropy IP plug-in module is described below.

This module is the same as the module having the same name in exemplary embodiment thirteen.

The EVPN topology shown in FIG. 1 is used as an example, and the processing of the network and traffic deployment includes the steps described below.

In step 1, the implementation of each node is selected. This is the same as that in exemplary embodiment thirteen except that multiple PE nodes and P nodes are all nodes defined in this embodiment.

In step 2, the EVPN router ID of each PE node is configured and issued. This is the same as that in exemplary embodiment thirteen.

In step 3, the VXLAN EVPN network shown in FIG. 1 is established. This is the same as that in exemplary embodiment thirteen.

In step 4, the VXLAN EVPN traffic is established according to FIG. 1 and the same VNI is designated for the VXLAN EVPN traffic on each PE node. This is the same as that in exemplary embodiment thirteen.

In step 5, the ESI basic configuration is configured. This is the same as that in exemplary embodiment thirteen.

In step 6, the ESI filtering configuration is configured. This is the same as that in exemplary embodiment thirteen except that in this embodiment it needs to configure the backbone MAC-VRF instance, designate the corresponding backbone MAC-VRF instance for the EVPN instance and configure a 6-byte ESI alias value for the ESI.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1*b* and B1*c* of the packet B1 by the EVPN infrastructure module is the same as that in exemplary embodiment thirteen except that outer layer source IPs of VXLAN encapsulations of B1*b* and B1*c* become ESI_IP 15, where the lower 48 bits of ESI_IP 15 are the 6-byte ESI alias value configured on the ESI corresponding to the physical interface to which AC 1 belongs.

In step 2, when a node PE 2 receives the packet B1*b*, the process of forwarding the packet B1*b* by the EVPN infrastructure module is the same as that in exemplary embodiment thirteen and the result of the ESI filtering is the same as that in exemplary embodiment thirteen except that the ESI filtering rule is changed into comparing the lower 48 bits of the source IP of packet B1*b* with the 6-byte ESI alias value configured on the ESI corresponding to the physical interface to which each export AC belongs.

Step 3 and step 4 are the same as those in exemplary embodiment one except for the value of the outer source IP of the VXLAN encapsulation.

Exemplary Embodiment Sixteen

The implementation of the PE node of the technical solution of the method and apparatus (system) for transmitting and using an entropy value of an inner packet in an outer IP header is described in conjunction with FIG. 7.

1: The EVPN infrastructure module is implemented.

This module is the same as the module having the same name in embodiment fifteen except for what is specifically noted.

Different from the exemplary embodiment fifteen, this module directly configures an IPv6 address for each ESI as the ESI IP of each ESI and does not configure the ESI alias value.

Different from the exemplary embodiment fifteen, this module uses the backbone IP-VRF instance to replace the backbone MAC-VRF instance, and the RT-2 route issued by this module is also issued in the IP-VRF instance. In this exemplary embodiment, a format of the RT-2 route issued by this module is shown in RFC7432 section 7.2, where the value of the IP Address field is the ESI IP, the value of the ESI field is the ESI corresponding to the ESI IP, the value of the MAC Address field is zero or 0x0FFFFFFFFFFFF (where an all-active mode uses zero and a single-active mode uses 0x0FFFFFFFFFFFF), the value of the RD and the value of the route target is the same as the RT-1 per ES route in embodiment fourteen, the value of the Ethernet tag ID field is zero, and the MPLS-Label1 field uses the value of an MPLS label that can uniquely determine the IP-VRF instance identified by the RD, and the MPLS-Label2 field uses the same value as an MPLS label field of the RT-1 per ES route.

Different from the exemplary embodiment fifteen, when receiving the RT-2 route, this module imports the RT-2 route into the corresponding backbone IP-VRF instance according to the route target to form 128-bit route IP_F. The value of the ESI IP field of the RT-2 route is used as the value of IP_F, a next-hop of route IP_F is the next-hop of the RT-2 route, that is, the EVPN router ID of the route source node. When two RT-2 routes received in the same backbone IP-VRF instance have the same ESI IP and different ESIs, the same ESI IP is temporarily not used for forwarding until one route is withdrawn.

In this exemplary embodiment, the backbone IP-VRF instance may be bound to its own AC. When receiving an IP Packet from its own AC, the backbone IP-VRF instance may search for a destination IP of the packet in a table of the IP-VRF, and use an MPLS label corresponding to an MPLS-Label2 field of an RT-2 route corresponding to a matched route entry in the table as a private network export tag. Other forwarding processes have no difference from a general IP-VRF instance on the basis of the MPLS. When the backbone IP-VRF instance initiates, in the IP-VRF instance, a process of an active internet packet groper (ping) for a remote ESI IP, the forwarding process has no difference from the general IP-VRF on the basis of the MPLS EVPN except that the private network tag used as the export tag is from the RT-2 route.

2: A method for implementing the first IP plug-in module is described below.

This module is the same as the module having the same name in exemplary embodiment fourteen except for what is specifically noted.

Different from the exemplary embodiment fourteen, routing tables of the backbone IP-VRF instance in this module are all IPv6 routing tables, and a destination IP used in table searching is also the IPv6 address.

3: A method for implementing the second IP plug-in module is described below.

This module is the same as the module having the same name in exemplary embodiment fourteen.

4: A method for implementing the third IP plug-in module is described below.

This module is the same as the module having the same name in exemplary embodiment fourteen.

5: A method for implementing the fourth IP plug-in module is described below.

This module is the same as the module having the same name in exemplary embodiment fourteen except for what is specifically noted.

In an embodiment, different from the exemplary embodiment fourteen, this module may further check, in the backbone IP-VRF instance, the validity of the source IP of the Y-th packet. The method includes: searching the routing table of the backbone IP-VRF instance bound to the EVPN instance for the source IP, determining that the Y-th packet is valid if a corresponding route entry exists, and determining that the Y-th packet is invalid if no corresponding route entry exists. Measures, for example, warning, may be taken for the invalid packet.

The implementation of the service unaware node of the technical solution of the method and apparatus (system) for transmitting and using an entropy value of an inner packet in an outer IP header is described in conjunction with FIG. 8.

1: The IP infrastructure module is implemented.

This module is the same as the module having the same name in exemplary embodiment thirteen.

2: A method for implementing the third entropy IP plug-in module is described below.

This module is the same as the module having the same name in exemplary embodiment thirteen.

The EVPN topology shown in FIG. 1 is used as an example, and the processing of the network and traffic deployment includes the steps described below.

In step 1, the implementation of each node is selected. This is the same as that in exemplary embodiment fourteen except that multiple PE nodes and P nodes are all nodes defined in this exemplary embodiment.

In step 2, the EVPN router ID of each PE node is configured and issued. This is the same as that in exemplary embodiment fourteen except that the underlay network is the IPv6 network.

In step 3, the VXLAN EVPN network shown in FIG. 1 is established. This is the same as that in embodiment fourteen.

In step 4, the VXLAN EVPN traffic is established according to FIG. 1 and the same VNI is designated for the VXLAN EVPN traffic on each PE node. This is the same as that in exemplary embodiment one.

In step 5, the ESI basic configuration is configured. This is the same as that in exemplary embodiment fourteen.

In step 6, the ESI filtering configuration is configured. This is the same as that in exemplary embodiment fourteen except for configuring the IPv6 address for each ESI as the ESI IP.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1$b$ and B1$c$ of the packet B1 by the EVPN infrastructure module is the same as that in exemplary embodiment fourteen except that outer source IPs of VXLAN encapsulations of B1$b$ and B1$c$ become ESI_IP 16, where ESI_IP 16 is the ESI IP configured on the ESI corresponding to the physical interface to which AC 1 belongs.

In step 2, when a node PE 2 receives the packet B1$b$, the process of forwarding the packet B1$b$ by the EVPN infrastructure module is the same as that in exemplary embodiment fourteen and the result of the ESI filtering is the same as that in exemplary embodiment fourteen except that the ESI filtering rule is changed into comparing the source IP of the packet B1$b$ with the ESI IP configured on the ESI corresponding to the physical interface to which each export AC belongs.

Step 3 and step 4 are the same as those in embodiment one except for the value of the outer source IP of the VXLAN encapsulation.

Exemplary Embodiment Seventeen

Same as the exemplary embodiment one, the implementation of the PE node of the technical solution of the method and apparatus (system) for transmitting and using an entropy value of an inner packet in an outer IP header is described in conjunction with FIG. 7.

The implementation of the service unaware node of the technical solution of the method and apparatus (system) for transmitting and using an entropy value of an inner packet in an outer IP header is described in conjunction with FIG. 8.

1: The IP infrastructure module is implemented.

This module is the same as the module having the same name in exemplary embodiment one except for what is specifically noted.

Different from the exemplary embodiment one, only when the higher 24 bits of the destination IP of the third packet are the same as the higher 24 bits of the EVPN Router ID of this node and the higher 16 bits of the source IP of the third packet are the same as higher 16 bits of the source-IP specific black-hole route prefix, the third IP plug-in module is called to perform a source IP routing check and determine a destination IP address of the passive packet returning.

In this exemplary embodiment, through checking the destination IP and the source IP of the third packet, solved is the problem in exemplary embodiment one that the source IP of the third packet is actually difficult to be used as the destination IP in the underlay network (this is actually equivalent to that the source IP consumes IP address resources in the underlay network to a certain extent), since network communication generally has a bi-directional session and an IP address used as a destination IP in one communication direction is used as a source IP in the other communication direction of the same session. That is, even if the source IP matches the source-IP specific black-hole route prefix in exemplary embodiment one, the source IP is not necessarily the first IP, but is likely to be an IP of normal communication in the underlay network. However, in this solution, each destination IP of the third packet is an IP addresses whose higher-bit part is a designated value, and only a packet that has a destination IP with a higher-bit part being the designated value and a source IP matching the source-IP specific black-hole route prefix is regarded a packet whose the source IP is non-route in the underlay network. In this way, the source IP of the third packet may be any IP address except an IP address having the same designated higher-bit part as the destination IP, no matter whether an IP address having the same value as the source IP is used as a destination IP in the underlay network. Even if the source IP and the destination IP are equal, the source IP and the destination IP are not the same IP address, since the source IP and the destination IP are not in the same routing table and do not belong to the same IP address space. In this way, in this solution, there is only one limitation on IP address planning in the underlay network. That is, EVPN router IDs of PE nodes implementing this embodiment have the same designated higher-bit part. There is no other limitation. The underlay network may be connected to internet, and communication in the internet may be performed via the underlay network. This solution is another method for preventing the first IP from consuming IP address resources in the underlay network (for example, when the underlay network is the IPv4 network). Compared with exemplary embodiment thirteen, the advantage of this solution is that the MPLS technique is not needed.

2: A method for implementing the third entropy IP plug-in module is described below.

This module designates, through configuration, that when the higher 16 bits of the source IP of the received X-th packet are Prefix2, the packet is processed according to the following rules: (1) when the third packet triggers the passive packet returning, the packet is returned to designated IP address S1; and (2) when the third packet triggers the source IP route-reachability check, the check is ignored.

The IP address returned by this module is a designated IP address S1 corresponding to the source-IP specific blackhole route prefix.

The EVPN topology shown in FIG. 1 is used as an example, and the processing of the network and traffic deployment includes the steps described below.

In step 1, the implementation of each node is selected. This is the same as that in exemplary embodiment one except that multiple PE nodes and P nodes are all nodes defined in this exemplary embodiment.

In step 2, the EVPN router ID of each PE node is configured and issued. The process is the same as that in exemplary embodiment one except that the PE node and the P node need to be configured with 32-bit EVPN Router IDs and EVPN Router IDs of the PE node and the P node have the same higher 24 bits.

Steps 3 to 6 are the same as those in exemplary embodiment one.

Same as the exemplary embodiment one, the EVPN topology shown in FIG. 1 is used as an example, and the processing of the end-to-end packet forwarding includes the steps described below.

Exemplary Embodiment Eighteen

Figure 13:
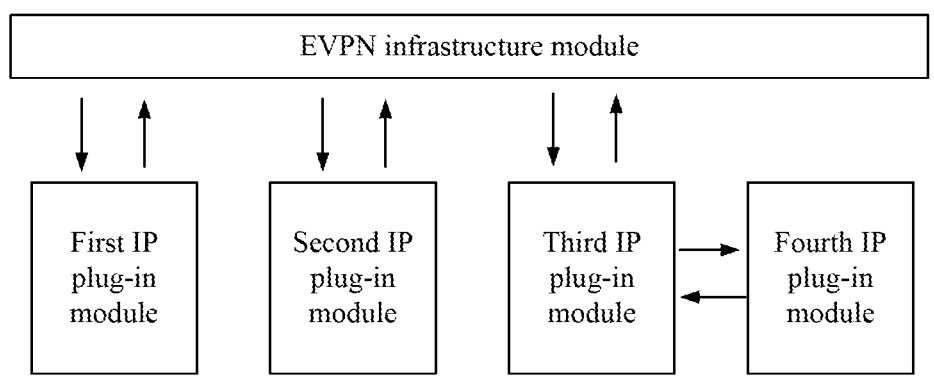
FIG. 13 is a structural diagram of a PE node according to an embodiment.

The implementation of the PE node of the technical solution of the method and apparatus (system) for transmitting and using an entropy value of an inner packet in an outer IP header is described in conjunction with FIG. 13.

1: The EVPN infrastructure module is implemented.

This module is the same as the module having the same name in exemplary embodiment sixteen except for what is specifically noted.

Different from the exemplary embodiment sixteen, a plug-in mechanism in this module is shown in FIG. 13. The first packet is encapsulated into the X-th packet according to the forwarding process of [EVPN Overlay], where the X-th packet is the IP packet without the corresponding link layer encapsulation (for example, the MAC header). Then, the first IP plug-in is called with the X-th packet as a parameter. After the source IP of the X-th packet is modified in the first IP plug-in, the X-th packet is returned and the second IP plug-in is called. In the second IP plug-in, the MPLS label is added outside the X-th packet and an IP address T is returned. Then, the underlay routing table is searched with the IP address T. If a matched route entry has the MPLS label, the export label stack and forwarding information of the export label stack are encapsulated according to the MPLS forwarding process, so that the second packet is obtained and sent out. After the third packet is received and a backbone IP-VRF instance to which the third packet belongs is determined through a private network tag in the third packet, the MPLS label and an outer link layer encapsulation of the third packet are stripped, so that a Q-th packet is obtained. Then, the third IP plug-in is called with the Q-th packet as a parameter, and zero, one or more Z-th packets and the export ACs corresponding to the Z-th packets are obtained. Each Z-th packet and its corresponding export AC are further processed according to remaining procedures in RFC7348 and the DF filtering process in RFC7432.

Different from the exemplary embodiment sixteen, this module further forms the host route entry in the corresponding backbone IP-VRF instance for the IP address of the EVPN instance interface of each EVPN instance.

Different from the exemplary embodiment sixteen, the RT-3 route issued by this module further carries SRv6-VPN TLV defined in draft-dawra-idr-srv6-vpn-01, where SRv6-VPN TLV carries an IP address of an EVPN instance interface of an EVPN instance to which the RT-3 route belongs.

After this module receives the RT-3 route, when the corresponding processing in exemplary embodiment sixteen is performed, the IP address carried in the SRv6-VPN TLV is used to replace the function of the BGP next-hop and an originating router's IP address field. Additionally, the IP address carried in the SRv6-VPN TLV is used to add the RT-3 route to the backbone IP-VRF instance corresponding to the EVPN instance to which the RT-3 route belongs, and route entry I is formed accordingly. The forwarding information of route entry I is the forwarding information of the RT-3 route and the forwarding information of the RT-3 route includes a private network MPLS label carried in a P-multicast service interface tunnel (PMSI tunnel) attribute of the RT-3 route. The MPLS label is used as an IP-VRF private network export label of route entry I, and a BGP next-hop of the RT-3 route is used as a BGP next-hop of route entry I.

2: A method for implementing the first IP plug-in module is described below.

This module uses the ESI IP of the ESI corresponding to the main interface to which the first AC belongs to replace the source IP of the X packet.

In this exemplary embodiment, this module does not replace the destination IP of the X-th packet.

3: A method for implementing the second IP plug-in module is described below.

This module searches for the destination IP of the X-th packet in the routing table of the backbone IP-VRF instance bound to the EVPN instance, and route entry R is hit. However, this module does not replace the destination IP of the X-th packet according to the route entry R, instead, this module adds one MPLS label outside the IP header where the destination IP of the X-th packet is located, where the one MPLS label is a private network tag of the route entry R. Then, the value of a BGP next-hop of the route entry R is returned to the EVPN infrastructure module.

In this embodiment, no matter the first packet is the unicast packet or the BUM packet, the forwarding process described above is performed. However, the forwarding information obtained when the first packet is the unicast packet is different from the forwarding information obtained when the first packet is the BUM packet. For example, the BGP next-hop obtained in the former case comes from the RT-2 route, and the BGP next-hop obtained in the latter case comes from the RT-3 route.

4: A method for implementing the third IP plug-in module is described below.

This module is the same as the module having the same name in exemplary embodiment sixteen except for what is specifically noted.

If a destination IP of the Q-th packet is one local host IP address in the backbone IP-VRF instance and a UDP port of the Q-th packet is the port number corresponding to the VXLAN data packet, then the Q-th packet belongs to the EVPN instance identified by a VNI field of the Q-th packet.

The Qth packet continues to be processed in the EVPN instance according to the procedures defined in RFC7348, so that one or more Z-th packets and the export AC of each Z-th packet are obtained. Accordingly, the fourth IP plug-in is called with each Z-th packet and its export AC as parameters separately. Finally, all Z-th packets which are not discarded by the fourth IP plug-in and their and export ACs are returned to the EVPN infrastructure module.

5: A method for implementing the fourth IP plug-in module is described below.

This module is the same as the module having the same name in exemplary embodiment sixteen except for what is specifically noted.

Different from the exemplary embodiment sixteen, this module returns packets not discarded to the third IP plug-in module rather than the EVPN infrastructure module.

The implementation of the service unaware node of the technical solution of the method and apparatus (system) for transmitting and using an entropy value of an inner packet in an outer IP header is described in conjunction with FIG. 8.

1: The IP infrastructure module is implemented.

This module is the same as the module having the same name in exemplary embodiment thirteen.

2: A method for implementing the third entropy IP plug-in module is described below.

This module is the same as the module having the same name in exemplary embodiment thirteen.

The EVPN topology shown in FIG. 1 is used as an example, and the processing of the network and traffic deployment includes the steps described below.

In step 1, the implementation of each node is selected. This is the same as that in exemplary embodiment sixteen except that multiple PE nodes and P nodes are all nodes defined in this exemplary embodiment.

In step 2, the EVPN router ID of each PE node is configured and issued. This is the same as that in exemplary embodiment sixteen.

In step 3, the VXLAN EVPN network shown in FIG. 1 is established. This is the same as that in exemplary embodiment sixteen.

In step 4, the VXLAN EVPN traffic is established according to FIG. 1 and the same VNI is designated for the VXLAN EVPN traffic on each PE node. This is the same as that in exemplary embodiment sixteen.

In step 5, the ESI basic configuration is configured. This is the same as that in exemplary embodiment sixteen.

In step 6, the ESI filtering configuration is configured. This is the same as that in exemplary embodiment sixteen except for configuring the backbone IP-VRF instance and designating the backbone IP-VRF instance corresponding to the EVPN instance.

Through the above steps, the VXLAN EVPN traffic is established. The forwarding behavior and effects on the PE node and the service unaware node P defined in this exemplary embodiment can be verified by using the data packet.

The EVPN topology shown in FIG. 1 is used as an example, and the processing of the end-to-end packet forwarding includes the steps described below.

In step 1, when a node PE 1 receives an ARP packet B1 from a local AC 1, the process of forwarding two copies B1*b* and B1*c* of the packet B1 by the EVPN infrastructure module is the same as that in exemplary embodiment sixteen except that outer source IPs of VXLAN encapsulations of B1*b* and B1*c* become ESI_IP 18, where ESI_IP 18 is the ESI IP configured on the ESI corresponding to the physical interface to which AC 1 belongs.

In step 2, when a node PE 2 receives the packet B1*b*, the process of forwarding the packet B1*b* by the EVPN infrastructure module is the same as that in exemplary embodiment sixteen and the result of the ESI filtering is the same as in exemplary embodiment sixteen except that the ESI filtering rule is changed into comparing the source IP of the packet B1*b* with the ESI IP configured on the ESI corresponding to the physical interface to which each export AC belongs.

Step 3 and step 4 are the same as those in exemplary embodiment sixteen except for adding a private network MPLS label corresponding to the backbone IP-VRF instance outside the outer IP header of the VXLAN encapsulation.

The largest difference between the PE node defined in this exemplary embodiment and the nodes defined in exemplary embodiments fourteen, fifteen and sixteen is that each of packets B1*b* and B1*c* corresponding to the PE node actually carries the private network tag encapsulation corresponding to the backbone IP-VRF instance. This enables the PE node defined in this embodiment to be used in a hierarchical architecture similar to a hierarchical virtual private LAN service (H-VPLS). A node defined in this embodiment is used as an edge node (similar to a user facing-provider edge (UPE) in the H-VPLS or a backbone edge bridge (BEB) in the PBB), and a node only supporting the backbone IP-VRF instance forwarding function is used as a sink node (similar to a network facing provider edge (NPE) in the H-VPLS or a backbone core bridge (BCB) in the PBB).

At least one module or at least one step of the present disclosure described above may be implemented by a general computing apparatus, and the at least one module or at least one step described above may be concentrated on a single computing apparatus or distributed on a network composed of multiple computing apparatuses. In an embodiment, at least one module or at least one step may be implemented by program codes executable by the computing apparatuses, so that they may be stored in a storage apparatus to be executed by the computing apparatuses. In some circumstances, the illustrated or described steps may be executed in sequences different from those described herein, or the at least one module or at least one step may be separately made into at least one integrated circuit module, or multiple modules or steps therein may be made into a single integrated circuit module for implementation. In this way, the present disclosure is not limited to any specific combination of hardware and software.

What is claimed is:

1. A packet sending method, applied to a first provider edge (PE) node and comprising:
    receiving a first packet from an access circuit (AC);
    processing the first packet to obtain at least one second packet, wherein each of the at least one second packet comprises a first internet protocol (IP) address, wherein the first IP address comprises a second IP address or an IP address which is obtained from encrypting part bits of the second IP address with an intrinsic entropy value of the first packet;

wherein the second IP address is one of the following:
an IP address which is obtained from a modification to a designated bit of an Ethernet segment identifier (ESI) IP address of the ESI corresponding to the AC according to a Root/Leaf attribute of the AC,
an IP address which is obtained from replacement of part bits of the ESI IP address of the ESI corresponding to the AC with a virtual local area network identifier (VLAN ID) value corresponding to the AC,
a third IP address, or an IP address which is obtained from a modification to a designated bit of the third IP address according to the Root/Leaf attribute of the AC;

wherein the ESI corresponding to the AC is an ESI bound to a main interface to which the AC belongs, the ESI IP address of the ESI is an IP address corresponding to the ESI, the VLAN ID value corresponding to the AC is configured in the AC and used for matching the first packet, and the third IP address is determined through a PE node where the AC is located and a local index of the ESI corresponding to the AC on the PE node or determined through a virtual private network (VPN) domain to which the PE node where the AC is located belongs and the local index of the ESI corresponding to the AC on the PE node; and sending each of the at least one second packet to a second PE node:

wherein the processing the first packet to obtain the at least one second packet comprises:

performing an IP encapsulation on the first packet to obtain the at least one second packet, wherein the IP encapsulation comprises an A-type extended segment routing internet protocol version 6 (SRv6) encapsulation, wherein the A-type extended SRv6 encapsulation does not have a UDP header and a virtual extensible local area network (VXLAN) header compared to a VXLAN encapsulation.

2. The method of claim 1, wherein
the IP address obtained from the modification to the designated bit of the ESI IP address according to Root in a case where a value of the Root/Leaf attribute of the AC is Root is different from the IP address obtained from the modification to the designated bit of the ESI IP address according to Leaf in a case where the value of the Root/Leaf attribute of the AC is Leaf, and
the IP address obtained from the modification to the designated bit of the third IP address according to Root in the case where the value of the Root/Leaf attribute of the AC is Root is different from the IP address obtained from the modification to the designated bit of the third IP address according to Leaf in the case where the value of the Root/Leaf attribute of the AC is Leaf.

3. The method of claim 1, wherein the third IP address comprises a first part and a second part, wherein in the case where the third IP address is determined through the PE node where the AC is located and the local index of the ESI corresponding to the AC on the PE node, the first part comprises the local index and the second part comprises at least one of a designated part of a designated IP address configured on the PE node where the AC is located, wherein the third IP address of each AC on the PE node comprises the designated part, or a common binary-bit part of designated attribute values configured ESI-by-ESI through a same configuration command on the PE node where the AC is located; and wherein in the case where the third IP address is determined through the VPN domain to which the PE node where the AC is located belongs and the local index of the ESI corresponding to the AC on the PE node, the first part comprises the local index and the second part comprises a common binary-bit part of designated IP addresses configured through a same configuration command on PE nodes of a VPN domain to which the at least one second packet belongs, wherein the VPN domain is a set of PE nodes for sending or receiving the at least one second packet.

4. The method of claim 1, wherein the local index comprises at least one of:
an ESI value;
an ESI alias value, which is a value configured for an attribute of the ESI corresponding to the AC, wherein the ESI corresponding to the AC differs from other ESIs on the PE node in the attribute;
an ESI local distinguishment value, which is a value of a first designated field in the ESI corresponding to the AC, wherein on the PE node where the AC is located, the first designated fields corresponding to different ESIs have different values; or
an ESI intra-domain distinguishment value, which is a value of a second designated field in the ESI corresponding to the AC, wherein in the VPN domain to which the PE node where the AC is located belongs, the second designated fields corresponding to different ESIs have different values.

5. The method of claim 1, wherein the first IP address is located in one of the following positions of the each of the at least one second packet:
a source IP address or an internet protocol version 6 (IPv6) option header.

6. The method of claim 1, wherein a source IP address of each of the at least one second packet is routable in an underlay network or is non-routable in the underlay network.

7. A non-transitory storage medium storing a program, wherein when the program is executed, the method of claim 1 is performed.

8. A processor configured to execute a program, wherein when the program is executed, the method of claim 1 is performed.

9. A first provider edge (PE) node, comprising:
a communication interface configured to receive a first packet from an access circuit (AC); and
a processor configured to process the first packet to obtain at least one second packet, wherein each of the at least one second packet comprises a first internet protocol (IP) address, wherein the first IP address comprises a second IP address or an IP address which is obtained from encryption part bits of the second IP address with an intrinsic entropy value of the first packet; and
the second IP address is one of the following:
an IP address which is obtained from a modification to a designated bit of an Ethernet segment identifier (ESI) IP address of the ESI corresponding to the AC according to a Root/Leaf attribute of the AC,
an IP address which is obtained from replacement of part bits of the ESI IP address of the ESI corresponding to the AC with a virtual local area network identifier (VLAN ID) value corresponding to the AC, a third IP address, or an IP address which is obtained from a modification to a designated bit of the third IP address according to the Root/Leaf attribute of the AC;

wherein the ESI corresponding to the AC is an ESI bound to a main interface to which the AC belongs, the ESI IP address of the ESI is an IP address corresponding to the ESI, the VLAN ID value corresponding to the AC is configured in the AC and used for matching the first packet, and the third IP address is determined through a PE node where the AC is located and a local index of the ESI corresponding to the AC on the PE node or determined through a virtual private network (VPN) domain to which the PE node where the AC is located belongs and the local index of the ESI corresponding to the AC on the PE node, wherein the communication interface is further configured to send each of the at least one second packet to a second PE node, wherein the processor is further configured to: perform an IP encapsulation on the first packet to obtain the at least one second packet, wherein the IP encapsulation comprises an A-type extended segment routing internet protocol version 6 (SRv6) encapsulation, wherein the A-type extended SRv6 encapsulation does not have a UDP header and a virtual extensible local area network (VXLAN) header compared to a VXLAN encapsulation.

10. A packet processing system, comprising a first provider edge (PE) node and a second PE node, wherein the first PE node is configured to receive a first packet from an access circuit (AC) and process the first packet to obtain at least one second packet, and send the at least one second packet to the second PE node, wherein each of the at least one second packet comprises a first internet protocol (IP) address, which comprises a second IP address or an IP address which is obtained from encryption of part bits of the second IP address with an intrinsic entropy value of the first packet; wherein the second IP address is one of the following: an IP address which is obtained from a modification to a designated bit of an Ethernet segment identifier (ESI) IP address of the ESI corresponding to the AC according to a Root/Leaf attribute of the AC, an IP address which is obtained from replacement of part bits of the ESI IP address of the ESI corresponding to the AC with a virtual local area network identifier (VLAN ID) value corresponding to the AC, a third IP address, or an IP address which is obtained from a modification to a designated bit of the third IP address according to the Root/Leaf attribute of the AC; wherein the ESI corresponding to the AC is an ESI bound to a main interface to which the AC belongs, the ESI IP address of the ESI is an IP address corresponding to the ESI, the VLAN ID value corresponding to the AC is a VLAN ID value configured in the AC and used for matching the first packet, and the third IP address is determined through a PE node where the AC is located and a local index of the ESI corresponding to the AC on the PE node or determined through a virtual private network (VPN) domain to which the PE node where the AC is located belongs and the local index of the ESI corresponding to the AC on the PE node; and wherein the second PE node is configured to process each of the at least one second packet according to an ESI value corresponding to the first IP address comprised in each of the at least one second packet or perform ESI filtering on each of the at least one second packet according to the second IP address and configuration information on a receiver receiving the each of the at least one second packet;

wherein the first PE node is further configured to: perform an IP encapsulation on the first packet to obtain the at least one second packet, wherein the IP encapsulation comprises an A-type extended segment routing internet protocol version 6 (SRv6) encapsulation, wherein the A-type extended SRv6 encapsulation does not have a UDP header and a virtual extensible local area network (VXLAN) header compared to a VXLAN encapsulation.

* * * * *